United States Patent
Hato et al.

(10) Patent No.: US 12,059,825 B2
(45) Date of Patent: Aug. 13, 2024

(54) STRUCTURE MANUFACTURING METHOD AND RETAINING DEVICE

(71) Applicant: KYORAKU CO., LTD., Kyoto (JP)

(72) Inventors: Hisanao Hato, Yamato (JP); Tadatoshi Tanji, Yamato (JP); Takeshi Kato, Kakamigahara (JP); Tatsuya Fukuda, Yamato (JP); Yuki Harasawa, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 698 days.

(21) Appl. No.: 17/263,694

(22) PCT Filed: Jul. 24, 2019

(86) PCT No.: PCT/JP2019/029111
§ 371 (c)(1),
(2) Date: Jan. 27, 2021

(87) PCT Pub. No.: WO2020/026928
PCT Pub. Date: Feb. 6, 2020

(65) Prior Publication Data
US 2021/0221033 A1  Jul. 22, 2021

(30) Foreign Application Priority Data

Jul. 31, 2018 (JP) .................................. 2018-143733
Jul. 31, 2018 (JP) .................................. 2018-143749
(Continued)

(51) Int. Cl.
*B29C 37/02* (2006.01)
*B29C 49/72* (2006.01)
(Continued)

(52) U.S. Cl.
CPC .............. *B29C 37/02* (2013.01); *B29C 49/72* (2013.01); *B29C 51/32* (2013.01); *B65H 45/14* (2013.01)

(58) Field of Classification Search
CPC ......... B29C 37/02; B29C 49/72; B29C 51/32; B65H 45/14
See application file for complete search history.

(56) References Cited

U.S. PATENT DOCUMENTS 884,965 A * 4/1908 Walker .................... B28B 7/087
249/162
3,097,397 A * 7/1963 Leach et al. ............ B29C 33/00
249/161
(Continued)

FOREIGN PATENT DOCUMENTS

FR  2214345 A5  8/1974
JP  S577373 U  1/1982
(Continued)

OTHER PUBLICATIONS

International Search Report dated Oct. 15, 2019 in corresponding International Application No. PCT/JP2019/029111; 14 pages.
(Continued)

*Primary Examiner* — Lucas E. A. Palmer
(74) *Attorney, Agent, or Firm* — Maier & Maier, PLLC

(57) ABSTRACT

A manufacturing method of a structure by which a target member can be easily positioned with high accuracy. In a tilting step, at least one target member is positioned by tilting a positioning table and sliding the target member placed on the positioning table to bring the target member into contact with a locking portion.

8 Claims, 41 Drawing Sheets

(30) Foreign Application Priority Data

| | | | |
|---|---|---|---|
| Jul. 31, 2018 | (JP) | ................................ | 2018-143766 |
| Jul. 31, 2018 | (JP) | ................................ | 2018-143783 |
| Jul. 31, 2018 | (JP) | ................................ | 2018-143798 |
| Jul. 31, 2018 | (JP) | ................................ | 2018-143820 |
| Feb. 13, 2019 | (JP) | ................................ | 2019-023466 |

(51) Int. Cl.
  *B29C 51/32* (2006.01)
  *B65H 45/14* (2006.01)

(56) References Cited

U.S. PATENT DOCUMENTS

| | | | | | |
|---|---|---|---|---|---|
| 3,724,805 | A | * | 4/1973 | Kleiber | ............... B28B 7/082 249/171 |
| 3,892,116 | A | * | 7/1975 | Sentourens | ........... B21D 43/10 72/305 |
| 3,953,019 | A | * | 4/1976 | Burke | ............... B65H 45/101 493/418 |
| 3,990,693 | A | * | 11/1976 | Beahn | ............... B65H 45/04 493/450 |
| 4,637,812 | A | * | 1/1987 | Ogawa | ............... B65H 45/107 493/410 |
| 4,830,692 | A | * | 5/1989 | Art | ............... B65H 9/00 198/380 |
| 5,021,108 | A | * | 6/1991 | Bergqvist | ........... B29C 44/1233 264/46.7 |
| 5,230,908 | A | * | 7/1993 | Morgan | ............... B29C 33/485 425/188 |
| 6,767,000 | B2 | * | 7/2004 | Heide | ............... B28B 7/082 249/161 |
| 7,040,884 | B2 | * | 5/2006 | Bergqvist | ........... B29C 44/3442 264/46.7 |
| 9,353,519 | B2 | * | 5/2016 | Williams | ............... B27F 7/006 |
| 2005/0215409 | A1 | * | 9/2005 | Abramson | ........... B65H 29/22 493/476 |
| 2008/0099957 | A1 | * | 5/2008 | Petrou | ............... A47G 25/483 264/328.8 |
| 2009/0241445 | A1 | * | 10/2009 | Sprague | ............... E04B 2/827 49/360 |
| 2012/0304897 | A1 | * | 12/2012 | Williamson | ......... A47B 3/0803 108/127 |
| 2013/0029827 | A1 | * | 1/2013 | Fujita | ............... A61F 13/15747 493/405 |
| 2016/0354991 | A1 | | 12/2016 | Sueoka | |
| 2019/0248061 | A1 | | 8/2019 | Funato | |

FOREIGN PATENT DOCUMENTS

| | | |
|---|---|---|
| JP | S5788524 U | 6/1982 |
| JP | S6135911 A | 2/1986 |
| JP | S62176146 U | 11/1987 |
| JP | H01214554 A | 8/1989 |
| JP | H02105759 U | 8/1990 |
| JP | H03118623 U | 12/1991 |
| JP | H0445060 A | 2/1992 |
| JP | H04185311 A | 7/1992 |
| JP | H0524139 A | 2/1993 |
| JP | H05116831 A | 5/1993 |
| JP | H05132220 A | 5/1993 |
| JP | H06-15549 A | 1/1994 |
| JP | H06254954 A | 9/1994 |
| JP | H0866640 A | 3/1996 |
| JP | H0890644 A | 4/1996 |
| JP | H11-114895 A | 4/1999 |
| JP | 2002087695 A | 3/2002 |
| JP | 2006212712 A | 8/2006 |
| JP | 2006212712 A * | 8/2006 |
| JP | 2012062148 A | 3/2012 |
| JP | 2014079901 A | 5/2014 |
| JP | 2015160422 A | 9/2015 |
| JP | 2015164763 A | 9/2015 |
| JP | 2015-193185 A | 11/2015 |
| JP | 2017-148961 A | 8/2017 |
| JP | 2018047586 A | 3/2018 |
| WO | 2011152346 A1 | 12/2011 |
| WO | 2015072337 A1 | 5/2015 |
| WO | 2018043390 A1 | 3/2018 |

OTHER PUBLICATIONS

Extended European Search Report dated Sep. 8, 2021, in corresponding European Patent Application No. 19844688.2; 8 pgs.

Office Action dated Feb. 15, 2022 in corresponding Japanese Patent Application No. 2018-143749; 6 pages including English-language translation.

Office Action dated Feb. 22, 2022 in corresponding Japanese Patent Application No. 2018-143766; 6 pages including English-language translation.

Office Action dated Mar. 1, 2022 in corresponding Japanese Patent Application No. 2018-143783; 6 pages including English-language translation.

* cited by examiner

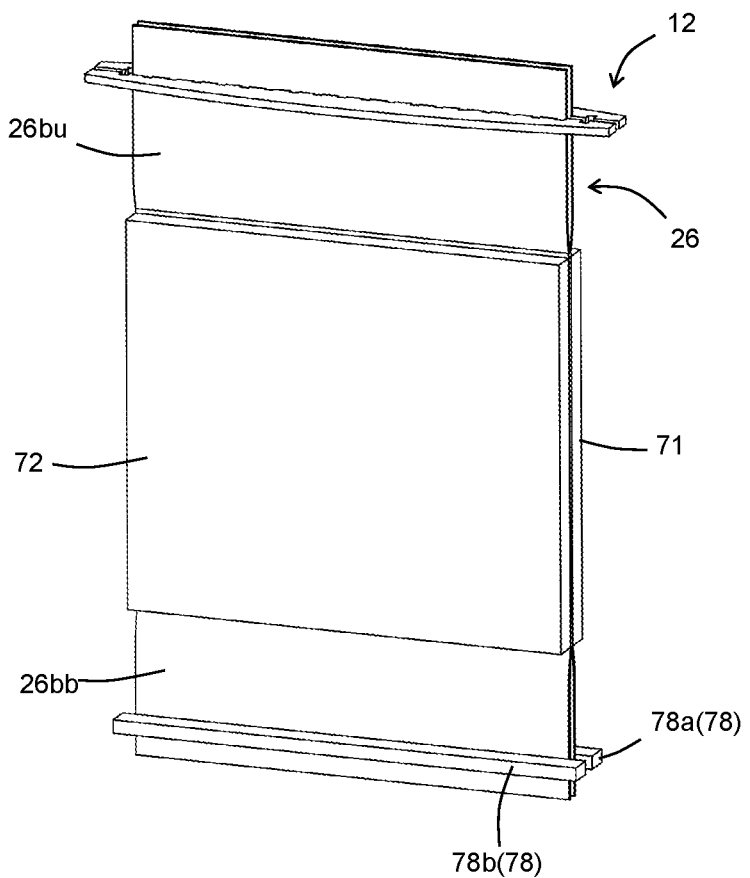

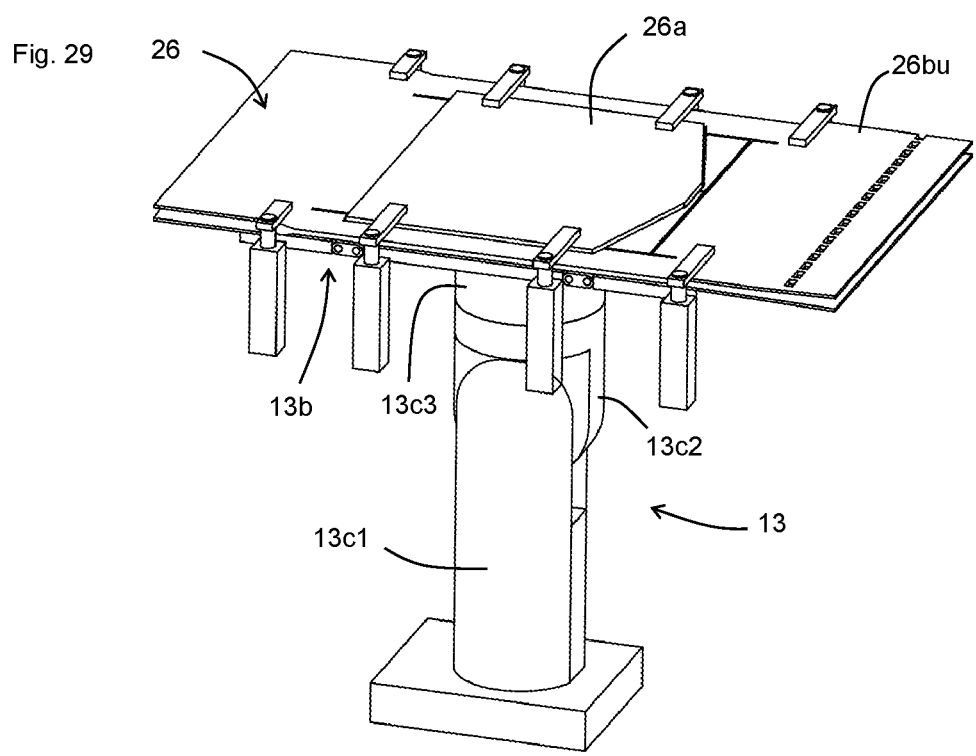

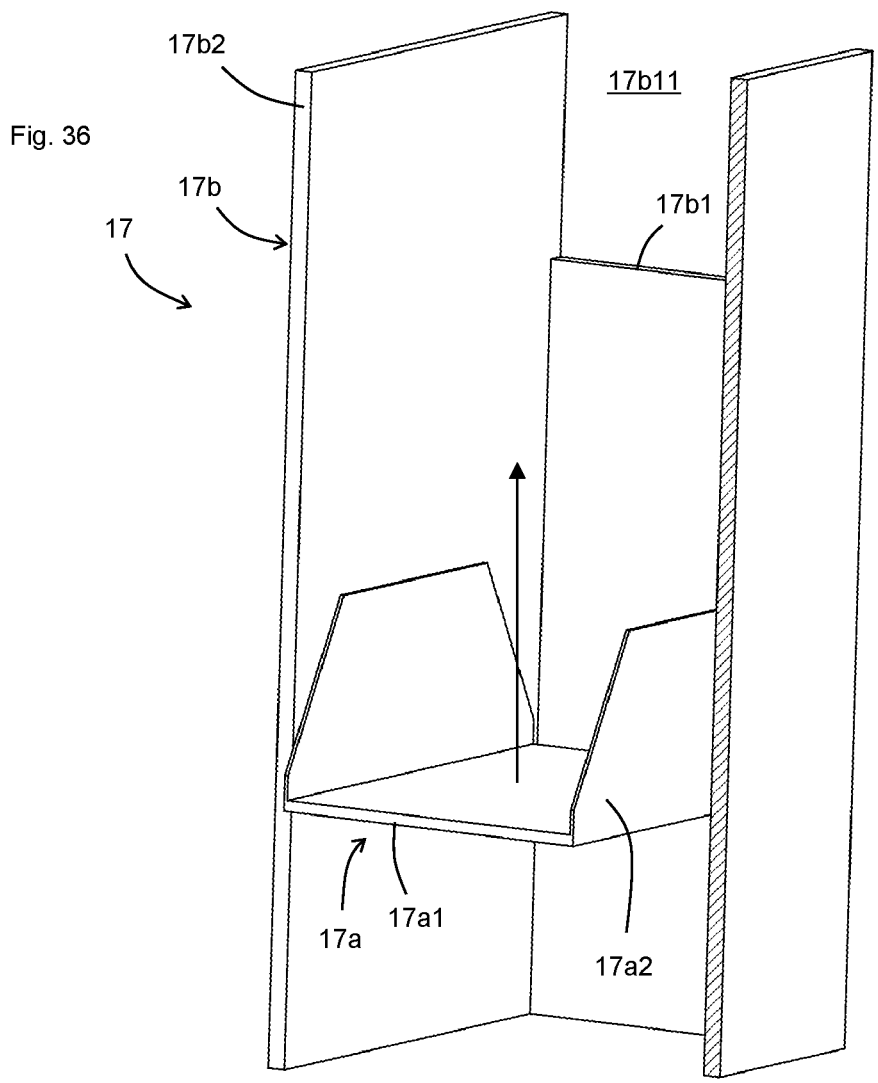

STRUCTURE MANUFACTURING METHOD AND RETAINING DEVICE

FIELD

The present invention relates to a manufacturing method of a structure and a holding apparatus.

BACKGROUND (First to Sixth Viewpoints)

Patent Literature 1 discloses a resin panel configured by sandwiching a core material between a pair of resin sheets.

CITATION LIST

Patent Literature

Patent Literature 1: JP-A-2014-79901

SUMMARY (First Viewpoint)

In Patent Literature 1, the core material is arranged between the pair of resin sheets by a manipulator and the like, and then the core material is pressed against the resin sheets to be welded.

In such a manufacturing method, it is necessary to weld the core material to a specific position on the resin sheet. Although the manipulator can transport the core material with high accuracy, it is not easy to position the core material accurately with respect to a suction head of the manipulator.

The present invention has been made in view of such circumstances and provides a manufacturing method of a structure by which a target member can be easily positioned with high accuracy.

(Second Viewpoint)

In Patent Literature 1, a mold having a pinch-off portion surrounding a cavity is used to mold the resin panel, and the resin sheet outside the pinch-off portion becomes a burr to be removed.

In this regard, since the shape of the burr is irregular, it is not easy to properly hold a molded body with the burr.

The present invention has been made in view of such circumstances and provides a holding apparatus capable of properly holding the molded body.

(Third Viewpoint)

In Patent Literature 1, the mold having the pinch-off portion surrounding the cavity is used for molding the resin panel, and the resin sheet outside the pinch-off portion becomes the burr to be removed.

Such a burr is large, and its handling is not easy.

The present invention has been made in view of such circumstances and provides a manufacturing method of a structure by which the handling of the burr can be facilitated.

(Fourth Viewpoint)

In Patent Literature 1, the mold having the pinch-off portion surrounding the cavity is used for molding the resin panel, and the resin sheet outside the pinch-off portion becomes the burr to be removed.

Such a burr is formed on four sides of the resin panel having a substantially rectangular shape, and it takes time and is laborious to remove the burr because the burrs on each side are cut in sequence.

The present invention has been made in view of such circumstances and provides a manufacturing method of a structure by which labor for removing the burr can be reduced.

(Fifth Viewpoint)

In Patent Literature 1, the mold having the pinch-off portion surrounding the cavity is used for molding the resin panel, and the resin sheet outside the pinch-off portion becomes the burr to be removed.

Such a burr is separated from the resin panel on a holding stand and is fed into a pulverizer for recycling.

The burr on the holding stand needs to be moved to a burr receiving portion to be fed into the pulverizer, and the burr may fall from the burr receiving portion.

The present invention has been made in view of such circumstances and provides a manufacturing method of a structure by which the burr can be reliably moved from the holding stand to the burr receiving portion.

(Sixth Viewpoint)

In Patent Literature 1, the mold having the pinch-off portion surrounding the cavity is used for molding the resin panel, and the resin sheet outside the pinch-off portion becomes the burr to be removed.

Such a burr is separated from the resin panel on the holding stand and is fed into the pulverizer for recycling.

It is not easy to smoothly link such a series of operations.

The present invention has been made in view of such circumstances and provides a manufacturing method of a structure which enables steps from molding to burr discharge to be linked and performed smoothly.

Solution to Problem

The problems of the first to sixth viewpoints described above can be solved by solutions of the first to sixth viewpoints, respectively. Further, the solutions of the first to sixth viewpoints can be combined with each other.

(First Viewpoint)

According to the present invention, provided is a manufacturing method of a structure, comprising a tilting step, wherein, in the tilting step, at least one target member is positioned by tilting a positioning table and sliding the target member placed on the positioning table to bring the target member into contact with a locking portion.

In the present invention, the target member placed on the positioning table is slid and brought into contact with the locking portion to position the target member. Such a method enables the target member to be easily positioned with high accuracy.

Hereinafter, various embodiments of the present invention will be exemplified.

Preferably, the positioning table is configured to be rotatable about a first rotation axis and a second rotation axis; the first rotation axis and the second rotation axis are orthogonal to each other; the locking portion comprises a first locking portion and a second locking portion; the tilting step comprises a first-rotation-axis rotating step and a second-rotation-axis rotating step; in the first-rotation-axis rotating step, the target member is slid and brought into contact with the first locking portion by rotating the positioning table about the first rotation axis; and in the second-rotation-axis rotating step, the target member is slid and brought into contact with the second locking portion by rotating the positioning table about the second rotation axis.

Preferably, the target member is configured by engaging a pair of base bodies with an elongated reinforcing member.

Preferably, the method further comprises a base-body position correction step after the tilting step, wherein, in the base-body position correction step, misalignment between the pair of base bodies along a longitudinal direction of the reinforcing member is corrected.

Preferably, the method further comprises a reinforcing-member position correction step after the tilting step, wherein, in the reinforcing-member position correction step, misalignment of the reinforcing member with respect to the pair of base bodies is corrected.

Preferably, the method further comprises a taking-out step before the tilting step, wherein the at least one target member comprises a plurality of target members; and in the taking-out step, the target member at a top of a target member stack is taken out and moved onto the positioning table, the target member stack being configured by stacking the plurality of target members.

Preferably, the method further comprises a holding step after the tilting step, wherein, in the holding step, the target member in a positioned state is held and moved by a manipulator.

Preferably, the method further comprises a heating step before the tilting step, wherein, in the heating step, the target member is heated.

Preferably, the heating step is performed by heating the target members included in the target member stack.

(Second Viewpoint)

According to the present invention, provided is a holding apparatus for holding a molded body, comprising a holding stand and a holding mechanism, wherein the holding stand comprises a holding surface for holding the molded body; the holding mechanism comprises a rod and a pressing portion; the pressing portion is configured to be rotatable about the rod and is further configured such that a distance between the pressing portion and the holding surface is adjustable; and the holding mechanism is configured to hold the molded body by clamping the molded body between the pressing portion and the holding stand.

In the present invention, since the molded body is clamped between the pressing portion configured to be rotatable about the rod and the holding stand, even the molded body having an irregularly shaped burr can be properly held.

Hereinafter, various embodiments of the present invention will be exemplified.

Preferably, the pressing portion is further configured to press the molded body by shifting a state of the holding mechanism in order of an overlapping state and a pressing state; the overlapping state is a state where the rod is extended and the molded body is arranged between the pressing portion and the holding stand when the holding surface is viewed from a direction perpendicular to the holding surface; and the pressing state is a state where the rod is contracted from the overlapping state and the molded body is pressed by the pressing portion.

Preferably, the holding stand is configured to hold the molded body while the holding surface is standing upright.

Preferably, the holding mechanism comprises a central holding mechanism and a lower holding mechanism; the lower holding mechanism is arranged on a lower side of the central holding mechanism in a state where the holding surface is standing upright; and the central holding mechanism is configured to hold the molded main body.

Preferably, the pressing portion of the lower holding mechanism is shorter than the pressing portion of the central holding mechanism.

Preferably, the holding apparatus is further configured such that, when holding the molded body, the central holding mechanism holds the molded body, and then the lower holding mechanism holds the molded body.

Preferably, in the overlapping state, a length of the rod of the central holding mechanism is larger than a length of the rod of the lower holding mechanism.

(Third Viewpoint)

According to the present invention, provided is a manufacturing method of a structure, comprising a folding step, wherein, in the folding step, a burr placed on a holding stand is folded; the holding stand comprises a base stand and an arm; the base stand and the arm are rotatably connected to each other; the burr is placed across the base stand and the arm; and the burr is folded by rotating the arm with respect to the base stand.

In the present invention, the arm is rotated with respect to the base stand to fold the burr. The folded burr is small and easy to handle.

Hereinafter, various embodiments of the present invention will be exemplified.

Preferably, the holding stand comprises a connecting member between the base stand and the arm; and the burr is folded by rotating the connecting member with respect to the base stand and rotating the arm with respect to the connecting member.

Preferably, the folding step comprises a preliminary folding step, a returning step, and a main folding step; in the preliminary folding step, the burr is folded by rotating the arm with respect to the base stand while the burr is held on the holding stand by a holding mechanism; in the returning step, the burr is unfolded; and in the main folding step, the burr is folded by rotating the arm while holding by the holding mechanism is released.

Preferably, the holding mechanism comprises a pressing portion and is configured to hold the burr by clamping the burr between the pressing portion and the holding stand.

(Fourth Viewpoint)

According to the present invention, provided is a manufacturing method of a structure, comprising a molding step and a cutting step, wherein, in the molding step, a molded body is formed by a pair of molds, the pair of molds being divisible; the molded body is configured by connecting a molded main body and a burr via a cutting line, the cutting line being provided to surround the molded main body; the cutting step comprises a first cutting step and a second cutting step; in the first cutting step, the molded body is cut along a part of the cutting line by the molds; and in the second cutting step, the molded body is cut along a remaining part of the cutting line after the molded body is taken out from the molds.

In the present invention, since the molded body is cut along a part of the cutting line by the mold, labor for removing the burr is reduced.

Hereinafter, various embodiments of the present invention will be exemplified.

Preferably, at least one of the pair of molds comprises a main body portion configured to form the molded main body and a movable portion configured to be movable relative to the main body portion; the movable portion is configured to be engaged with the burr while the molds are closed; and in the first cutting step, the molded body is cut along the part of the cutting line by moving the movable portion while the movable portion is engaged with the burr.

Preferably, the cutting line comprises a left line and a right line; the left line and the right line are arranged respectively on a left side and a right side of the molded main body when the molded body is viewed from a mold closing direction of the molds; and in the first cutting step, the molded body is cut along at least one of the left line and the right line.

Preferably, in the first cutting step, the molded body is cut along the left line and the right line.

Preferably, the cutting line further comprises an upper line and a lower line; the upper line and lower line are arranged respectively on an upper side and a lower side of the molded main body when the molded body is viewed from the mold closing direction; and in the second cutting step, the molded body is cut along the upper line and the lower line.

Preferably, the burr is a large burr; the molded main body is configured by connecting a molded product and a small burr via a parting line; the parting line comprises an adjacent line adjacent to at least one of the upper line and the lower line, the adjacent line being non-linear; the method further comprises a third cutting step of cutting the molded main body along the adjacent line after the cutting step; and the upper line and the lower line are linear.

(Fifth Viewpoint)

According to the present invention, provided is a manufacturing method of a structure, comprising a discharging step, wherein, in the discharging step, a burr placed on a holding stand is slid and discharged toward a burr receiving portion by tilting the holding stand; and the burr receiving portion is inclined such that a side thereof facing the holding stand becomes higher.

In the present invention, the holding stand is tilted while the burr receiving portion is inclined such that the side thereof facing the holding stand becomes higher, so that the burr is moved from the holding stand to the burr receiving portion. In such a method, the burr is slid on the burr receiving portion and moved to a back side of the burr receiving portion. Consequently, the burr is prevented from falling from a front side of the burr receiving portion, so that the burr can be reliably moved from the holding stand to the burr receiving portion.

Hereinafter, various embodiments of the present invention will be exemplified.

Preferably, a back wall is provided on a back side of the burr receiving portion when viewed from the holding stand, the back wall being configured to prevent the burr from falling from the burr receiving portion.

Preferably, the method further comprises an elevation step, wherein, in the elevation step, the burr receiving portion is elevated in a state where the burr receiving portion is horizontal.

Preferably, the method further comprises a feeding step after the elevation step, wherein, in the feeding step, the burr on the burr receiving portion is fed into a pulverizer by tilting the burr receiving portion.

(Sixth Viewpoint)

According to the present invention, provided is a manufacturing method of a structure, comprising a molding step, a holding step, a separation step, and a discharging step, wherein, in the molding step, a molded body is formed; in the holding step, the molded body is held by a holding stand while a holding surface of the holding stand is standing upright; the molded body is configured by connecting a molded main body and a burr; in the separation step, the molded main body is separated from the molded body to leave the burr on the holding stand; and in the discharging step, the burr placed on the holding stand is discharged toward a burr receiving portion by tilting the holding stand.

In the present invention, since the molding step, the holding step, the separation step, and the discharging step are performed, as described above, the steps from molding to burr discharge can be linked and performed smoothly.

Hereinafter, various embodiments of the present invention will be exemplified.

Preferably, the holding step, the separation step, and the discharging step are performed in a same line.

Preferably, the holding stand is supported by a rotation mechanism configured to be rotatable about a first rotation axis; and the holding stand is rotated by the rotation mechanism during transition from the holding step to the separation step and transition from the separation step to the discharging step.

Preferably, the rotation mechanism is configured to be movable along a conveying line extending perpendicularly to the first rotation axis; and the rotation mechanism is moved along the conveying line during transition from the holding step to the discharging step.

BRIEF DESCRIPTION OF THE DRAWINGS

FIG. 23 is a perspective view showing a state where the molded body 26 is clamped by a clamping device 12 while the molds 71, 72 are closed.

FIG. 29 is a perspective view of the holding apparatus 13 holding the molded body 26 while the holding stand 13b is horizontal.

FIG. 36 is a perspective view, for explaining an elevation step, of the burr feeding device 17.

DETAILED DESCRIPTION

Hereinafter, embodiments of the present invention will be described. Various characteristics described in the embodiments below can be combined with each other. Further, the invention is independently established for each characteristic.

1. Resin Panel 1

Figure 1A:
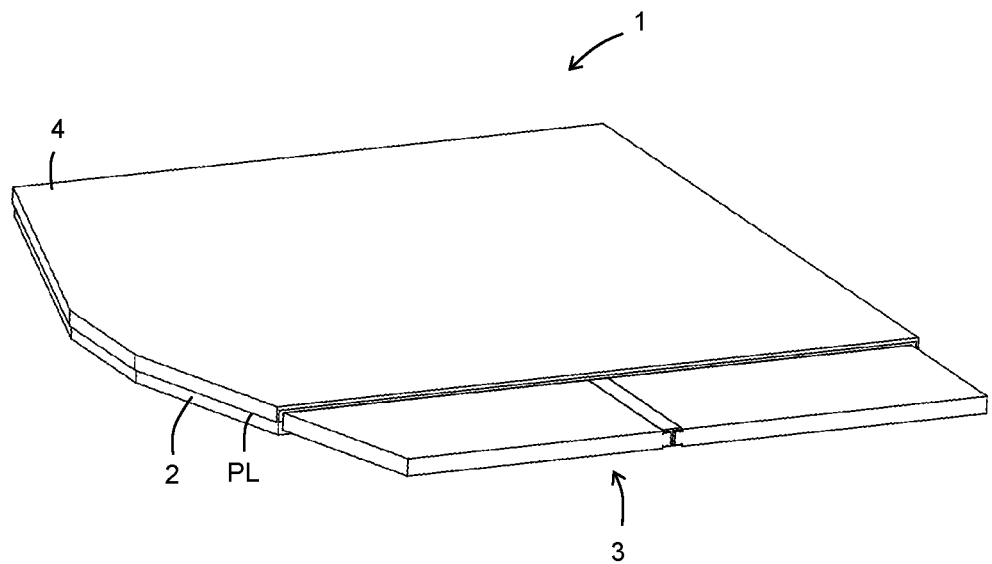
FIG. 1A is a perspective view of a resin panel 1.
Figure 1B:
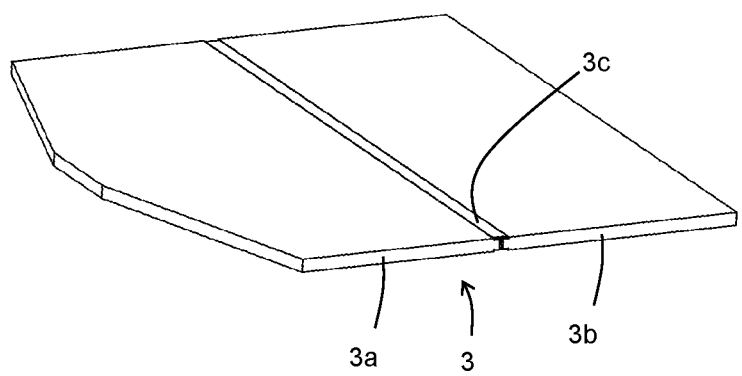
FIG. 1B is a perspective view of a core material 3.
Figure 2A:
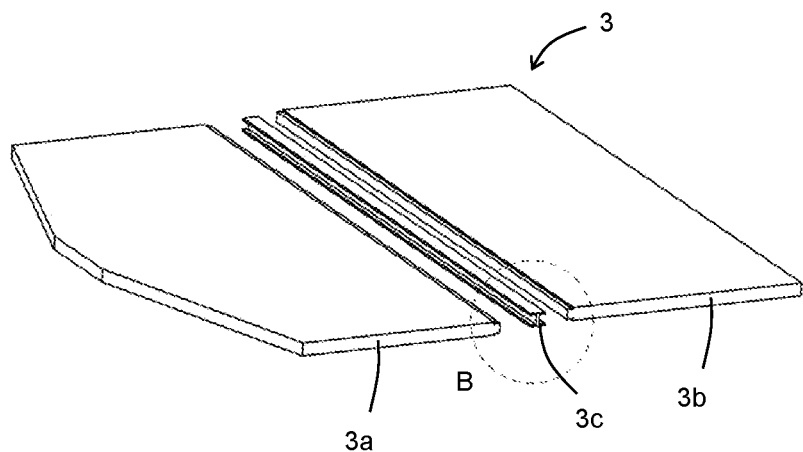
FIG. 2A is an exploded perspective view of the core material 3.
Figure 2B:
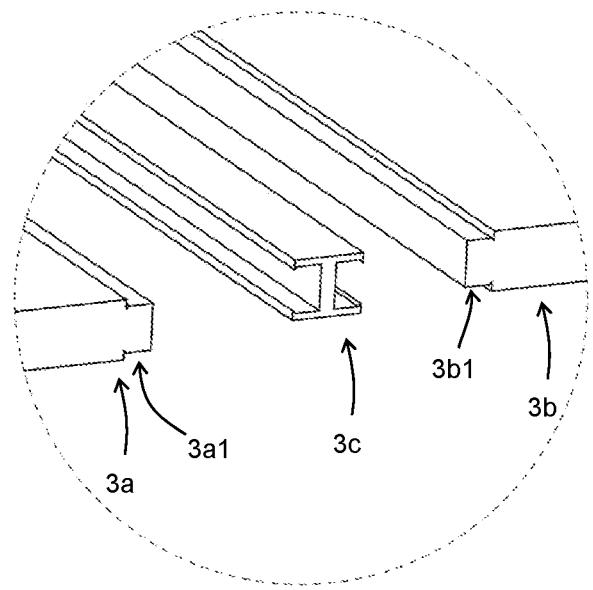
FIG. 2B is an enlarged view of a region B in FIG. 2A.
Figure 2C:
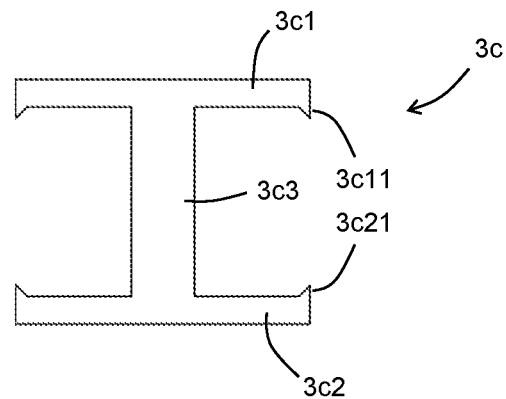
FIG. 2C is an end view of a reinforcing member 3c.

As shown in FIG. 1A and FIG. 1B, a resin panel 1 according to one embodiment of the present invention (one example of the "structure") is a panel covered with a substantially rectangular resin molded body 2.

As shown in FIG. 1A to FIG. 2C, the resin panel 1 includes the hollow resin molded body 2 and a core material 3, and the core material 3 is arranged inside the resin molded body 2. A skin material 4 is attached to one surface of the resin molded body 2 to extend to a parting line PL. The skin material 4 is, for example, a non-woven fabric and is integrally molded with the resin molded body 2 during molding.

Both sides of the core material 3 are in close contact with the resin molded body 2. The core material 3 includes base bodies 3a, 3b and a reinforcing member 3c connecting them. The reinforcing member 3c is an elongated member having a constant cross section. The base bodies 3a, 3b are made of, for example, a foam. The reinforcing member 3c is substantially H-shaped and includes an upper wall 3c1, a lower wall 3c2, and a pillar portion 3c3 connecting them. Projections 3c11 projecting toward the lower wall 3c2 are provided at both ends of the upper wall 3c1 in the width direction. Projections 3c21 projecting toward the upper wall 3c1 are provided at both ends of the lower wall 3c2 in the width direction. The projections 3c11, 3c21 are engaged with the base bodies 3a, 3b, so that the base bodies 3a, 3b and the reinforcing member 3c are integrated. Ends of the base bodies 3a, 3b are provided with recessed portions 3a1, 3b1 formed one step lower, and the upper wall 3c1 and the lower wall 3c2 are accommodated in the recessed portions 3a1, 3b1, so that upper and lower surfaces of the base bodies 3a, 3b and the reinforcing member 3c are substantially flush with each other.

2. Manufacturing System 20 of Resin Panel 1

Figure 3:
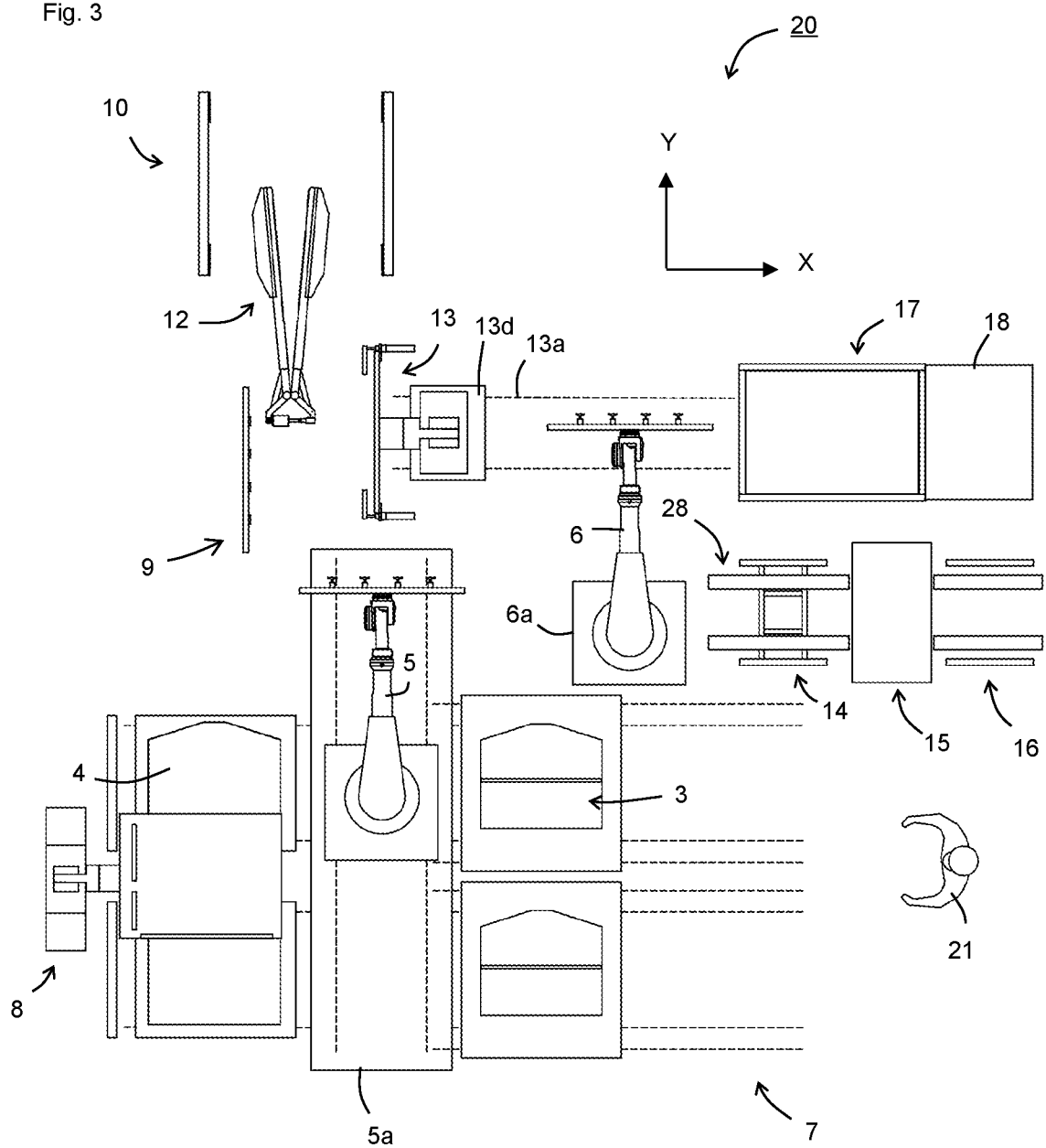
FIG. 3 is a plan view of a manufacturing system 20.

The resin panel 1 can be manufactured by using a manufacturing system 20 shown in FIG. 3. In the manufacturing system 20, only the replenishment of the core material 3 and the skin material 4 and the ejection of a molded main body 26a placed on a stacking apparatus 16 (see FIG. 41A to FIG. 41C) are performed manually, and the other steps are automated. Therefore, the manufacturing system 20 can be operated by a small number of operators 21 (for example, by one operator). Further, manufacturing lines in the manufacturing system 20 are arranged in a substantially U shape and can be installed in a relatively small space.

As shown in FIG. 3 to FIG. 5B, the manufacturing system 20 includes first and second manipulators 5, 6, a member supply line 7, a positioning apparatus 8, an insertion apparatus 9, a molding machine 10, a clamping device 12, a holding apparatus 13, a conveyor 28, an inspection apparatus 14, a pressing apparatus 15, the stacking apparatus 16, a burr feeding device 17, and a pulverizer 18. The manipulators 5, 6 are configured, for example, by attaching a head having a necessary functional member to a robot arm having six or more axes. The first manipulator 5 is configured to be movable on a conveying table 5a. The second manipulator 6 is fixed on a mounting table 6a. The holding apparatus 13 is fixed on a conveying table 13d configured to be movable along a conveying line 13a.

In the following description, an X axis and Y axis defined as shown in FIG. 3 will be referred to as appropriate. the X axis is a conveying direction in the conveying line 13a. In the conveying line 13a, the direction from the clamping device 12 to the burr feeding device 17 is defined as a "+X direction", and the opposite direction is defined as a "−X direction". The Y axis is an axis orthogonal to the X axis on the horizontal plane. The direction from the positioning apparatus 8 to the molding machine 10 is defined as a "+Y direction", and the opposite direction is defined as a "−Y direction".

The flow of members will be briefly described herein. First, the core material 3 and the skin material 4 are conveyed along the member supply line 7 from the operator 21 toward the positioning apparatus 8 in the −X direction. Next, the core material 3 and the skin material 4 are conveyed by the manipulator 5 and the insertion apparatus 9 from the positioning apparatus 8 toward the molding machine 10 in the +Y direction and are molded by the molding machine 10 to form a molded body 26 shown in FIG. 21. The molded body 26 is conveyed by the clamping device 12 in the −Y direction and is held by the holding apparatus 13. In the holding apparatus 13, the molded body 26 is separated into the molded main body 26a and a large burr 26b. The large burr 26b is conveyed in the +X direction by the holding apparatus 13 and fed into the burr feeding device 17. On the other hand, the molded main body 26a is conveyed by the manipulator 6 toward the conveyor 28 in the −Y direction and conveyed on the conveyor 28 in the +X direction. In this way, the molded main body 26a and the large burr 26b are conveyed in the same direction. Further, the core material 3 and the skin material 4 are conveyed in the opposite direction to the molded main body 26a and the large burr 26b. With such a configuration, the manufacturing system 20 can be configured in a small space.

3. Manufacturing Method of Resin Panel 1

The resin panel 1 can be manufactured by performing a manufacturing step described above using the manufacturing system 20. A manufacturing method of the resin panel 1 of the present embodiment includes a member replenishment step, a core-material delivery step, a skin-material delivery step, a molding step, a molded-body taking-out step, a holding step, a separation step, a burr processing step, and a main-body processing step. The holding step, the separation step, and the burr processing step are performed in the same line along the conveying line 13a. Each step will be described in detail below.

2-1. Member Replenishment Step

Figure 4:
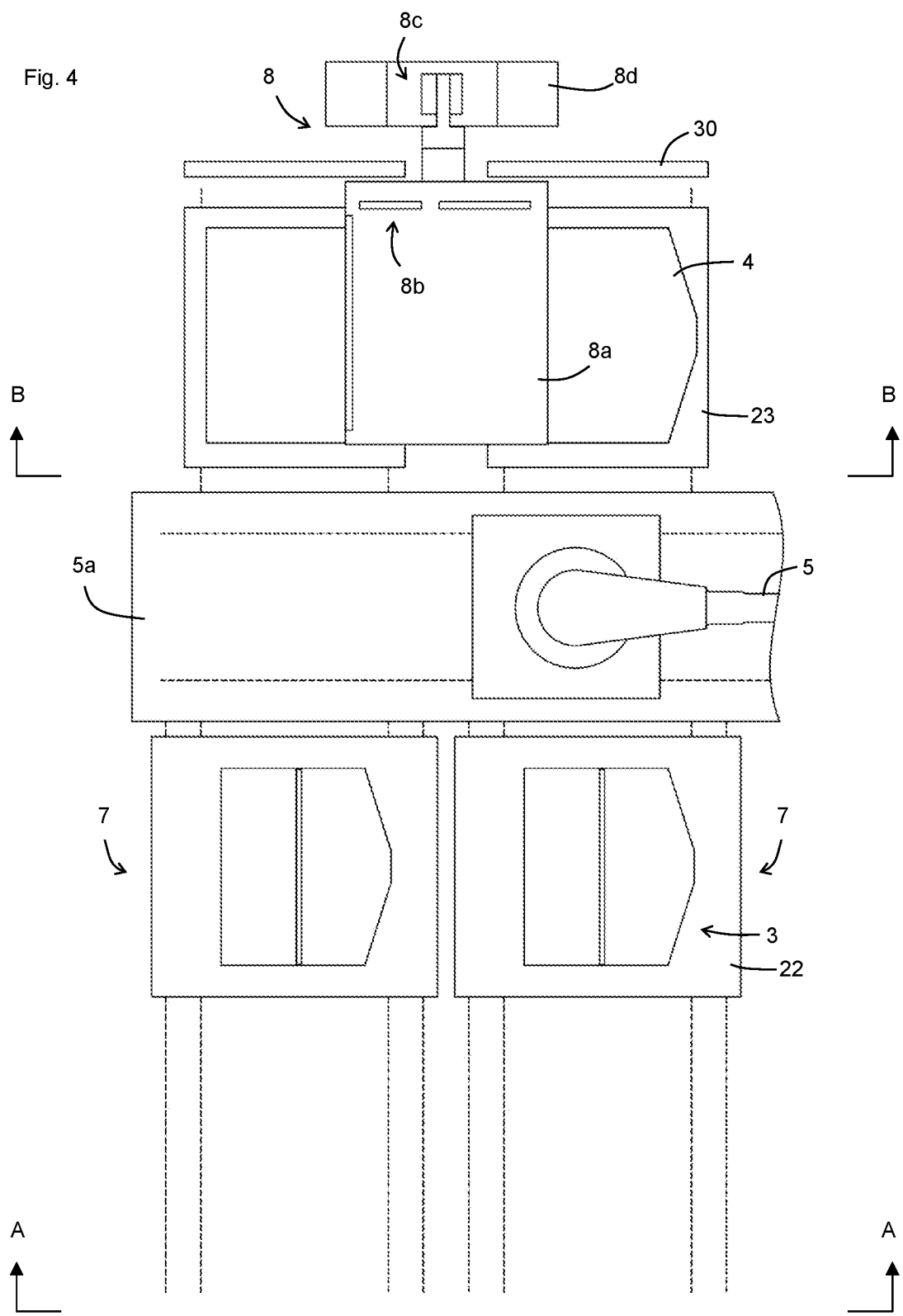
FIG. 4 is an enlarged view of the vicinity of a member supply line 7 of the manufacturing system 20.
Figure 5A:
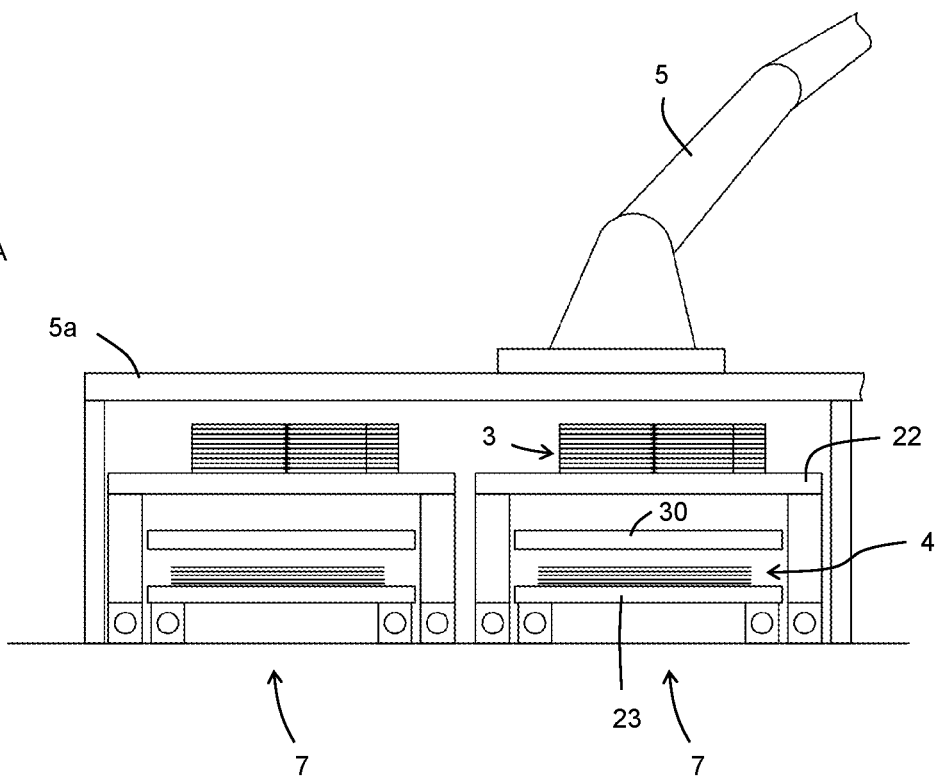
FIG. 5A and FIG. 5B are a cross-sectional view taken along a A-A line in FIG. 4 and a cross-sectional view taken along a B-B line in FIG. 4, respectively.
Figure 5B:
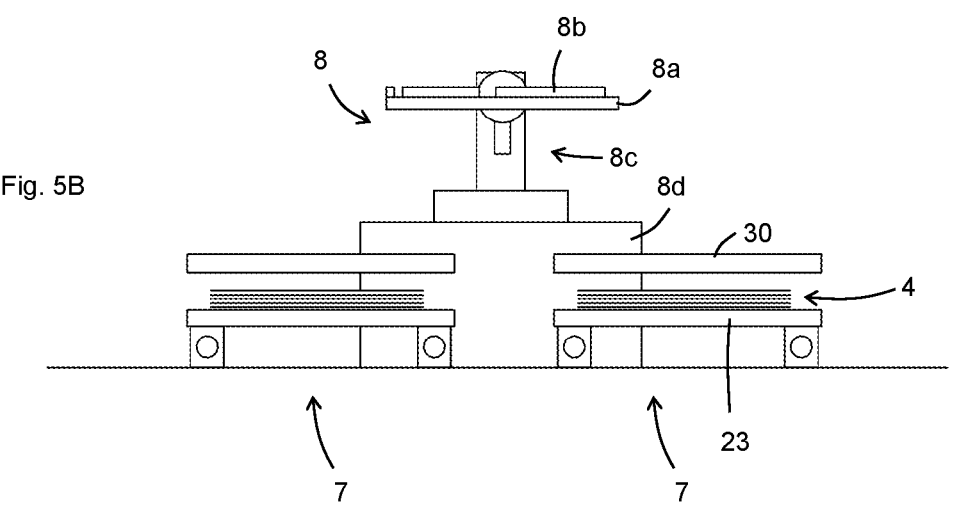

In the member replenishment step, the core material 3 and the skin material 4 are replenished by the member supply line 7. As shown in FIG. 4 to FIG. 5B, the manufacturing system 20 is provided with two equivalent member supply lines 7, and each of the member supply lines 7 is provided with a core-material conveying table 22 and a skin-material conveying table 23 that are separated in the vertical direction. The core-material conveying table 22 and the skin-material conveying table 23 are each configured to be movable along the X axis, for example, by a screw feed mechanism.

Figure 6:
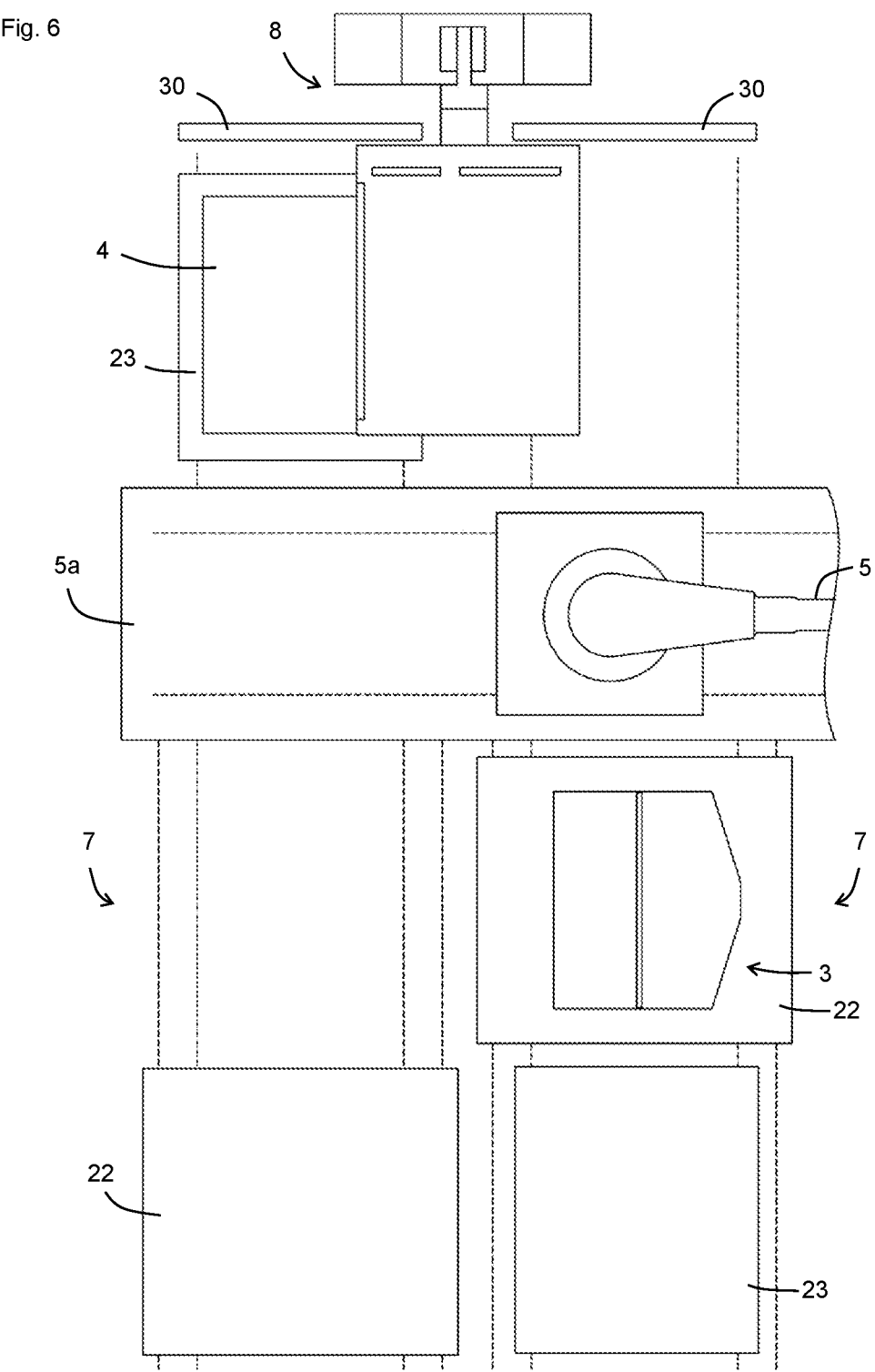
FIG. 6 is a diagram corresponding to FIG. 4 for explaining the operation of a core-material conveying table 22 and a skin-material conveying table 23.

A large number of core materials 3 are stacked and placed on the core-material conveying table 22. When the core material 3 is present on the core-material conveying table 22, the core-material conveying table 22 is arranged in a standby position shown in FIG. 4. As described below, the core materials 3 on the core-material conveying table 22 are taken out by the manipulator 5 from the top in sequence. When it is detected that there is no more core material 3 on the core-material conveying table 22, the core-material conveying table 22 moves to a replenishment position shown in FIG. 6. After the operator 21 replenishes the core materials 3 in the replenishment position, the core-material conveying table 22 returns to the standby position.

A large number of skin materials 4 are stacked and placed on the skin-material conveying table 23. When the skin material 4 is present on the skin-material conveying table 23, the skin-material conveying table 23 is arranged in a standby position shown in FIG. 4. As described below, the skin materials 4 on the skin-material conveying table 23 are taken out by the manipulator 5 from the top in sequence. When it is detected that there is no more skin material 4 on the skin-material conveying table 23, the skin-material conveying table 23 moves to a replenishment position shown in FIG. 6. After the operator 21 replenishes the skin material 4 in the replenishment position, the skin-material conveying table 23 returns to the standby position.

The core-material conveying table 22 and the skin-material conveying table 23 may be provided with a locking portion, such as a pillar, to position the core material 3 and the skin material 4 by pressing the core material 3 and the skin material 4 against this locking portion. Although the core material 3 and the skin material 4 can be positioned to some extent by this method, misalignment can easily occur and the positioning accuracy of the core material 3 and the skin material 4 is low because the core materials 3 and the skin materials 4 are each stacked. A positioning step described below is thus needed.

The skin-material conveying table 23 moves under the core-material conveying table 22. As shown in FIG. 4 and FIG. 5B, the standby position of the skin-material conveying table 23 is below a positioning table 8a of the positioning apparatus 8. Further, in a plan view, the conveying table 5a of the manipulator 5 is arranged between the standby position of the skin-material conveying table 23 and the standby position of the core-material conveying table 22. This configuration makes it possible to replenish the core material 3 and the skin material 4 and supply them to the manipulator 5 in a small space. Further, since two member supply lines 7 are provided, the supply of the members to the manipulator 5 does not stop even during the replenishment of the members on one of the lines.

2-2. Core-Material Delivery Step

In the core-material delivery step, the core material 3 on the core-material conveying table 22 is delivered to the insertion apparatus 9. The core-material delivery step includes a core-material taking-out step, a core-material positioning step, a core-material holding step, and a core-material delivery completion step.

<Core-Material Taking-Out Step>

In the core-material taking-out step (one example of the "taking-out step"), the core material 3 at the top of a core material stack (one example of the "target member stack") in which a plurality of core materials 3 (one example of the "target member") is stacked is taken out and is moved onto the positioning table 8a of the positioning apparatus 8. This step can be performed using the manipulator 5.

Figure 7A:
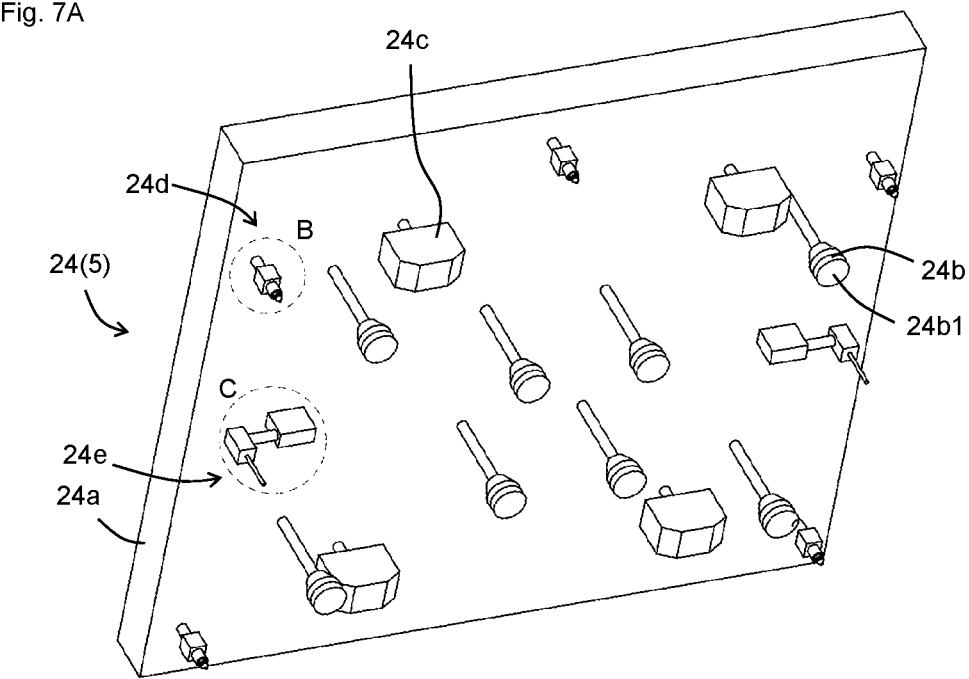
FIG. 7A is a perspective view of a head 24 of a manipulator 5.
Figure 7B:
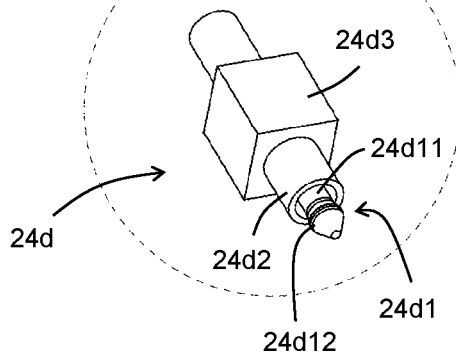
FIG. 7B and FIG. 7C are enlarged views of the region B and a region C in FIG. 7A, respectively.
Figure 7C:
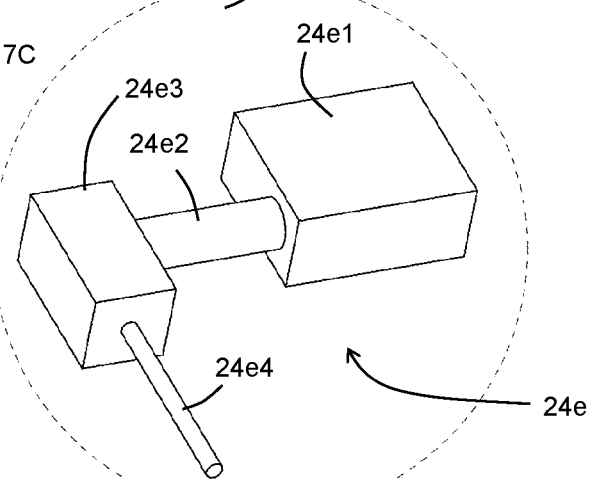

The manipulator 5 is provided with a head 24 shown in FIG. 7A to FIG. 7C at its tip. The head 24 includes a base 24a, a suction pad 24b, a needle gripper 24c, a male holding portion 24d, and a reinforcing-member positioning mechanism 24e. Each component is held by the base 24a. Details of each component will be described below as appropriate.

The suction pad 24b is used to suck and hold the core material 3. The suction pad 24b is configured such that its protrusion length from the base 24a is adjustable. The number of suction pads 24b is not particularly limited as long as the core material 3 can be held, and eight suction pads are provided in the present embodiment.

The suction pad 24b has a bellows shape and is configured to be shortened as the force applied in the direction perpendicular to a suction surface 24b1 of the suction pad 24b increases. The eight suction pads 24b suck different regions of the core material 3, and there may be a difference in height among these regions. In such a case, it is difficult to suck the region at a lower position with a conventional suction pad. In contrast, since the suction pad 24b in the present embodiment is configured to be shortened according to the force applied to the suction pad 24b, the suction pad 24b is appropriately shortened according to the height of the region sucked by the suction pad 24b when the head 24 is pressed against the core material 3, so that the core material 3 can be reliably sucked by all the suction pads 24b.

Figure 8:
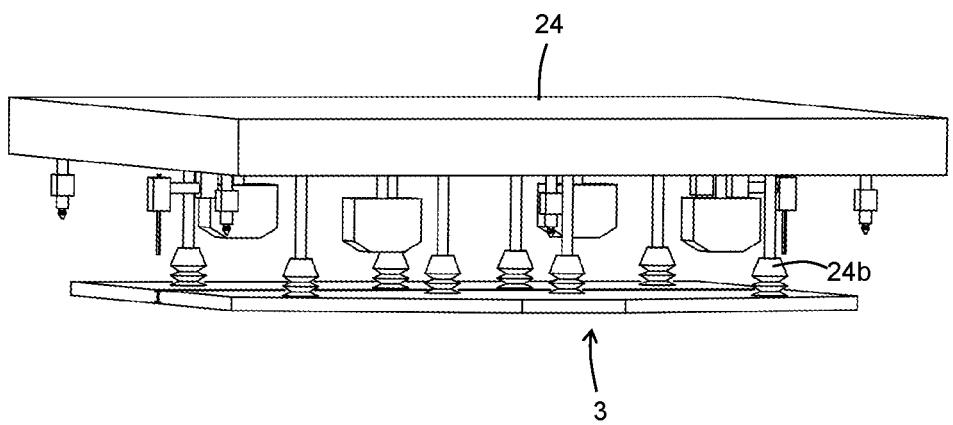
FIG. 8 is a perspective view when the core material 3 is sucked and held by the head 24.

The manipulator 5 moves the head 24 toward the core-material conveying table 22 in a state where the protrusion length of the suction pad 24b is larger than that of the other components so that components other than the suction pad 24b do not interfere with the core material 3, and then sucks and holds the core material 3 with the suction pad 24b, as shown in FIG. 8.

The core material 3 is not precisely positioned on the core-material conveying table 22 (that is, there is variation in the position of the core materials 3 on the core-material conveying table 22). The manipulator 5 is instructed in advance to suck and hold the core material 3 arranged in the standby position of the core-material conveying table 22. Consequently, the suction pad 24b sucks and holds the core material 3 without recognizing the exact position of the core material 3, and thus the position where the suction pad 24b sucks and holds the core material 3 varies slightly each time it is sucked and held. Therefore, if the core material 3 is delivered to the insertion apparatus 9 as it is, the position of the core material 3 in the insertion apparatus 9 can also vary, leading to variations in product quality. In the present embodiment, the core-material positioning step is thus performed.

<Core-Material Positioning Step>

In the core-material positioning step, the manipulator 5 and the positioning apparatus 8 are used to position the core material 3. The core-material positioning step includes a tilting step, a base-body position correction step, and a reinforcing-member position correction step. In this regard, the positioning apparatus 8 is provided with a sensor (not shown), which can detect whether the core material 3 or the skin material 4 is present on the positioning table 8a, and the core-material taking-out step can be performed again, or a warning can be issued when the absence of the material is detected.

Tilting Step

Figure 9A:
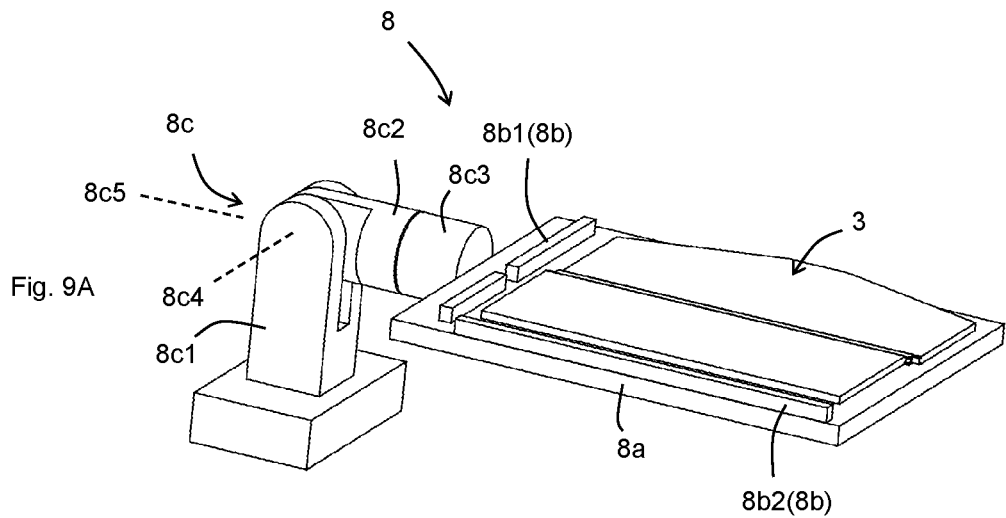
FIG. 9A shows a state where a positioning table 8a of a positioning table 8 is horizontal.

The tilting step can be performed using the positioning apparatus 8. As shown in FIG. 9A, the positioning apparatus 8 includes the positioning table 8a, a locking portion 8b, and a rotation mechanism 8c. As shown in FIG. 4, the rotation mechanism 8c is fixed on a pedestal 8d. The rotation mechanism 8c includes a base 8c1, a first rotation member 8c2, and a second rotation member 8c3. The rotation mechanism 8c includes first and second rotation mechanisms. The first rotation member 8c2 rotates about a first rotation axis 8c4 parallel to the Y axis with respect to the base 8c1 (the first rotation mechanism). The second rotation member 8c3 rotates about a second rotation axis 8c5 orthogonal to the first rotation axis 8c4 with respect to the first rotation member 8c2 (the second rotation mechanism). The rotation mechanism 8c is composed of, for example, by a two-axis robot. The positioning table 8a is connected to the second rotation member 8c3. Consequently, the positioning table 8a is driven and tilted by the rotation mechanism 8c. The locking portion 8b includes a first locking portion 8b1 and a second locking portion 8b2. The positioning apparatus 8 of such a configuration can also be used to position members (e.g., the skin material 4) whose characteristics, such as thickness and rigidity, are significantly different from those of the core material 3.

Figure 9B:
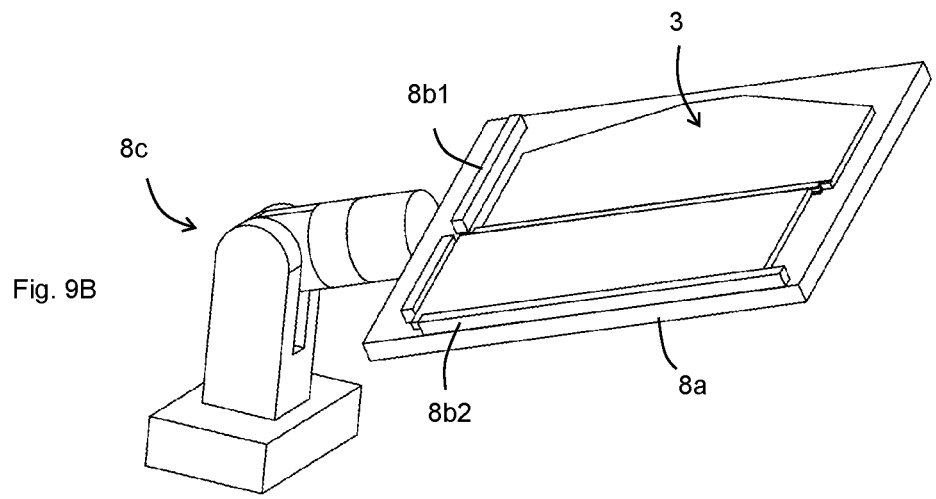
FIG. 9B shows a state where the positioning table 8a is tilted.

In the tilting step, while the core material 3 is placed on the positioning table 8a, as shown in FIG. 9A, the rotation mechanism 8c is operated to tilt the positioning table 8a, as shown in FIG. 9B, so that the core material 3 is positioned by sliding the core material 3 placed on the positioning table 8a and bringing it into contact with the locking portion 8b. Since the core material 3 does not need to be positioned with respect to the positioning table 8a at this point, the core material 3 may be placed on the positioning table 8a by dropping the core material 3 from a few millimeters above the positioning table 8a.

More specifically, in a first-rotation-axis rotating step, the positioning table 8a is rotated about the first rotation axis 8c4 to slide the core material 3 and bring it into contact with the first locking portion 8b1, and, in a second-rotation-axis rotating step, the positioning table 8a is rotated about the second rotation axis 8c5 to slide the core material 3 and bring it into contact with the second locking portion 8b2. The first and second-rotation-axis rotating steps may be performed simultaneously, or one of them may be performed first.

Base-Body Position Correction Step

The core material 3 includes the base bodies 3a, 3b and the reinforcing member 3c connecting them. The positional relationship between the base bodies 3a, 3b and the reinforcing member 3c may be misaligned, as shown in FIG. 10B, along the longitudinal direction of the reinforcing member 3c due to dimensional variations of the base bodies 3a, 3b and the like. Such a misalignment may not be eliminated by simply tilting the positioning table 8a.

Figure 10A:
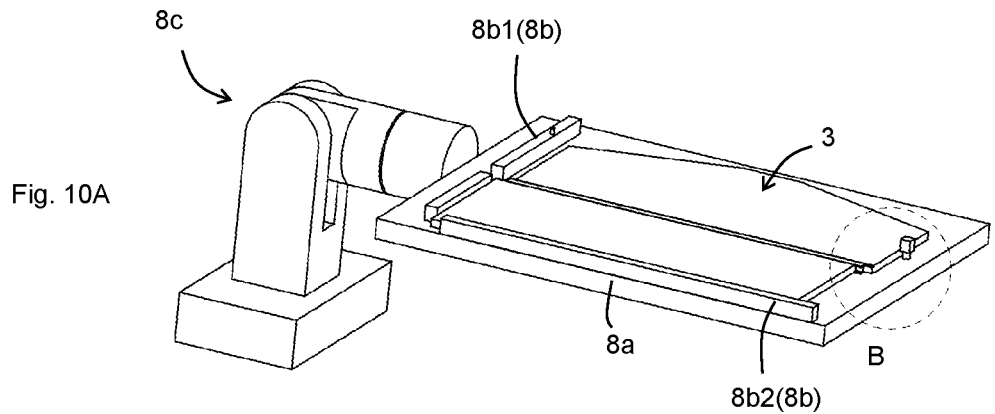
FIG. 10A is a perspective view for explaining a base-body position correction step.
Figure 10B:
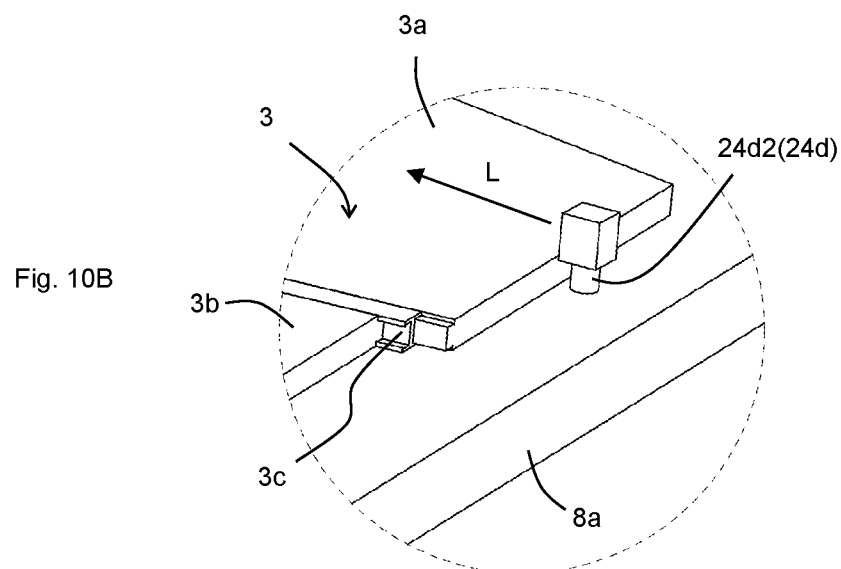
FIG. 10B is an enlarged view of a region B in FIG. 10A.

In the state of FIG. 10A and FIG. 10B, the reinforcing member 3c and the base body 3a are each misaligned in the direction away from the first locking portion 8b1. In this state, the base body 3b abuts against the first locking portion 8b1 and is accurately positioned, while the reinforcing member 3c and the base body 3a are not positioned. Therefore, it is necessary to correct the positions of the reinforcing member 3c and the base body 3a.

Therefore, in the base-body position correction step, a force in the direction of an arrow L is applied to the base body 3a, as shown in FIG. 10A and FIG. 10B, to press the base body 3a against the first locking portion 8b1, so that the misalignment of the base body 3a along the longitudinal direction of the reinforcing member 3c is corrected.

Specifically, this step can be performed by pressing the base body 3a against the first locking portion 8b1 with a tubular portion 24d2 of the male holding portion 24d shown in FIG. 7A and FIG. 7B. In this regard, the tubular portion 24d2 is a member originally used to push the skin material 4 when moving the skin material 4 from a male projection 24d1 to a female projection 9c1, as shown in FIG. 17A to FIG. 17E. A member other than the tubular portion 24d2 may be used to press the base body 3a against the first locking portion 8b1.

On the other hand, the base body 3a may abut against the first locking portion 8b1 while the base body 3b may be misaligned away from the first locking portion 8b1. In this case, the misalignment of the base body 3b along the longitudinal direction of the reinforcing member 3c can be corrected by pressing the base body 3b against the first locking portion 8b1.

In the present step, the misalignment between the base bodies 3a, 3b along the longitudinal direction of the reinforcing member 3c is corrected by the above method.

Reinforcing-Member Position Correction Step

In the reinforcing-member position correction step, the misalignment of the reinforcing member 3c with respect to the base bodies 3a, 3b is corrected. This step can be performed using the reinforcing-member positioning mechanism 24e shown in FIG. 7A and FIG. 7C.

The head 24 is provided with a pair of reinforcing-member positioning mechanisms 24e. Each of the reinforcing-member positioning mechanisms 24e includes a first base 24e1, a first rod 24e2, a second base 24e3, and a second rod 24e4. The first base 24e1 is fixed to the base 24a of the head 24. The first rod 24e2 extends along an in-plane direction of the member mounting surface 24a1 of the base 24a of the head 24, and its protrusion length from the first base 24e1 is adjustable. The second base 24e3 is fixed to the first rod 24e2. The second rod 24e4 extends along a direction perpendicular to the member mounting surface 24a1, and its protrusion length from the second base 24e3 is adjustable.

Figure 11A:
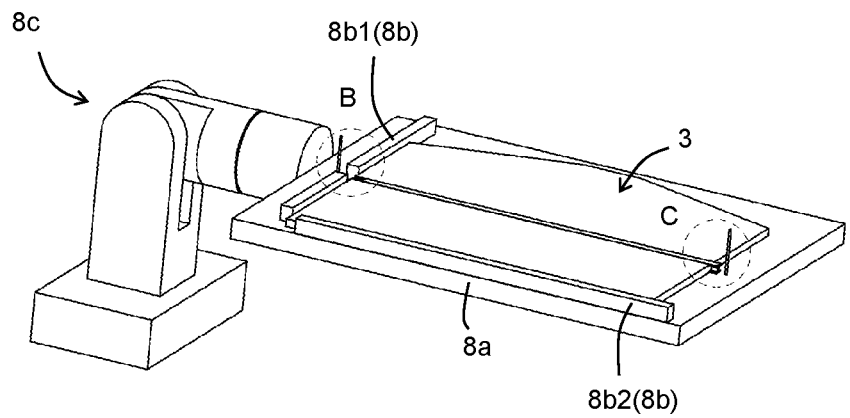
FIG. 11A is a perspective view for explaining a reinforcing-member position correction step.
Figure 11B:
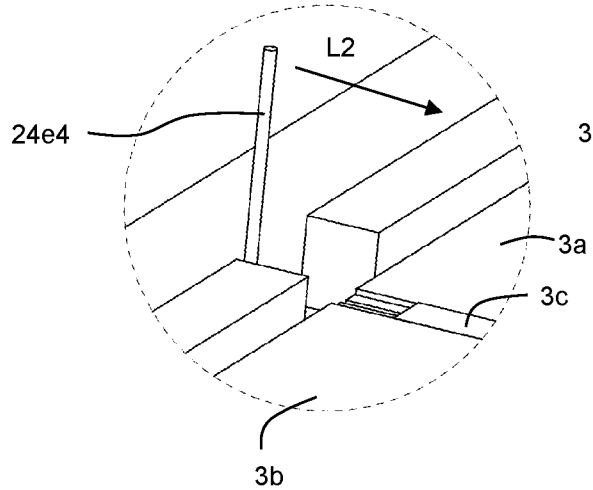
FIG. 11B and FIG. 11C are enlarged views of a region B and a region C in FIG. 11A, respectively.
Figure 11C:
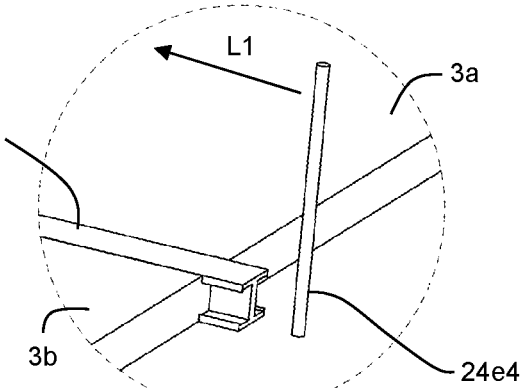

When the misalignment of the reinforcing member 3c is corrected, a pair of second rods 24e4 are moved in the directions of arrows L1 and L2 to bring the pair of second rods 24e4 closer to each other while the second rod 24e4 of the pair of reinforcing-member positioning mechanisms 24e are arranged on the extension of the longitudinal direction of the reinforcing member 3c, as shown in FIG. 11A to FIG. 11C, so that the reinforcing member 3c is sandwiched between the pair of second rods 24e4. Consequently, the reinforcing member 3c is arranged in the proper position, and the misalignment of the reinforcing member 3c with respect to the base bodies 3a, 3b is corrected.

<Core-Material Holding Step>

In the core-material holding step (one example of the "the holding step"), the core material 3 in a positioned state is held and moved by the manipulator 5. The holding and moving of the core material 3 by the manipulator 5 can be performed in the same way as in the core-material taking-out step.

<Core-Material Delivery Completion Step>

In the core-material delivery completion step, the manipulator 5 delivers the core material 3 to the insertion apparatus 9. This completes the delivery of the core material.

Figure 12A:
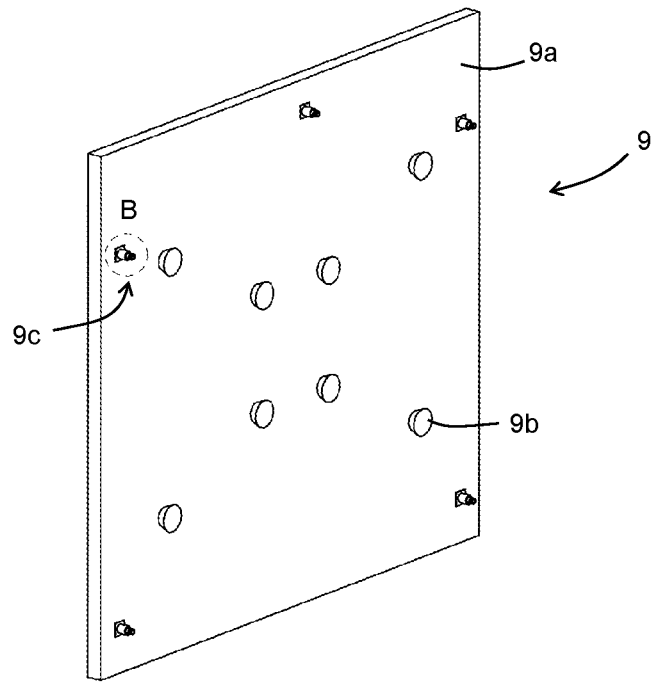
FIG. 12A is a perspective view of an insertion apparatus 9.
Figure 12B:
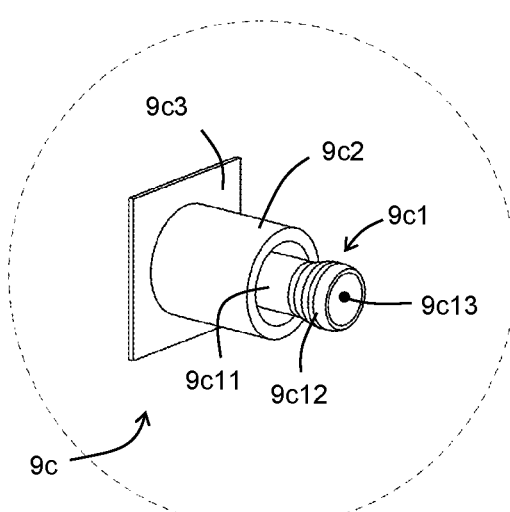
FIG. 12B is an enlarged view of the region B in FIG. 12A.

The insertion apparatus 9 is configured to be movable by a driving mechanism (not shown). As shown in FIG. 12A and FIG. 12B, the insertion apparatus 9 includes a base 9a, a suction pad 9b, and a female holding portion 9c. Each component is held by the base 9a. Details of each component will be described below as appropriate.

The suction pad 9b is used to suck and hold the core material 3. The suction pad 9b is provided at a position facing the suction pad 24b of the head 24.

Figure 13:
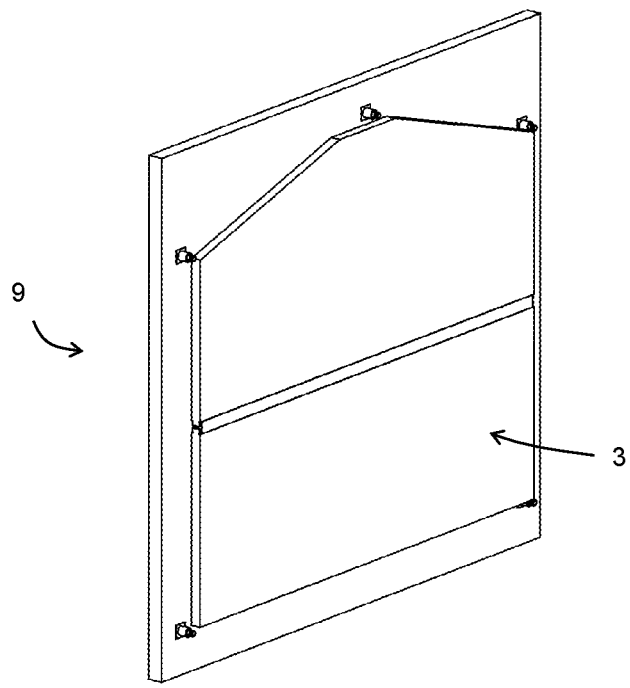
FIG. 13 is a perspective view when the core material 3 is sucked and held by the insertion apparatus 9.

While the manipulator 5 is bringing the core material 3 into contact with the suction pad 9b, suction by the suction pad 9b is started, and suction by the suction pad 24b is stopped. Consequently, the core material 3 can be delivered to the insertion apparatus 9, as shown in FIG. 13.

2-3. Skin-Material Delivery Step

In the skin-material delivery step, the skin material 4 on the skin-material conveying table 23 is delivered to the insertion apparatus 9. The skin-material delivery step includes a skin-material taking-out step, a skin-material positioning step, the skin-material holding step, and the skin-material delivery completion step.

<Skin-Material Taking-Out Step>

In the skin-material taking-out step, the skin material 4 at the top of a skin material stack in which a plurality of skin materials 4 (one example of the "target member") is stacked is taken out and is moved onto the positioning table 8a of the positioning apparatus 8. This step can be performed using the manipulator 5.

As shown in FIG. 4, when the positioning table 8a is horizontal, the positioning table 8a overlaps the skin-material conveying table 23 in a plan view. If the skin material 4 is taken out in this state, the skin material 4 may interfere with the positioning table 8a. Therefore, before the manipulator 5 holds the skin material 4, the positioning table 8a is rotated so that the positioning table 8a does not overlap the skin-material conveying table 23. In one example, the positioning table 8a can be rotated so that the positioning table 8a is perpendicular to the skin-material conveying table 23.

The needle gripper 24c provided on the head 24 of the manipulator 5 is configured to hold a breathable member, such as a non-woven fabric, by piercing it with a plurality of needles in an oblique direction. In the present embodiment, the needle gripper 24c is used to hold the skin material 4. The needle gripper 24c is configured such that its protrusion length from the base 24a is adjustable. The number of needle grippers 24c is not particularly limited as long as the skin material 4 can be held, and four needle grippers 24c are provided in the present embodiment.

The manipulator 5 moves the head 24 toward the skin-material conveying table 23, in a state where the protrusion length of the needle gripper 24c is larger than that of the other components so that components other than the needle gripper 24c do not interfere with the skin material 4, and then holds the skin material 4 by piercing it with the needles of the needle gripper 24c.

The skin material 4 is not precisely positioned on the skin-material conveying table 23, similarly to the core material 3. The skin-material positioning step described below is thus performed in the present embodiment.

<Skin-Material Positioning Step>

Figure 14:
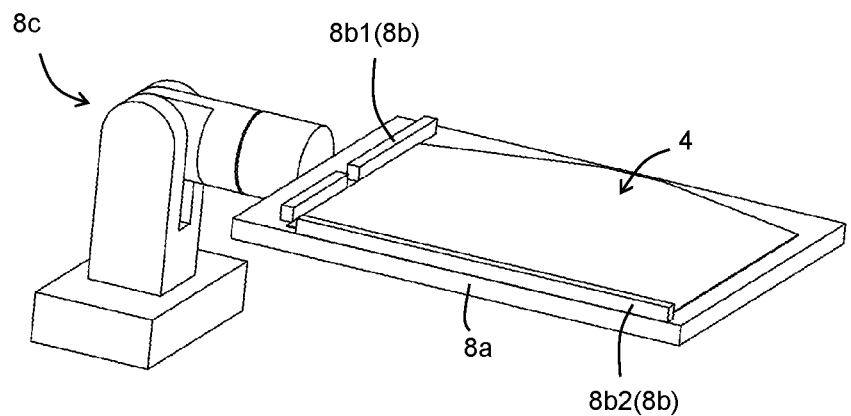
FIG. 14 is a perspective view for explaining a skin-material positioning step.

As shown in FIG. 14, in the skin-material positioning step, the skin material 4 is positioned by performing operations similar to the tilting step of the core-material positioning step.

The skin material 4 is usually manufactured by cutting a long piece of raw material that has been unwound from a web roll. Consequently, the curl of the web roll may remain on the skin material 4, and the edge of the skin material 4 may be curled. Such a phenomenon is likely to occur in a cold season (for example, when the room temperature is 20° C. or lower (particularly 15° C. or lower)). If the edge of the skin material 4 is curled, it may not be possible to properly position the skin material 4 in the tilting step for positioning the skin material.

Such curl can be alleviated by heating and softening the skin material 4. Therefore, in the present embodiment, a heating step of heating the skin material is performed before the tilting step. The heating can be performed so that the curl of the skin material 4 is relaxed to the extent that the tilting step can be properly performed. The heating step may be omitted if it is not necessary.

Further, although the heating may be performed on the entire skin material 4, it may be performed on a side in contact with the locking portion 8b because it is sufficient if there is no curl on the side in contact with the locking portion 8b shown in FIG. 14. Further, since the curl of the web roll does not occur in the longitudinal direction of the web roll, the curl is unlikely to occur on the side of the skin material 4 along the longitudinal direction of the web roll. Therefore, the heating may be performed on sides of the skin material 4 other than the side along the longitudinal direction of the web roll. Since a longer side of the skin material 4 (a side in contact with the second locking portion 8b2) corresponds to the longitudinal direction of the web roll in the present embodiment, a shorter side of the skin material 4 (a side in contact with the first locking portion 8b1) may be heated. The equipment and implementation cost for the heating step can be reduced if heating is performed for a limited area.

In the present embodiment, a heater 30 (e.g., infrared heater) is provided at a position adjacent to the standby position of the skin-material conveying table 23, as shown in FIG. 4, and the heater 30 is used to heat the skin material 4. That is, the heating is performed by heating the skin materials 4 included in the skin material stack. This makes it possible to heat the skin material 4 more efficiently than to heat the skin material 4 individually.

The heater 30 has an elongated shape and is provided along the shorter side of the skin material 4. Therefore, the shorter side of the skin material 4 is efficiently heated, and the curl on the shorter side of the skin material 4 is suppressed.

The heating may be performed by another method. For example, the skin material 4 may be heated by using a heater bult in the skin-material conveying table 23 to heat the skin-material conveying table 23. Further, an infrared heater may be arranged above the positioning table 8a, so that the skin material 4 is heated while the skin material 4 is placed on the positioning table 8a.

<Skin-Material Holding Step>

In the skin-material holding step, the skin material 4 in a positioned state is held and moved by the manipulator 5. This step can be performed using the manipulator 5.

Figure 15A:
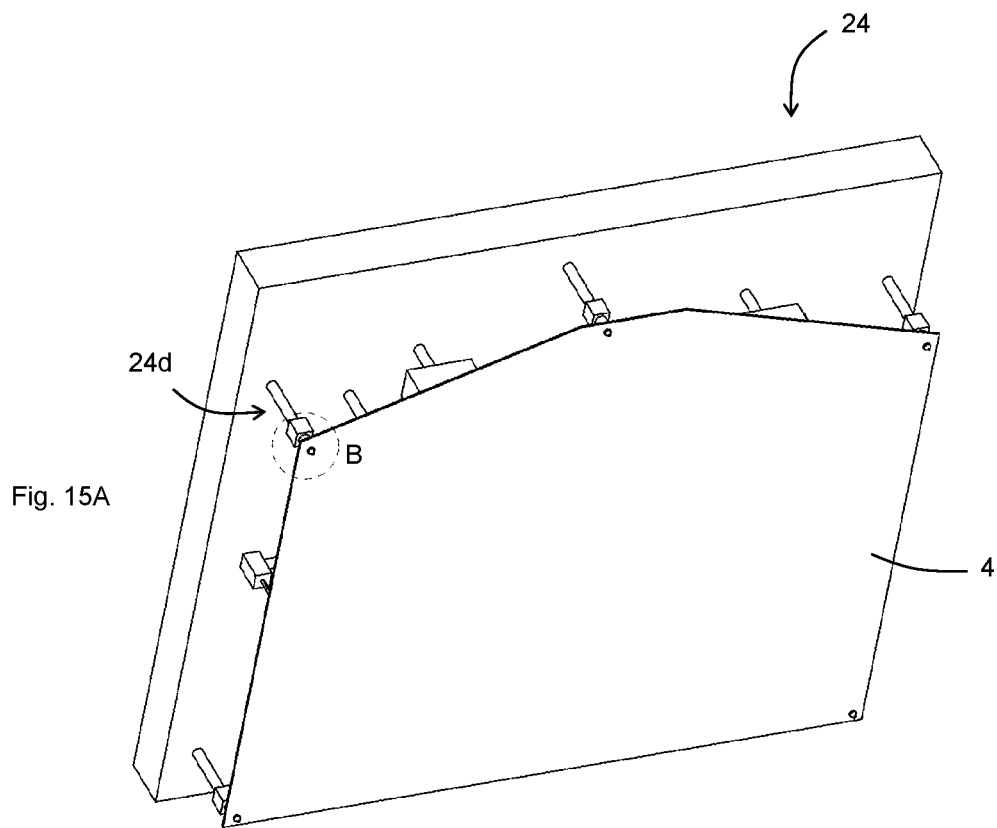
FIG. 15A is a perspective view when the skin material 4 is sucked and held by the head 24.
Figure 15B:
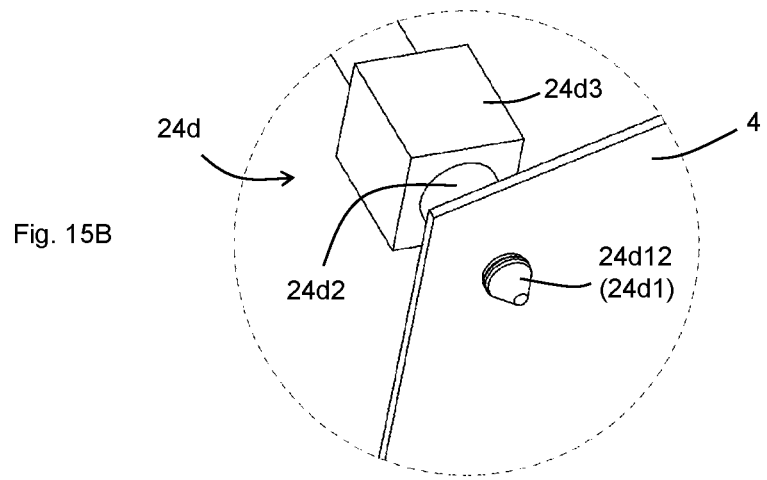
FIG. 15B is an enlarged view of a region B in FIG. 15A.

The male holding portion 24d provided on the head 24 of the manipulator 5 includes the male projection 24d1, the tubular portion 24d2, and a base 24d3, as shown in FIG. 7B. The male projection 24d1 is configured such that its protrusion length from the base 24d3 is adjustable. The male projection 24d1 includes a shaft 24d11 and a bulging portion 24d12, and the bulging portion 24d12 is tapered toward the tip. As shown in FIG. 15A and FIG. 15B, the male projection 24d1 is inserted through the skin material 4, and the skin material 4 is locked by the bulging portion 24d12, so that the skin material 4 can be held by the male holding portion 24d. The tubular portion 24d2 is configured such that its protrusion length from the base 24d3 is adjustable. The male projection 24d1 is arranged in the tubular portion 24d2 and is movable relative to the tubular portion 24d2.

The male holding portion 24d is arranged at a position slightly outside the outer circumference of the core material 3 so as not to interfere with the core material 3. The number of male holding portions 24d is not particularly limited as long as the skin material 4 can be held, and four male holding portions 24d are provided in the present embodiment.

The skin material 4 is provided with a slit-shaped opening at a position facing the male projection 24d1, so that the male projection 24d1 can be easily inserted through the skin material 4.

The manipulator 5 moves the head 24 toward the positioning table 8a, pierces the skin material 4 with the needles of the needle gripper 24c, and inserts the male projection 24d1 through the skin material 4 to hold the skin material 4, as shown in FIG. 15B. The positioning table 8a is provided with a concave portion at a position facing the male projection 24d1 to avoid interference between the male projection 24d1 and the positioning table 8a.

<Skin-Material Delivery Completion Step>

In the skin-material delivery completion step, the manipulator 5 delivers the skin material 4 to the insertion apparatus 9. This completes the delivery of the skin material 4.

The female holding portion 9c provided on the insertion apparatus 9 includes the female projection 9c1, a tubular portion 9c2, and a base 9c3, as shown in FIG. 12B. The female projection 9c1 is configured such that its protrusion length from the base 9c3 is adjustable. The female projection 9c1 includes a shaft 9c11 and a bulging portion 9c12, and a concave portion 9c13 that can be engaged with a tip of the male projection 24d1 is provided at a tip of the bulging portion 9c12. The concave portion 9c13 preferably has a shape complementary to the tip of the male projection 24d1.

Figure 17A:
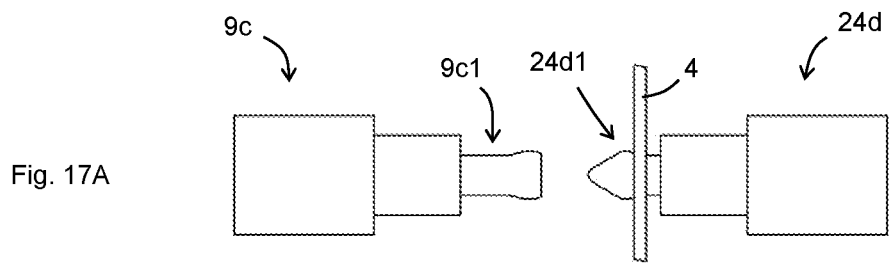
FIG. 17A to FIG. 17E are elevation views for explaining a step of delivering the skin material 4 from a male holding portion 24d to a female holding portion 9c.
Figure 17B:
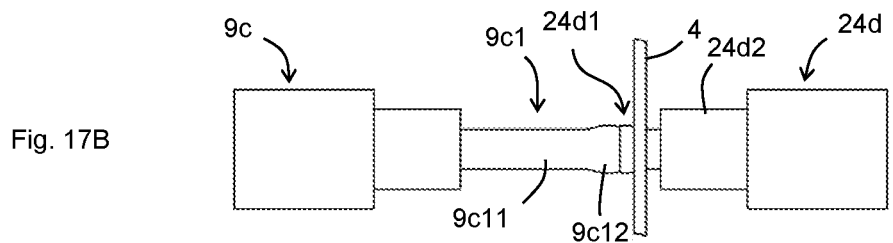
Figure 17C:
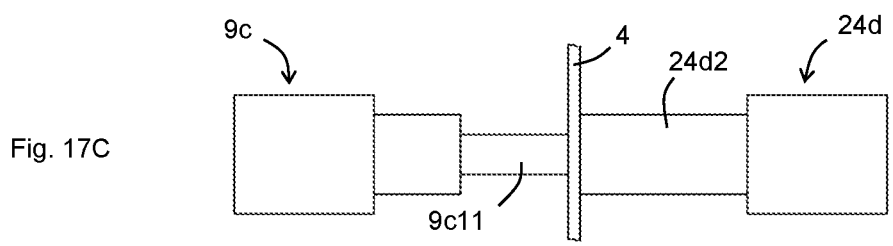
Figure 17D:
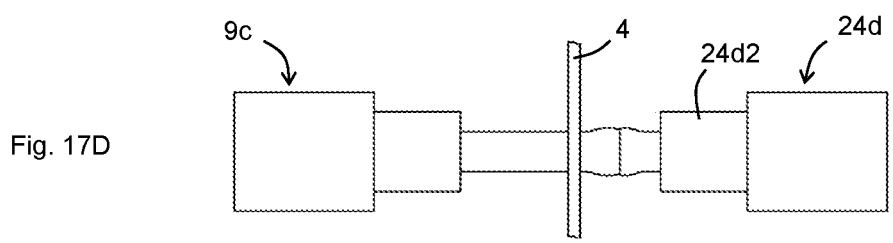
Figure 17E:
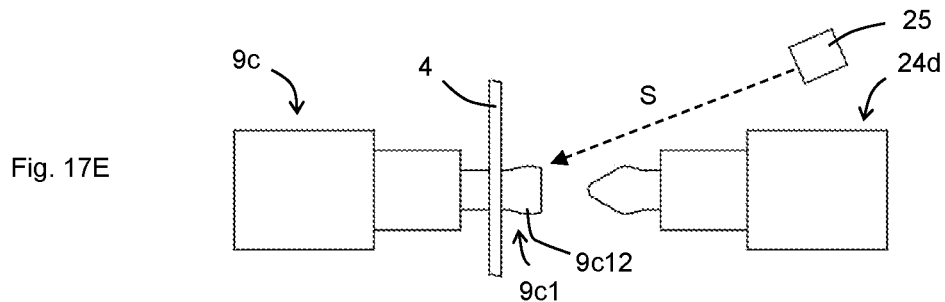

As shown in FIG. 17E, the female projection 9c1 is inserted through the skin material 4, and the skin material 4 is locked by the bulging portion 9c12, so that the skin material 4 can be held by the female holding portion 9c. The tubular portion 9c2 is configured such that its protrusion length from the base 9c3 is adjustable. The female projection 9c1 is arranged in the tubular portion 9c2 and is movable relative to the tubular portion 9c2. The female holding portion 9c is provided at a position facing the male holding portion 24d.

The delivery of the skin material 4 is specifically performed by the method described below.

Figure 16A:
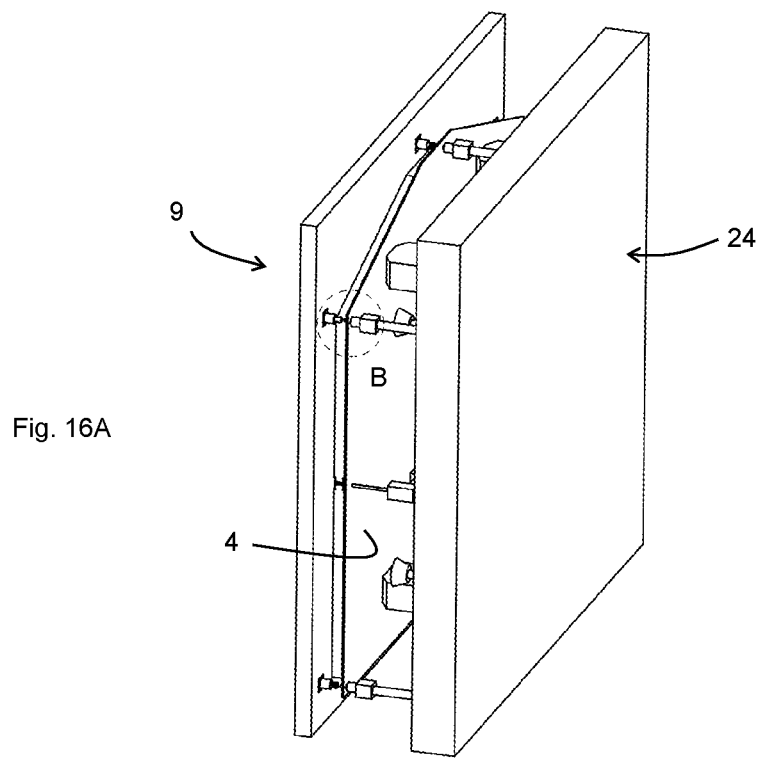
FIG. 16A is a perspective view for explaining a step of delivering the skin material 4 from the head 24 to the insertion apparatus 9.
Figure 16B:
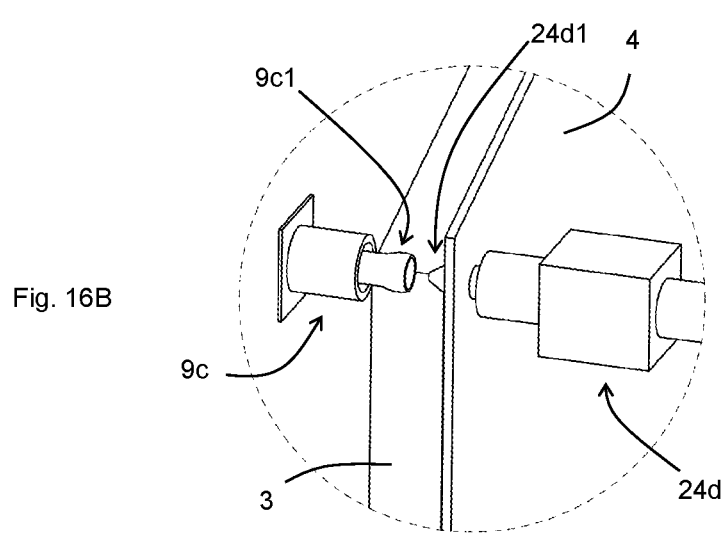
FIG. 16B is an enlarged view of a region B in FIG. 16A.

First, as shown in FIG. 16A, FIG. 16B, and FIG. 17A, the male projection 24d1 is opposed to the female projection 9c1 while the skin material 4 is held by the male projection 24d1.

Next, as shown in FIG. 17B, the tip of the male projection 24d1 is engaged with the concave portion 9c13 of the female projection 9c1. Consequently, the male projection 24d1 and the female projection 9c1 are positioned with high accuracy. In this regard, although the protrusion length of the female projection 9c1 is increased in FIG. 17B, the protrusion length of the male projection 24d1 may be increased for the engagement described above.

Next, as shown in FIG. 17C, the skin material 4 is moved to the shaft 9c11 by pressing the skin material 4 with an end surface of the tubular portion 24d2. Although the skin material 4 is pressed by the end surface of the tubular portion 24d2 by increasing the protrusion length of the tubular portion 24d2 in FIG. 17C, the skin material 4 may be pressed by the end surface of the tubular portion 24d2 by decreasing the protrusion length of the male projection 24d1 and increasing the protrusion length of the female projection 9c1.

Next, the tubular portion 24d2 is separated from the skin material 4, as shown in FIG. 17D.

Next, the female projection 9c1 is separated from the male projection 24d1, as shown in FIG. 17E. This completes the delivery of the skin material 4.

In this regard, a sensor 25 is provided to confirm that the skin material 4 has been delivered. The sensor 25 irradiates a portion where the female projection 9c1 is inserted through the skin material 4 with light, as shown with an arrow S, and detects, based on the reflected light, whether the female projection 9c1 is inserted through the skin material 4.

2-4. Molding Step

Figure 18:
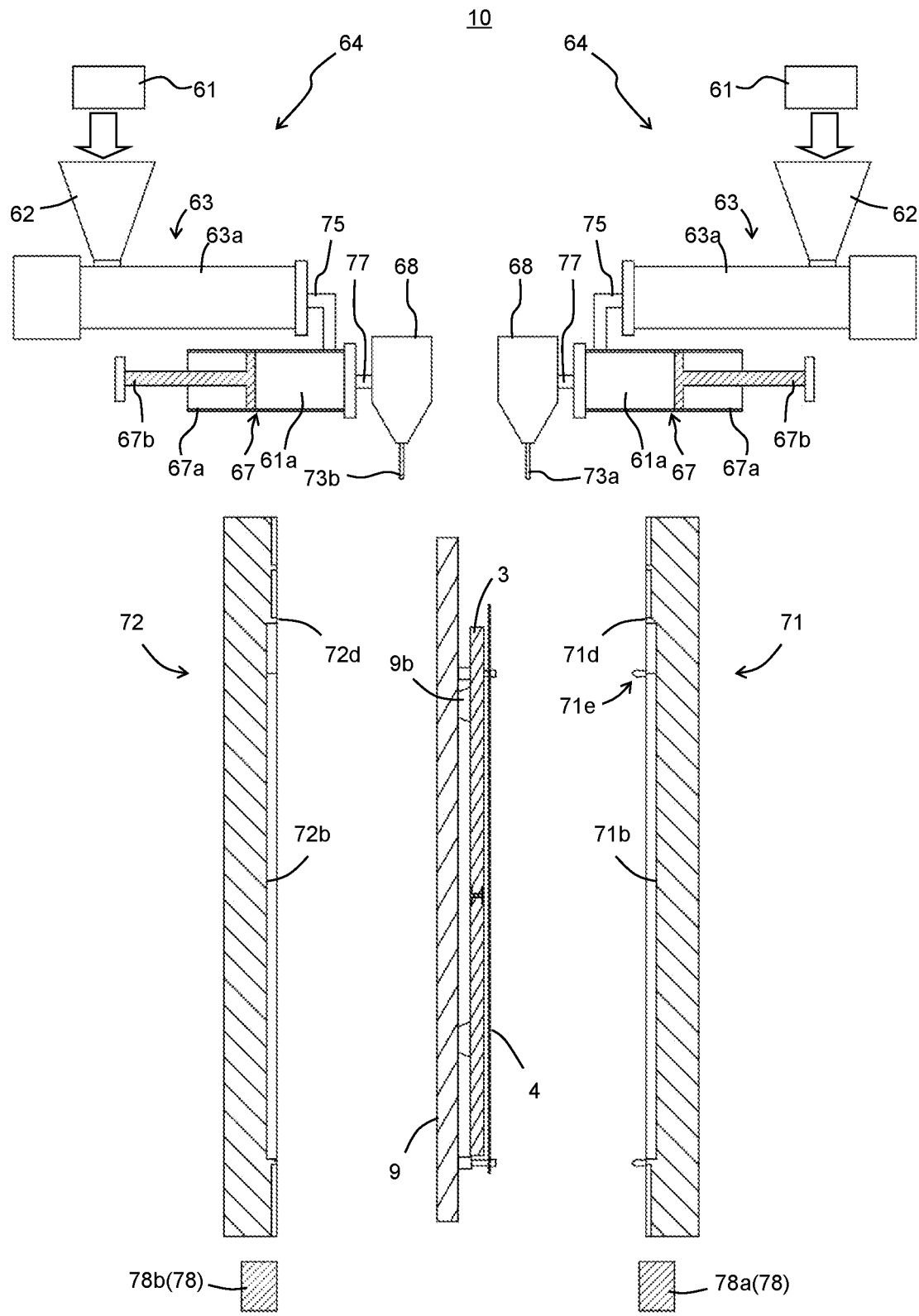
FIG. 18 is an elevation view showing the configuration of the molding machine 10 (molds 71, 72 and members in the vicinity thereof are shown in a cross-sectional view).
Figure 19A:
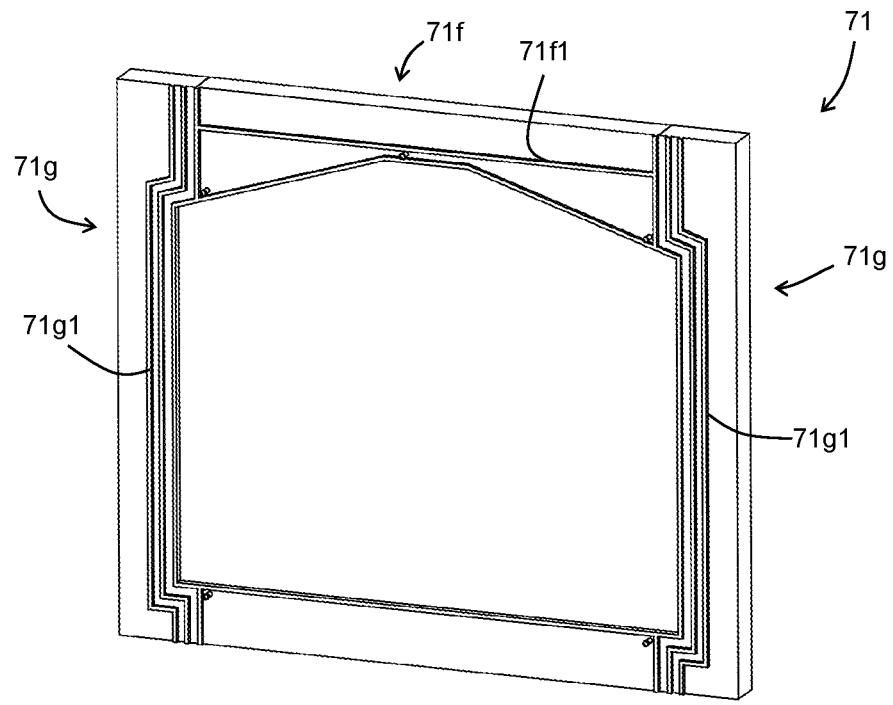
FIG. 19A is a perspective view of the mold 71.
Figure 19B:
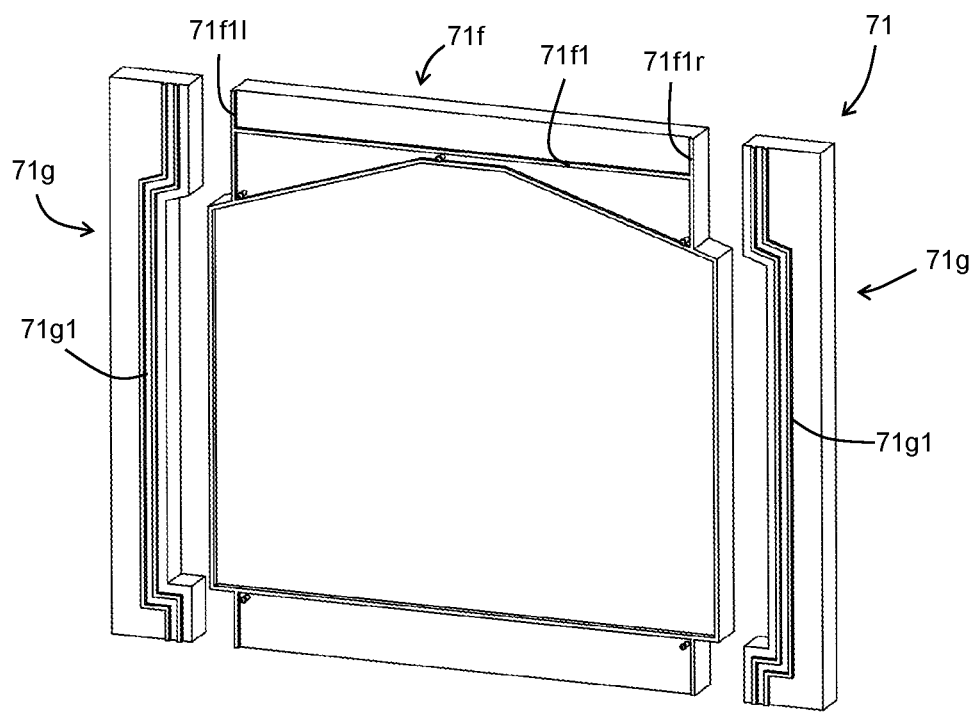
FIG. 19B is an exploded perspective view of the mold 71.
Figure 20:
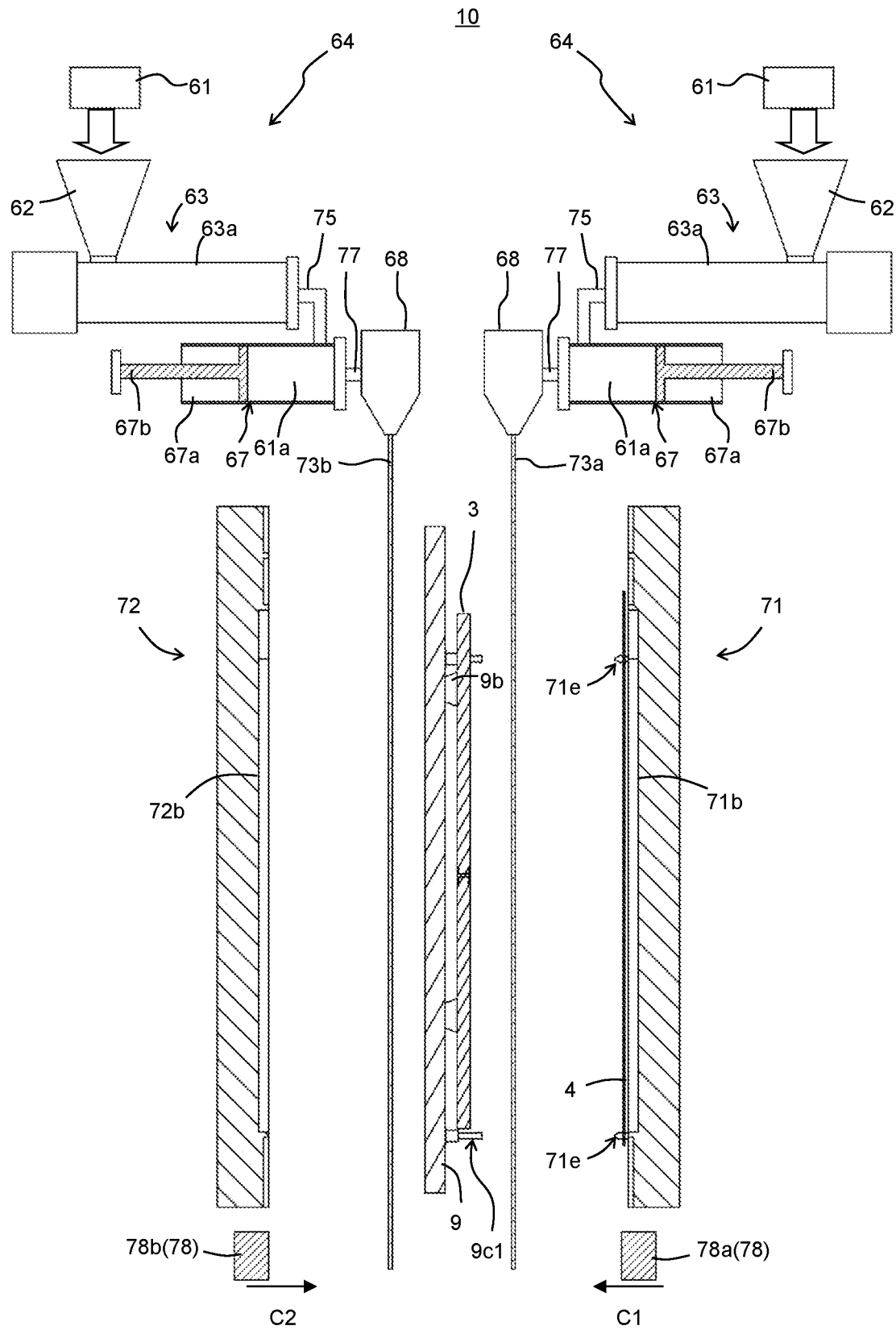
FIG. 20 is a diagram corresponding to FIG. 18 for explaining a molding step.
Figure 21:
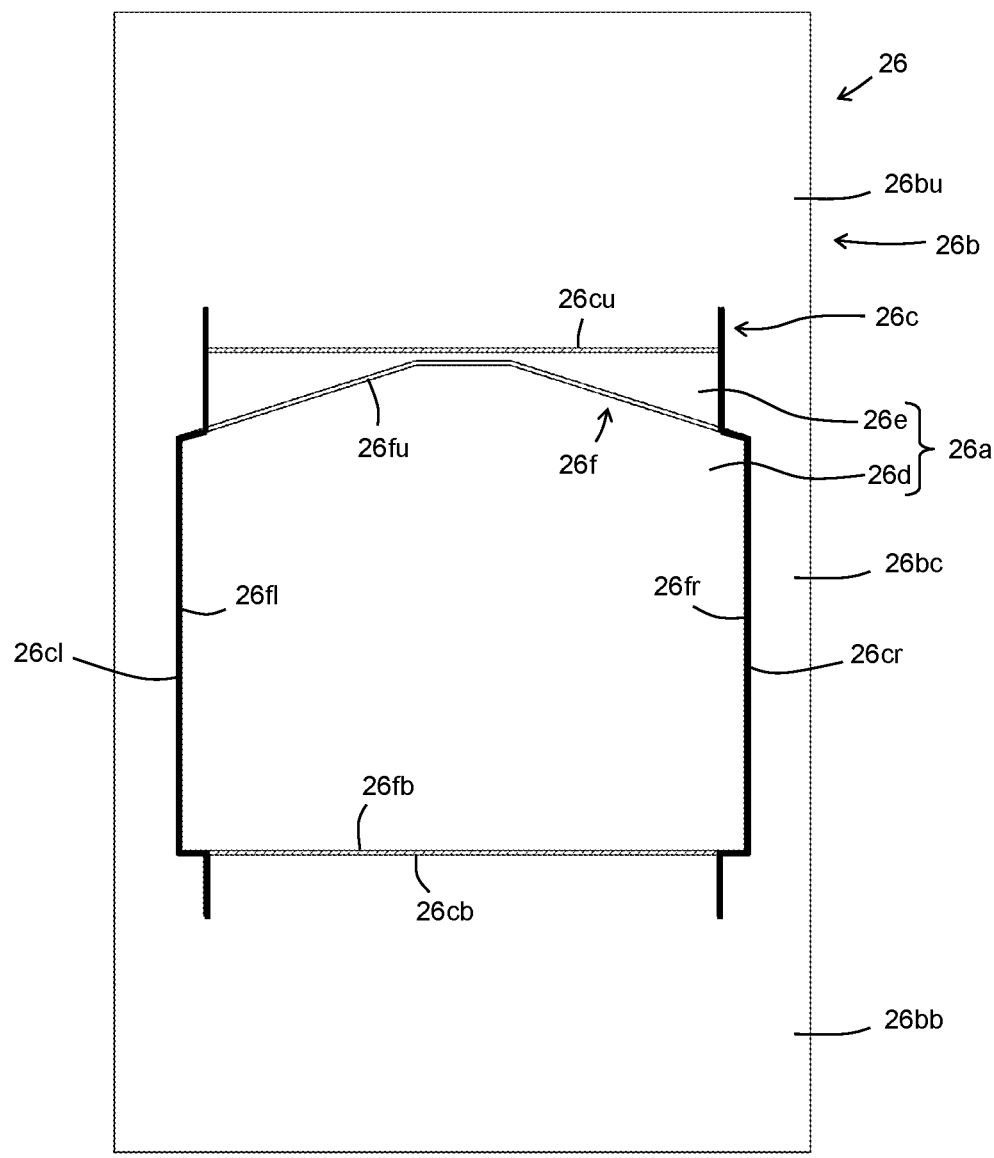
FIG. 21 is an elevation view of a molded body 26.

As shown in FIG. 18 to FIG. 22B, in the molding step, the molding machine 10 and the insertion apparatus 9 are used to mold the molded body 26 shown in FIG. 21. As shown in FIG. 18, the molding machine 10 includes a pair of sheet forming devices 64, first and second molds 71, 72, and a lower burr clamping device 78.

<Molded Body 26>

As shown in FIG. 21, the molded body 26 is configured by connecting the molded main body 26a and the large burr 26b (one example of the "burr") via a cutting line 26c provided to surround the molded main body 26a. Therefore, the molded body 26 can be separated into the molded main body 26a and the large burr 26b by cutting the molded body 26 along the cutting line 26c over the entire circumference of the molded main body 26a.

The cutting line 26c includes a left line 26c1, a right line 26cr, an upper line 26cu, and a lower line 26cb. The left line 26c1 and the right line 26cr are shown in bold lines in FIG. 21. The left line 26c1, the right line 26cr, the upper line 26cu, and the lower line 26cb are located on a left side, right side, upper side, and lower side of the molded main body 26a, respectively, when the molded body 26 is viewed from the mold closing direction (an arrow C2) of the mold 72 shown in FIG. 20.

In the present embodiment, a first cutting step of cutting the molded body 26 along the right line 26cr and the left line 26c1 by the molds 71, 72 is performed, and a second cutting step of cutting the molded body 26 along a remaining part of the cutting line 26c (that is, the upper line 26cu and the lower line 26cb) is performed after taking out the molded body 26 from the molds 71, 72.

Since the first cutting step can be performed in a shorter time than the second cutting step, the time required for the cutting step can be shortened by cutting the molded body 26 along a portion of the cutting line 26c by the molds 71, 72 in the first cutting step.

The molded main body 26a is configured by connecting a molded product 26d (corresponding to the resin panel 1) and a small burr 26e via a parting line 26f. Therefore, the molded product 26d and the small burr 26e can be separated by cutting the molded main body 26a along the parting line 26f over the entire circumference of the molded product 26d.

The parting line 26f includes a left line 26fl, a right line 26fr, an upper line 26fu, and a lower line 26fb. The left line 26fl, the right line 26fr, the upper line 26fu, and the lower line 26fb are located on a left side, right side, upper side, and lower side of the molded main body 26a, respectively, when the molded body 26 is viewed from the mold closing direction (an arrow C2) of the mold 72 shown in FIG. 20.

The left line 26c1 and the right line 26cr of the cutting line 26c include the left line 26fl and the right line 26fr of the parting line 26f, respectively. The lower line 26cb of the cutting line 26c overlaps the lower line 26fb of the parting line 26f.

On the other hand, the upper line 26cu of the cutting line 26c is provided at a position adjacent to an upper side of the upper line 26fu (one example of the "adjacent line") of the parting line 26f. Therefore, the molded product 26d and the small burr 26e are connected via the upper line 26fu.

Since the upper line 26fu of the parting line 26f is non-linear, it is time-consuming to cut the molded body 26 with a cutter along the upper line 26fu. In the present embodiment, the straight upper line 26cu is provided at a position adjacent to the upper side of the upper line 26fu, and the molded body 26 is cut along the upper line 26cu in the second cutting step. Consequently, the time required for the second cutting step is shortened.

In order to obtain the molded product 26d, it is necessary to perform a third cutting step of cutting the molded main body 26a along the upper line 26fu. However, the third cutting step can be performed after moving the molded main body 26a from the holding apparatus 13 to another place. Therefore, the time required for the second cutting step performed on the holding apparatus 13 directly affects the cycle time. In other words, the process on the holding apparatus 13 is the bottleneck of the manufacturing cycle, and reducing the time required for this process leads to a reduction in the cycle time. For this reason, the cycle time can be shortened by reducing the time for the second cutting step and performing the third cutting step outside the holding apparatus 13.

In this regard, the lower line 26cb of the cutting line 26c may be provided below the lower line 26fb of the parting line 26f. While the cutting of the molded body 26 along the parting line 26f needs to be performed slowly and carefully so as not to damage the molded main body 26a, the cutting speed along the lower line 26cb in the second cutting step can be increased by providing the lower line 26cb below the lower line 26fb.

<Configuration of Sheet Forming Device 64>

As shown in FIG. 18, the sheet forming device 64 includes a hopper 62, an extruder 63, an accumulator 67, and the T-die 68. The extruder 63 and the accumulator 67 are connected via a connecting pipe 75. The accumulator 67 and the T-die 68 are connected via a connecting pipe 77. Details of each component will be described below.

Hopper 62, Extruder 63

The hopper 62 is used to feed raw resin 61 into a cylinder 63a of the extruder 63. The form of the raw resin 61 is not particularly limited and is usually in the form of pellets. The raw resin is, for example, a thermoplastic resin, such as polyolefin, and examples of the polyolefin include low-density polyethylene, linear low-density polyethylene, high-density polyethylene, polypropylene, ethylene-propylene copolymer, and a mixture thereof. The raw resin 61 may contain recycled raw material produced by pulverizing the large burr 26b in the pulverizer 18. The raw resin 61 is fed into the cylinder 63a from the hopper 62 and is heated and melted in the cylinder 63a to become molten resin. Further, the raw resin is further conveyed toward a tip of the cylinder 63a by the rotation of a screw pump arranged inside the cylinder 63a. The screw pump is arranged inside the cylinder 63a, and the molten resin is kneaded and conveyed by its rotation. A gear device is provided at a proximal end of the screw pump, and the screw pump is rotationally driven by the gear device.

Accumulator 67, T-die 68

The raw resin is extruded from a resin extrusion port of the cylinder 63a and is injected into the accumulator 67 through the connecting pipe 75. The accumulator 67 includes a cylinder 67a and a piston 67b slidable inside the cylinder, and molten resin 61a can be stored in the cylinder 67a. The piston 67b is moved after a predetermined of the molten resin 61a is stored in the cylinder 67a, so that the molten resin 61a is extruded and hung down from a slit provided in the T-die 68 through the connecting pipe 77 to form first and second resin sheets 73a, 73b in a molten state.

<Configuration of Molds 71, 72 and Lower Burr Clamping Device 78>

The resin sheets 73a, 73b are guided between the molds 71, 72. The molds 71, 72 can be divided by a parting surface on which the molds come into contact with each other in a closed state, and the molded body 26 are formed by the molds 71, 72. That is, in the molding step, a pair of molds 71, 72 that are divisible are used to form the molded body 26.

The mold 71 is provided with a large number of decompression suction holes (not shown), and the resin sheet 73a can be suctioned under reduced pressure to be formed into a shape along an inner surface 71b of a cavity of the mold 71. A pinch-off portion 71d is provided to surround the cavity.

The mold 71 includes a male projection 71e configured in the same way as the male projection 24d1. The male projection 71e is provided at a position facing the female projection 9c1. The male projection 71e can be slid with respect to the mold 71 to be accommodated in the mold 71.

As shown in FIG. 19A and FIG. 19B, the mold 71 includes a main body portion 71f and a pair of movable portions 71g that can be moved relative to the main body portion 71f. The main body portion 71f is provided with a projection 71f1 corresponding to the cutting line 26c and the parting line 26f. The movable portion 71g is provided with a projection 71g1 that can be engaged with the resin sheets 73a, 73b. The projection 71f1 includes a left-line projection 71fl1 and a right-line projection 7f1r along the left line 26c1 and the right line 26cr of the cutting line 26c. The movable portion 71g is separated from the main body portion 71f along an outer edge of the left-line projection 71fl1 and the right-line projection 7f1r.

The mold 72 is provided with a large number of decompression suction holes (not shown), and the resin sheet 73b can be suctioned under reduced pressure to be formed into a shape along an inner surface 72b of a cavity of the mold 72. A pinch-off portion 72d is provided to surround the cavity.

As shown in FIG. 18, the lower burr clamping device 78 is arranged below the molds 71, 72 and comprises clamping members 78a, 78b. The clamping members 78a, 78b are configured to be movable in the same direction as the opening and closing direction of the molds 71, 72, respectively. When the molded body 26 is taken out from the molds 71, 72, the lower burr clamping device 78 clamps a lower burr 26bb (see FIG. 23) between the clamping members 78a, 78b to position the molded body 26 at the center between the molds 71, 72, because the molded body 26 cannot be smoothly taken out if it is still fitted in one of the molds.

<Details of Molding Step>

Next, the molding step will be described with reference to FIG. 18 to FIG. 21. The molding step includes a skin-material attaching step, a hanging step, a shaping step, a core-material welding step, and a mold closing step.

Skin-Material Attaching Step

In the skin-material attaching step, the skin material 4 held by the female projection 9c1 of the insertion apparatus 9 is moved to the male projection 71e of the mold 71 to attach the skin material 4 to the mold 71.

This movement can be performed in the same manner as the movement of the skin material 4 from the male projection 24d1 to the female projection 9c1 (see FIG. 17A to FIG. 17E). That is, the female projection 9c1 and the male projection 71e are placed to face each other and then engaged with each other. In this state, the skin material 4 can be moved to the shaft of the male projection 71e by pushing the skin material 4 with an end surface of the tubular portion 9c2.

Hanging Step

In the hanging step, the resin sheets 73a, 73b formed by extruding and hanging down the molten resin 61a from the slit of the T-die 68 are hung between the molds 71, 72, as shown in FIG. 20. The resin sheet 73a is hung between the core material 3 and the skin material 4. The resin sheet 73b is hung between the insertion apparatus 9 and the mold 72. In the present embodiment, direct vacuum forming is performed by directly using the resin sheets 73a, 73b extruded from the T-die 68. Therefore, the resin sheets 73a, 73b are not cooled to room temperature and solidified before molding, and there is no need to heat the solidified resin sheets 73a, 73b before molding.

Shaping Step

In the shaping step, the resin sheets 73a, 73b are sucked under reduced pressure by the molds 71, 72 to shape the resin sheets 73a, 73b. The resin sheet 73a is shaped by the mold 71 along the outer shape of the inner surface 71b of the cavity. The resin sheet 73b is shaped along the inner surface 72b of the cavity. The resin sheets 73a, 73b may be shaped at different times. For example, the resin sheet 73b may be shaped after the core-material welding step, or the resin sheet 73b may be shaped during a mold clamping step.

It is preferable to slide the male projection 71e and accommodate it in the mold 71 after the shaping step and before the mold closing step. This can prevent the male projection 71e from interfering with the mold 72. The sliding movement of the male projection 71e is preferably performed before the core-material welding step. This can prevent interference between the holding apparatus 13 and the male projection 71e.

Core-Material Welding Step

In the core-material welding step, the core material 3 is welded to the resin sheet 73a. The core material 3 can be welded to the resin sheet 73a by moving the insertion apparatus 9 toward the resin sheet 73a. After the core material 3 is welded to the resin sheet 73a, the insertion apparatus 9 is moved to a position outside the movement path of the molds 71, 72

The timing of arranging the core material 3 between the resin sheets 73a, 73b is not particularly limited, and it may be arranged between the resin sheets 73a, 73b in the hanging step or the shaping step. Further, the core material 3 may be welded to the resin sheet 73b first.

Mold Closing Step

In the mold closing step, the molds 71, 72 are moved in the directions of arrows C1, C2 in FIG. 20 to close the molds 71, 72. Consequently, the resin sheets 73a, 73b are compressed and welded at portions corresponding to the projection 71f1 and 71g1 to form the molded body 26 shown in FIG. 21.

<Details of First Cutting Step>

The first cutting step will be described with reference to FIG. 19A, FIG. 19B, FIG. 21, FIG. 22A, and FIG. 22B.

Figure 22A:
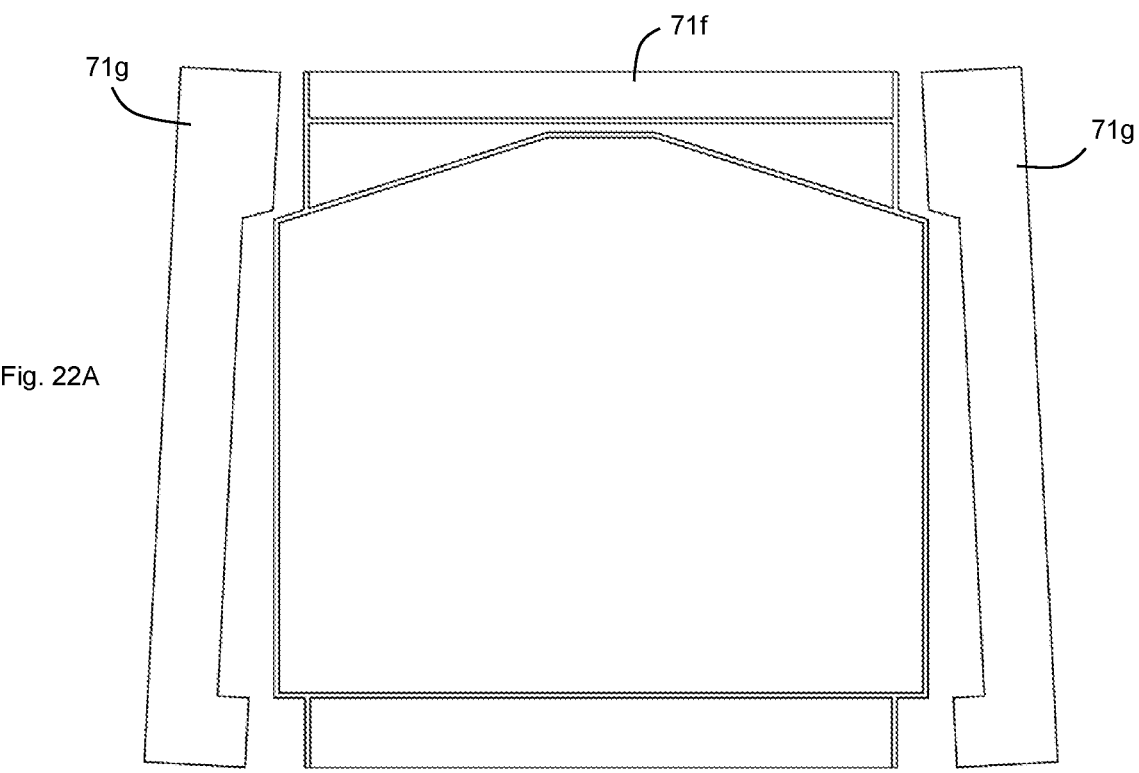
FIG. 22A and FIG. 22B are elevation views showing the operation of a movable portion 71g when a first cutting step is performed by the mold 71.
Figure 22B:
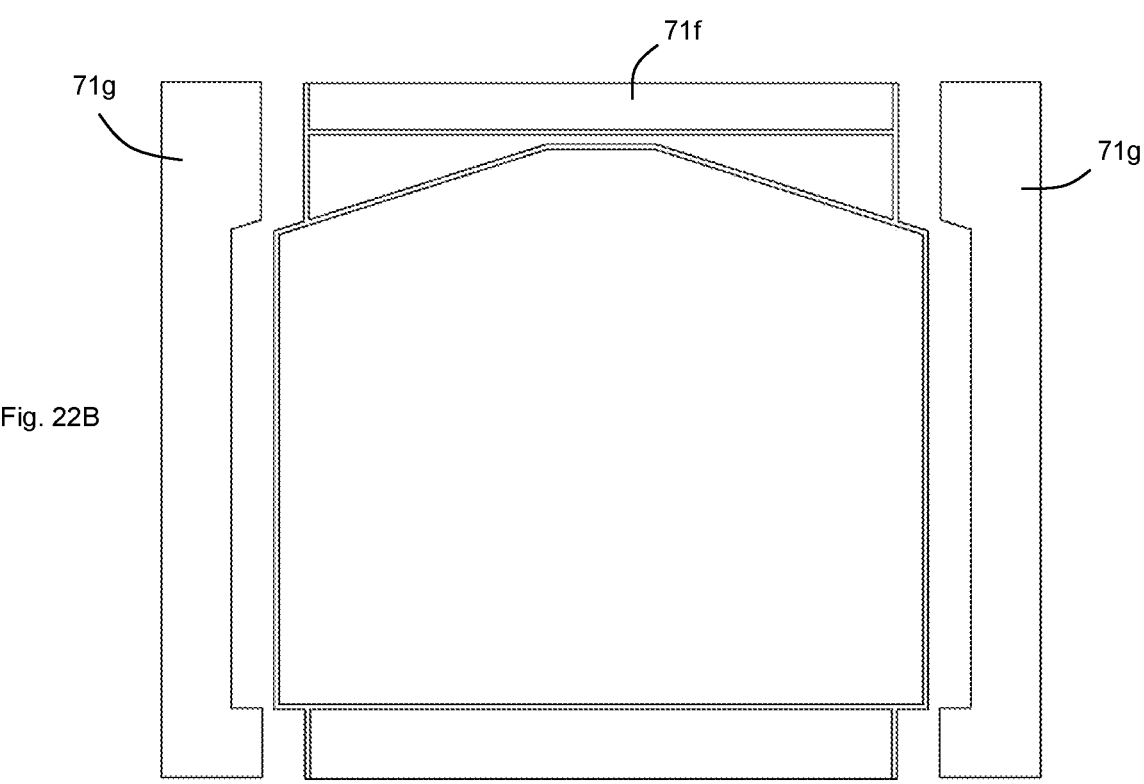

In the state before opening the molds 71, 72 after the molding step, the molded main body 26a is engaged with the main body portion 71f of the mold 71, and the large burr 26b is engaged with the projection 71g1 provided on the movable portion 71g of the mold 71. When the movable portion 71g is tilted such that its lower side is separated from the main body portion 71f, as shown in FIG. 22A, the molded body 26 is torn from its lower side and begins to be cut along the left line 26c1 and the right line 26cr of the cutting line 26c. Next, when the movable portion 71g is moved such that an upper side of the movable portion 71g is separated from the main body portion 71f, as shown in FIG. 22B, the tearing of the molded body 26 proceeds upward, and the first cutting step is completed.

2-5. Molded Body Taking-Out Step

In the molded-body taking-out step, while the lower burr 26bb is clamped by the clamping members 78a, 78b of the lower burr clamping device 78, as shown in FIG. 23, the molded body 26 is taken out from the molds 71, 72 and transferred to the holding apparatus 13, using the clamping device 12.

Figure 24A:
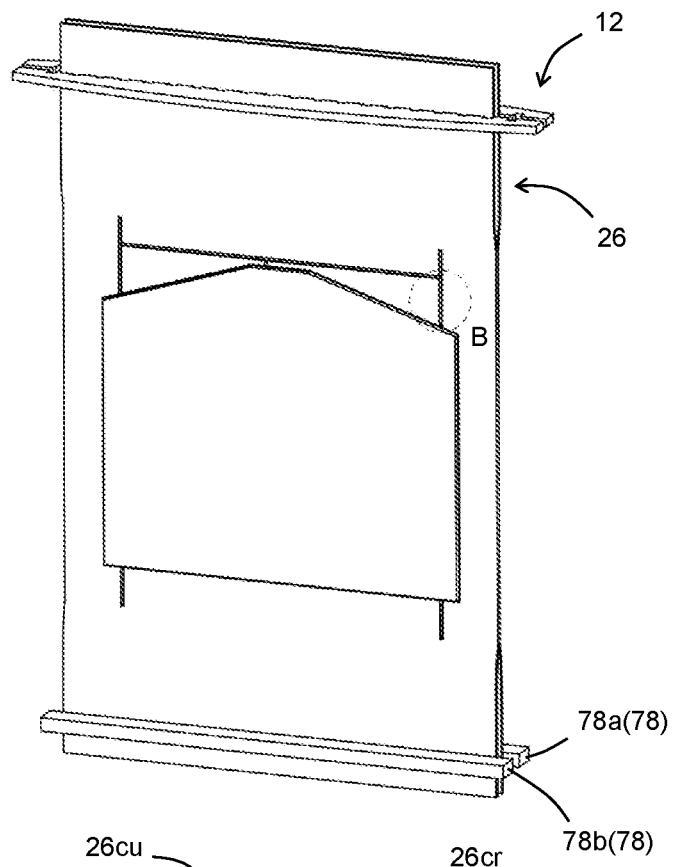
FIG. 24A shows a state where the molds 71, 72 are removed from FIG. 23.
Figure 24B:
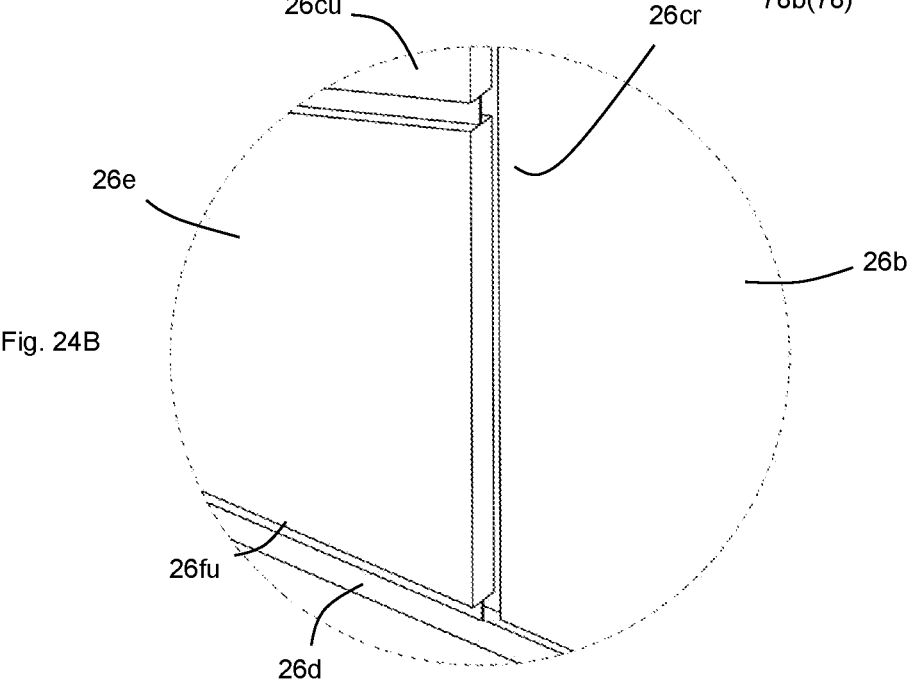
FIG. 24B is an enlarged view of a region B in FIG. 24A.

The clamping device 12 is configured to be driven by a driving mechanism (not shown). As shown in FIG. 23, the clamping device 12 clamps the molded body 26 above the molds 71, 72 while the molds 71, 72 are closed. In other words, the clamping device 12 clamps the upper burr 26bu of the molded body 26. In this state, the molds 71, 72 are opened, as shown in FIG. 24A and FIG. 24B. Although there is a possibility at this time that the molded body 26 may be fitted into any one of the molds 71, 72, the molded body 26 is smoothly separated from the molds 71, 72 without being fitted into the molds 71, 72 in the present embodiment because the lower burr clamping device 78 clamps the lower burr 26bb. The clamping device 12 then moves the molded body 26 toward the holding apparatus 13. As shown in FIG. 21 and FIG. 24B, the molded body 26 is cut along the left line 26c1 and the right line 26cr of the cutting line 26c. In contrast, the molded body 26 is not cut along the upper line 26cu and the lower line 26cb of the cutting line 26c. If the molded body 26 is cut along any one of the upper line 26cu and the lower line 26cb, the molded main body 26a tends to sway with respect to the large burr 26b, which makes it difficult to handle the molded body 26. Since the molded body 26 is cut only along the left line 26c1 and the right line 26cr at this point in the present embodiment, it is easy to handle the molded body 26.

2-6. Holding Step

In the holding step, the molded body 26 is held by the holding apparatus 13.

<Configuration of Holding Apparatus 13>

Figure 25A:
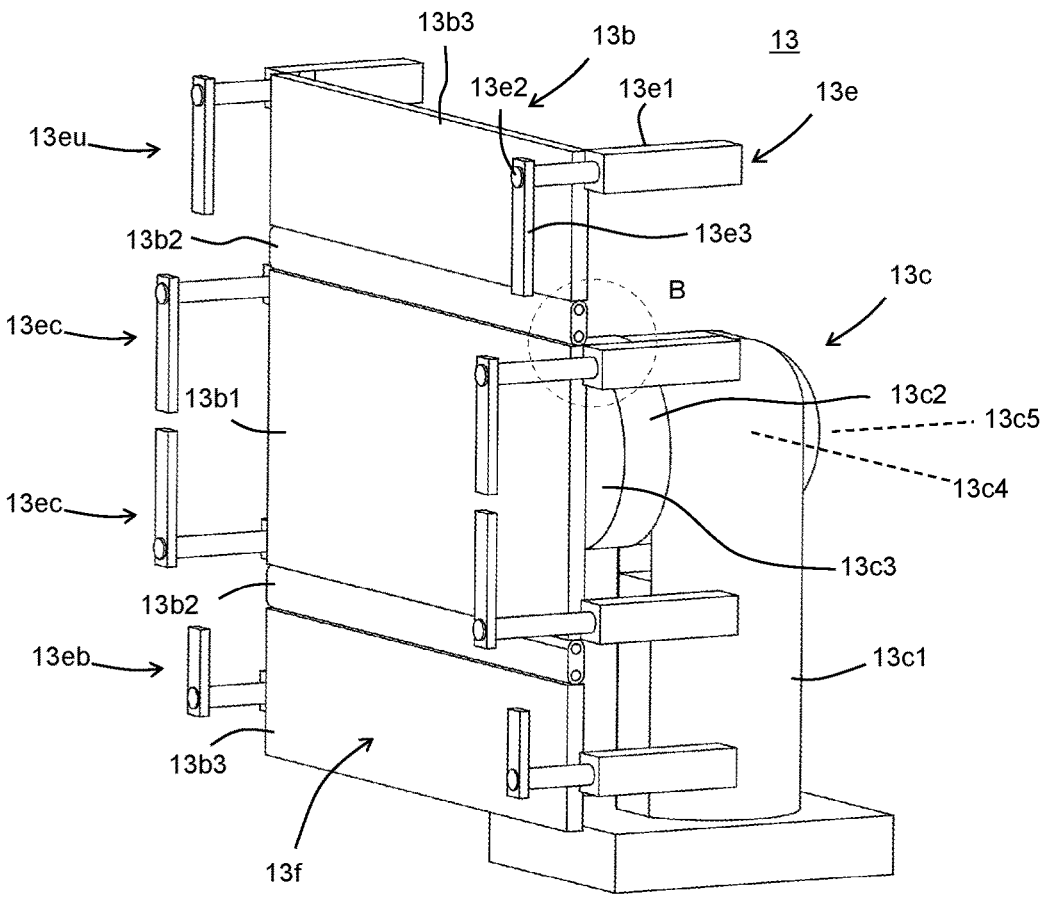
FIG. 25A is a perspective view of a holding apparatus 13.
Figure 25B:
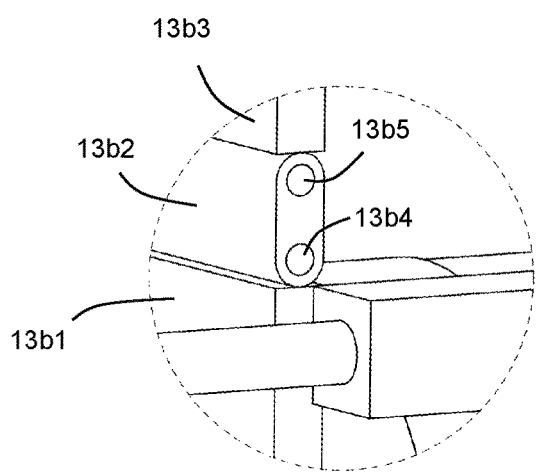
FIG. 25B is an enlarged view of a region B in FIG. 25A.

As shown in FIG. 25A and FIG. 25B, the holding apparatus 13 includes a holding stand 13b, a rotation mechanism 13c, and a holding mechanism 13e. As shown in FIG. 3, the rotation mechanism 13c is fixed on the conveying table 13d, and the conveying table 13d is configured to be movable along the conveying line 13a.

The rotation mechanism 13c includes a base 13c1, a first rotation member 13c2, and a second rotation member 13c3. The rotation mechanism 13c includes first and second rotation mechanisms. The first rotation member 13c2 rotates about a first rotation axis 13c4 parallel to the Y axis with respect to the base 13c1 (the first rotation mechanism). The second rotation member 13c3 rotates about a second rotation axis 13c5 orthogonal to the first rotation axis 13c4 with respect to the first rotation member 13c2 (the second rotation mechanism). The rotation mechanism 13c is composed of, for example, by a two-axis robot. The holding stand 13b is connected to the second rotation member 13c3. Therefore, the holding stand 13b can be rotated by operating the rotation mechanism 13c.

The holding stand 13b includes a base stand 13b1, a pair of connecting members 13b2, and a pair of arms 13b3. The base stand 13b1 and the arm 13b3 are connected via the connecting member 13b2. The base stand 13b1 is arranged between the pair of connecting members 13b2. The arm 13b3 is connected to the connecting member 13b2. The connecting member 13b2 is configured to be rotatable about a rotation shaft 13b4 with respect to the base stand 13b1. The arm 13b3 is configured to be rotatable about a rotation shaft 13b5 with respect to the connecting member 13b2. Consequently, the arm 13b3 is configured to be rotatable with respect to the base stand 13b1.

The holding stand 13b includes a holding surface 13f and holds the molded body 26 on the holding surface 13f. As shown in FIG. 34A to FIG. 34D, holding surfaces of the base stand 13b1, the connecting member 13b2, and the arm 13b3 are referred to as holding surfaces 13f1, 13f2, 13f3, respectively.

Figure 33A:
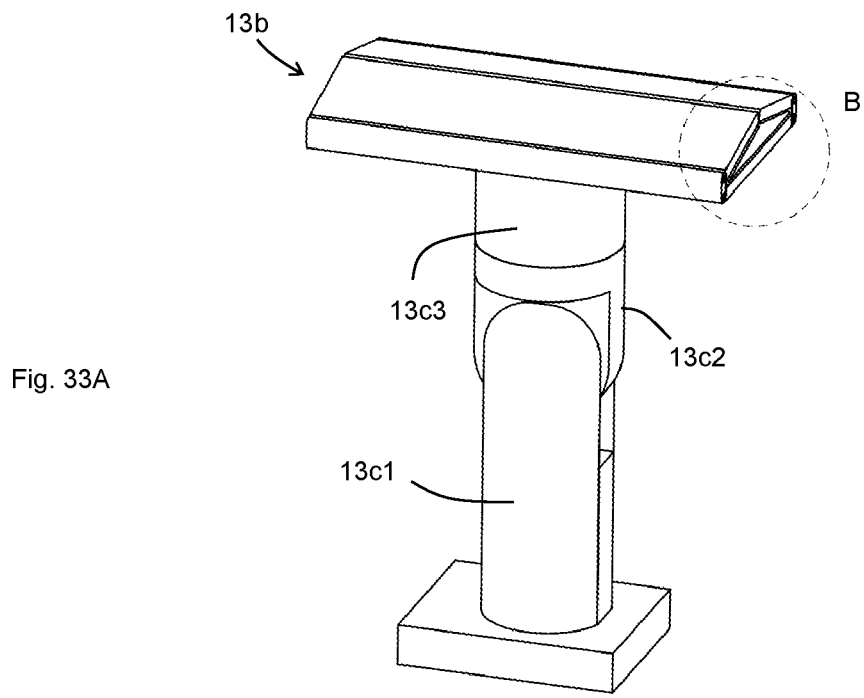
FIG. 33A is a perspective view when the holding stand 13b is in a folded state.
Figure 33B:
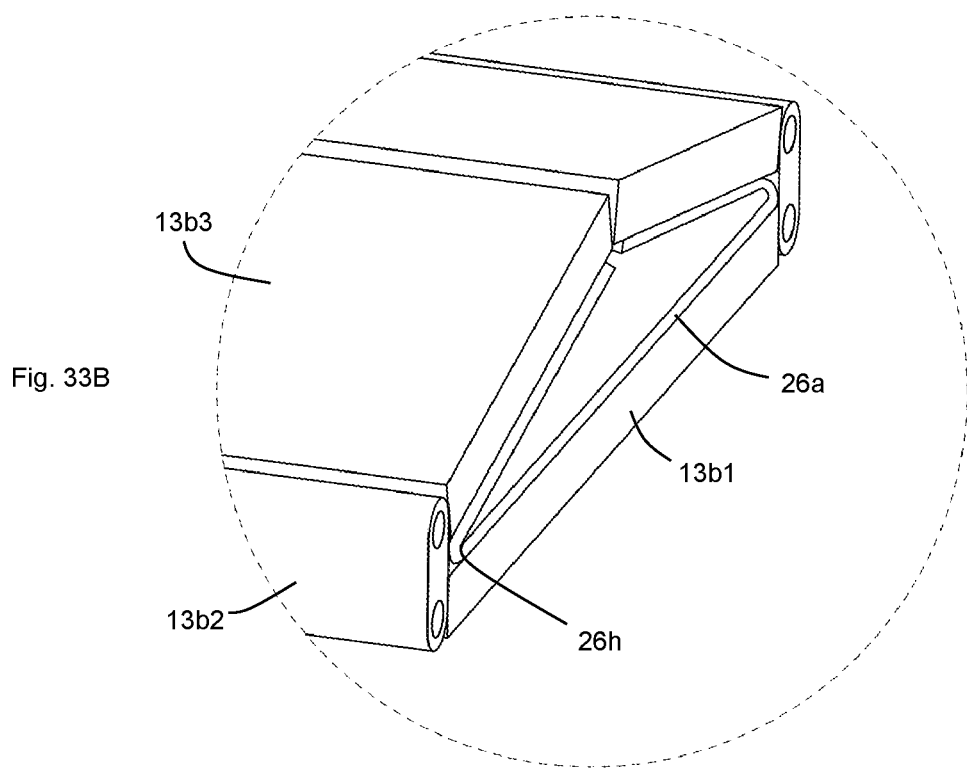
FIG. 33B is an enlarged view of a region B in FIG. 33A. The holding mechanism 13e is omitted herein.
Figure 34A:
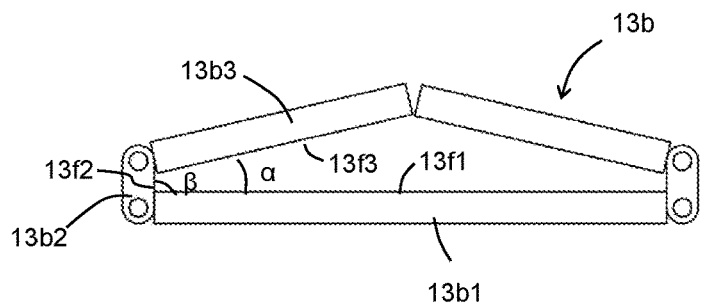
FIG. 34A is an end view when the holding stand 13b is in a folded state.
Figure 34B:
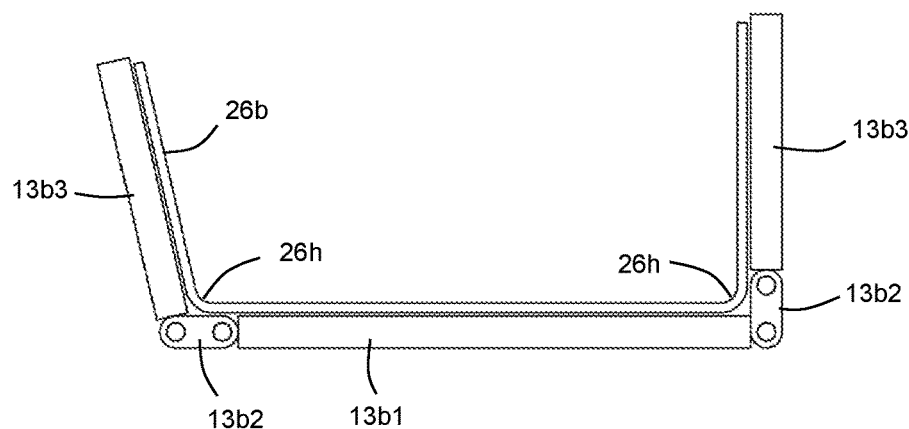
FIG. 34B is an end view when connecting members 13b2 and arms 13b3 are asymmetrically rotated.

The holding stand 13b transitions between a flat state, a folded state, and a burr discharging state. In the flat state, the holding surfaces 13f1, 13f2, 13f3 are flush with each other. In the folded state, the connecting member 13b2 is rotated with respect to the base stand 13b1, and the arm 13b3 is rotated with respect to the connecting member 13b2, as shown in FIG. 33B and FIG. 34A. The holding stand 13b is brought into the folded state when the large burr 26b is folded. In the burr discharging state, the holding surfaces 13f1, 13f2 are flush, and the arm 13b3 is rotated with respect to the connecting member 13b2, as shown in FIG. 34D. The holding stand 13b is brought into the burr discharging state when the folded large burr 26b is discharged to the burr feeding device 17.

The holding mechanism 13e includes a base 13e1, a rod 13e2, and a pressing portion 13e3. The holding mechanism 13e is configured to hold the molded body 26 by clamping the molded body 26 between the pressing portion 13e3 and the holding stand 13b. The base 13e1 is fixed to the holding stand 13b. The rod 13e2 is arranged to extend perpendicularly to the holding surface 13f, and its protrusion length from the base 13e1 and the holding surface 13f (that is, the extension and contraction of the rod 13e2) is adjustable. The pressing portion 13e3 is fixed to the rod 13e2. Consequently, the distance between the pressing portion 13e3 and the holding surface 13f is adjustable. Further, the rod 13e2 is rotatable about its central axis with respect to the base 13e1. Consequently, the pressing portion 13e3 is configured to be rotatable about the rod 13e2.

The holding mechanism 13e can be switch between a standby state, a preparation state, an overlapping state, and a pressing state by the extension and contraction of the rod 13e2 and the rotation of the pressing portion 13e3. In the standby state and the preparation state, the pressing portion 13e3 is arranged such that the pressing portion 13e3 does not overlap the holding surface 13f when the holding surface 13f is viewed from a direction perpendicular to the holding surface 13f (hereinafter, referred to as "in the holding surface view"). In the standby state, the rod 13e2 is in a contracted state. In the preparation state, the rod 13e2 is more extended than in the contracted state. In the overlapping state and the pressing state, the pressing portion 13e3 is arranged to overlap the holding surface 13f in the holding surface view. In the overlapping state, the rod 13e2 is in the extended state, and the pressing portion 13e3 is not pressing the molded body 26. In the pressing state, the rod 13e2 is contracted from the overlapping state, and the pressing portion 13e3 is pressing the molded body 26.

Figure 26:
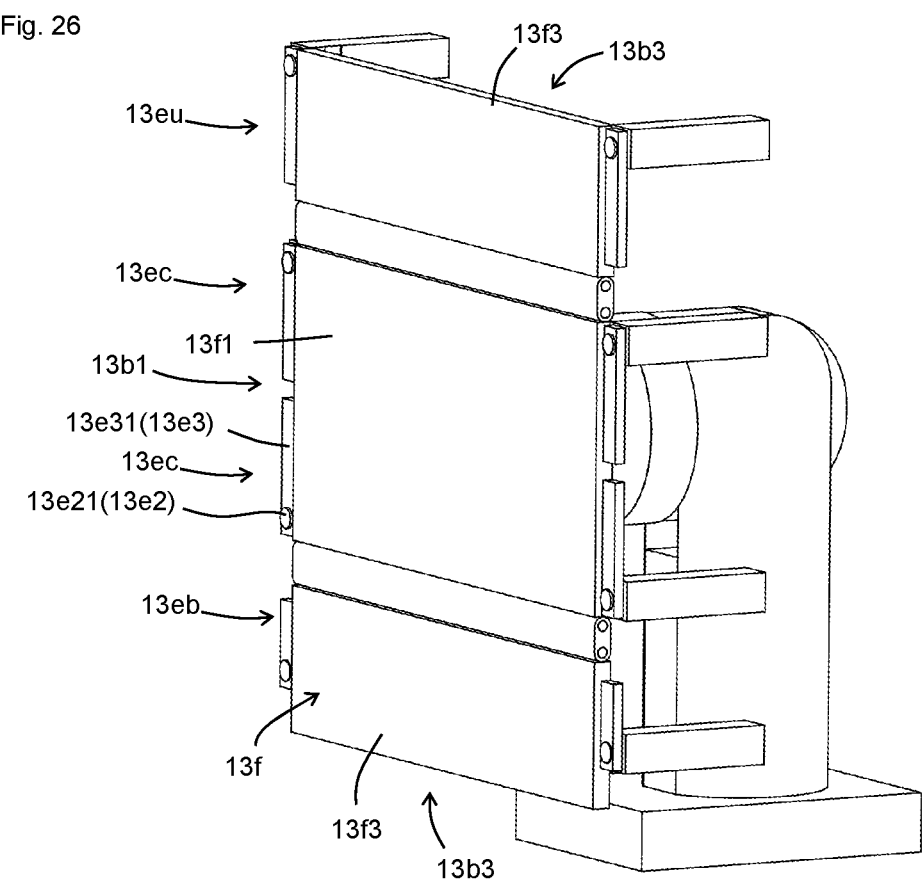
FIG. 26 is a perspective view of the holding apparatus 13 when a holding mechanism 13e is in a standby state.

As shown in FIG. 26, in the standby state, the height of upper surfaces 13e21, 13e31 of the rod 13e2 and the pressing portion 13e3 is lower than the holding surface 13f. More specifically, the height of the upper surfaces 13e21, 13e31 of the rod 13e2 and the pressing portion 13e3 of the holding mechanism 13e provided on the base stand 13b1 is lower than a holding surface 13f1, and the height of the upper surfaces 13e21, 13e31 of the rod 13e2 and the pressing portion 13e3 of the holding mechanism 13e provided on the arm 13b3 is lower than the holding surface 13f3. With such a configuration, the interference between the holding mechanism 13e and the large burr 26b is avoided when the large burr 26b is folded.

When pressing the molded body 26, the holding mechanism 13e is transitioned in the order of the preparation state, the overlapping state, and the pressing state. When the pressing of the molded body 26 is released, the holding mechanism 13e is transitioned in the order of the pressing state, the overlapping state, and the preparation state. If necessary, the state may be transitioned from the preparation state to the standby state or vice versa. The molded body 26 can be properly held by pressing and releasing the molded body 26.

The holding mechanism 13e is divided into an upper holding mechanism 13eu, a central holding mechanism 13ec, and a lower holding mechanism 13eb. The upper holding mechanism 13eu and the lower holding mechanism 13eb are arranged respectively on an upper side and a lower side of the central holding mechanism 13ec in a state where the holding surface 13f stands upright, as shown in FIG. 25A and FIG. 25B. The central holding mechanism 13ec is provided on the base stand 13b1. The upper holding mechanism 13eu and the lower holding mechanism 13eb are provided on the arm 13b3.

Figure 28A:
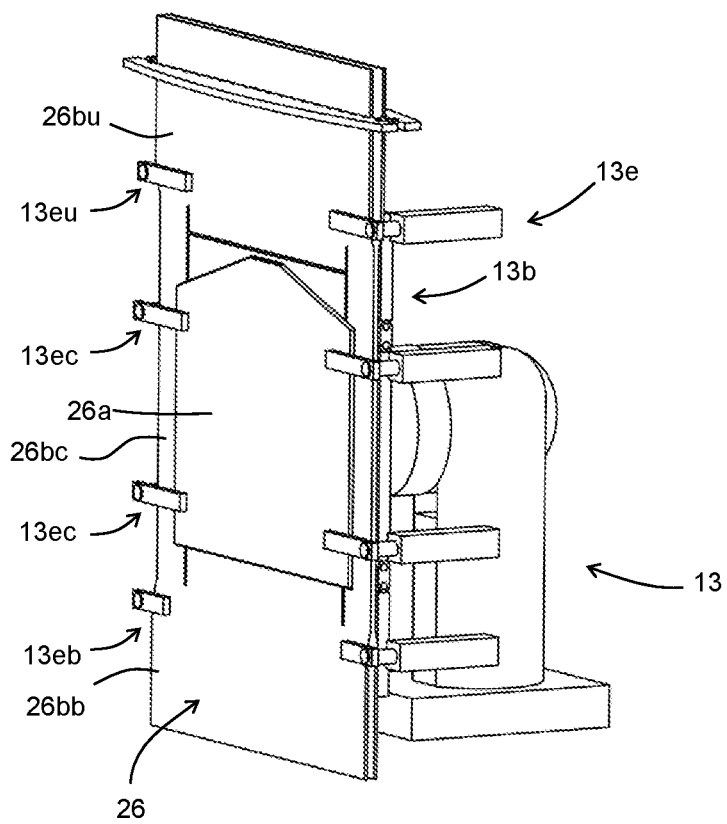
FIG. 28A is a perspective view when the molded body 26 is held by the holding apparatus 13.

As shown in FIG. 21, when the large burr 26b is classified into an upper burr 26bu, a central burr 26bc, and the lower burr 26bb, the upper holding mechanism 13eu, the central holding mechanism 13ec, and the lower holding mechanism 13eb hold the upper burr 26bu, the central burr 26bc, and the lower burr 26bb, respectively, as shown in FIG. 28A. The central holding mechanism 13ec holds the molded main body 26a before separating the molded main body 26a.

The thickness of the central burr 26bc is unlikely to be large because the entire or most of the central burr 26bc is formed by being sandwiched between the molds 71, 72. The thickness (in other words, the distance between the resin sheets 73a, 73b) of the lower burr 26bb tends to be large because it includes a portion of the resin sheets 73a, 73b extending below the molds 71, 72, which is irregularly shaped and because the resin sheets 73a, 73b are pulled toward the molds 71, 72 when forming the resin sheets 73a, 73b. The pressing portion 13e3 of the lower holding mechanism 13eb is thus configured to be shorter than the pressing portion 13e3 of the central holding mechanism 13ec, as shown in FIG. 25A, to prevent the arm 13b3 of the lower holding mechanism 13eb from interfering the lower burr 26bb.

Further, the upper burr 26bu also includes a portion that is not sandwiched between the molds 71, 72, and thus its thickness tends to be large. In this regard, however, since the upper burr 26bu is clamped by the clamping device 12, it is unlikely to have an irregular shape, unlike the lower burr 26bb. Therefore, the pressing portion 13e3 of the upper holding mechanism 13eu may have the same length as the pressing portion 13e3 of the central holding mechanism 13ec or may be shorter than this.

<Holding Method of Molded Body 26>

Figure 27A:
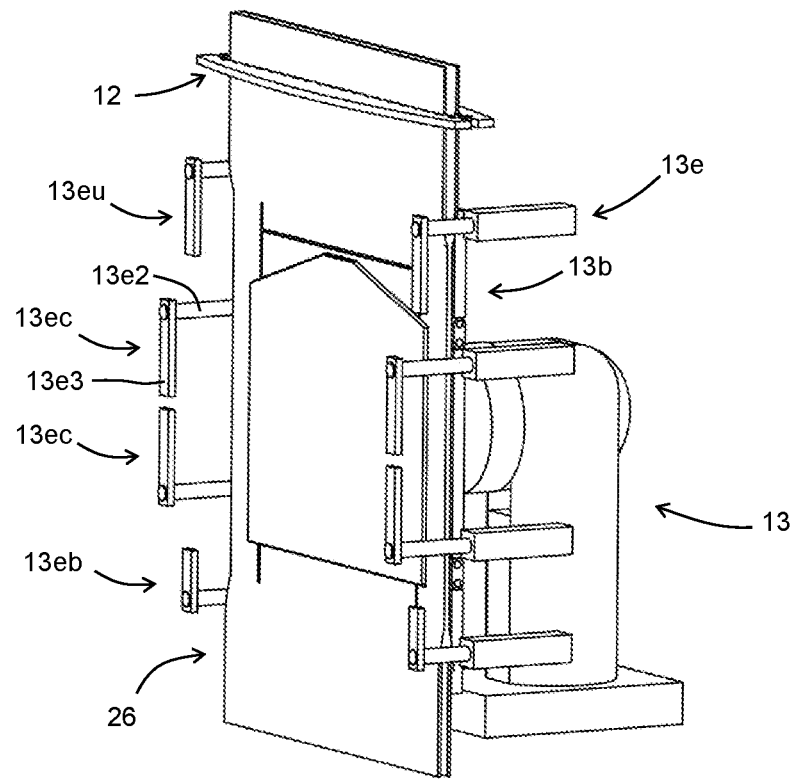
FIG. 27A and FIG. 27B are perspective views for explaining a step in which the holding apparatus 13 holds the molded body 26.

First, the holding stand 13b is set in the flat state to make the holding surface 13f stand upright to be parallel to the molded body 26, as shown in FIG. 27A, and all of the holding mechanisms 13e are brought into the preparation state. In this state, the molded body 26 is brought close to the holding surface 13f.

Figure 27B:
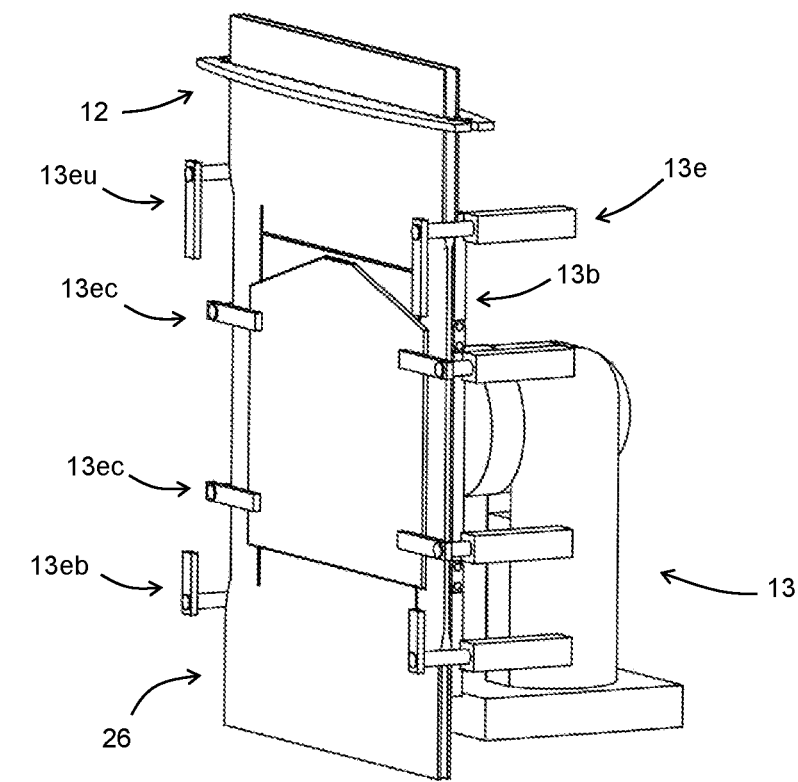

While the molded body 26 is closer to the holding surface 13f than the pressing portion 13e3 of the central holding mechanism 13ec, the pressing portion 13e3 is rotated to bring the central holding mechanism 13ec into the overlapping state, and the rod 13e2 of the central holding mechanism 13ec is contracted to shift to the pressing state, so that the molded body 26 is pressed by the pressing portion 13e3, as shown in FIG. 27B. At this point, the upper holding mechanism 13eu and the lower holding mechanism 13eb remain in the preparation state.

Next, the upper holding mechanism 13eu and the lower holding mechanism 13eb are transitioned in the order of the overlapping state and the pressing state to the state shown in FIG. 28A. At this point, the molded body 26 is held by all of the holding mechanisms 13e.

The length of the rod 13e2 of the central holding mechanism 13ec in the overlapping state is larger than the length of the rods 13e2 of the upper holding mechanism 13eu and the lower holding mechanism 13eb. With such a configuration, even when the molded body 26 is some distance away from the holding surface 13f, the molded body 26 can be pressed against the holding surface 13f. On the other hand, since the upper holding mechanism 13eu and the lower holding mechanism 13eb begin to operate while the central holding mechanism 13ec is pressing the molded body 26 against the holding surface 13f, it is not necessary to lengthen the rods 13e2 of the upper holding mechanism 13eu and the lower holding mechanism 13eb. Consequently, the time required for operation is reduced by shortening the rods 13e2 of the upper holding mechanism 13eu and the lower holding mechanism 13eb in the overlapping state.

Next, after the clamping device 12 is separated from the molded body 26, the first rotation member 13c2 is rotated with respect to the base 13c1, so that the holding stand 13b is rotated to a first horizontal state in which the holding surface 13f is horizontal, as shown in FIG. 29. In this way, the holding stand 13b is rotated by the rotation mechanism 13c (more specifically, by the first rotation mechanism) during the transition from the holding step to the separation step described below. Further, the position is adjusted at this time by moving the conveying table 13d on which the rotation mechanism 13c is fixed, in the direction approaching the burr feeding device 17 along the conveying line 13a (the +X direction).

In this regard, when the clamping device 12 is separated in the state of FIG. 28A, the upper burr 26bu may be bent by gravity and overlap the molded main body 26a. In such a state, it becomes difficult to perform the separation step described below.

Figure 28B:
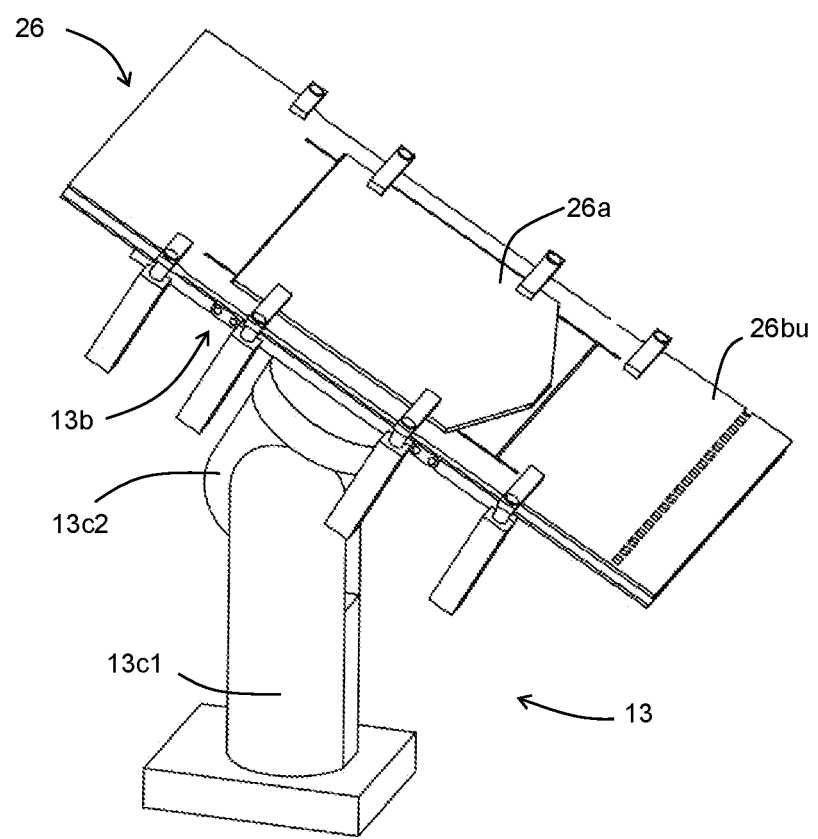
FIG. 28B shows a state where a holding stand 13b is tilted to clear an upper burr 26bu.

In the present embodiment, during the transition from the state of FIG. 28A to the state of FIG. 29, the holding stand 13b is tilted to lower the upper burr 26bu, as shown in FIG. 28B, to perform a clearing step of clearing the upper burr 26bu from above the molded main body 26a.

Figure 31A:
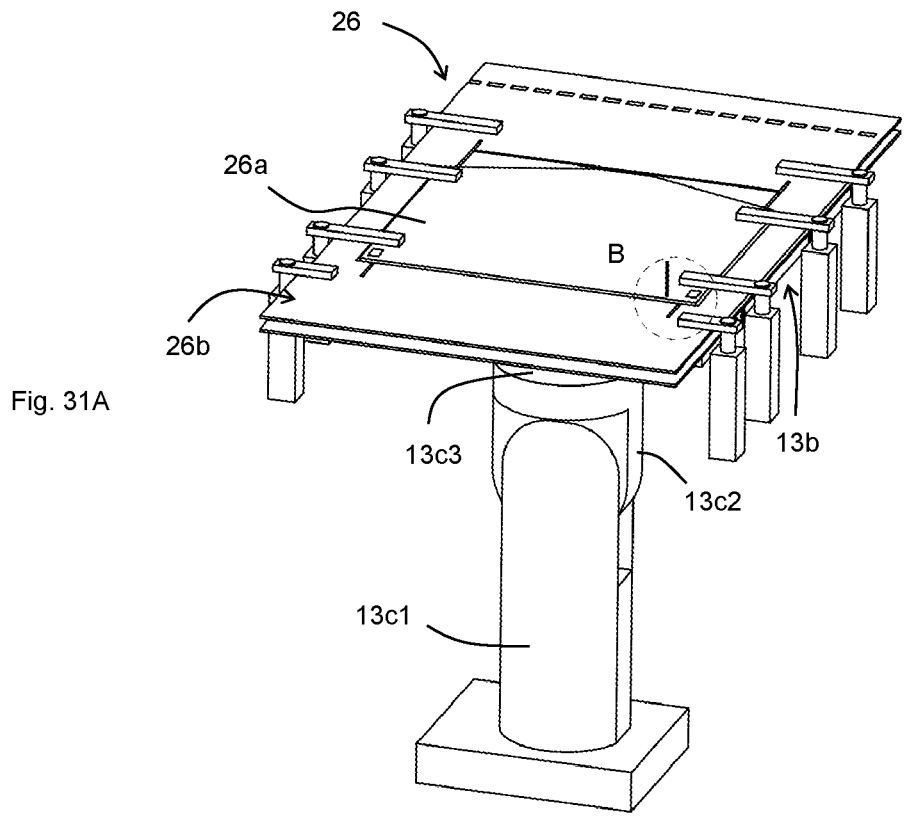
FIG. 31A is a perspective view, for explaining a second cutting step, of the holding apparatus 13 holding the molded body 26.

Next, the second rotation member 13c3 is rotated by 90 degrees with respect to the first rotation member 13c2, as shown in FIG. 31A, so that the holding stand 13b is rotated in the horizontal plane to shift to a second horizontal state. The purpose of shifting to the second horizontal state is to reduce the space secured for the movement of the head 27 by aligning the movement direction of the head 27 provided on the manipulator 6 with the conveyance direction of the conveying line 13a when performing the second cutting step by the manipulator 6, and to smoothly perform a burr discharging step described below.

2-6. Separation Step

In the separation step, the molded body 26 is separated from the molded main body 26a, leaving the large burr 26b on the holding stand 13b. The separation step includes the second cutting step and a transfer step. This step can be performed using the manipulator 6.

<Configuration of Manipulator 6>

Figure 30:
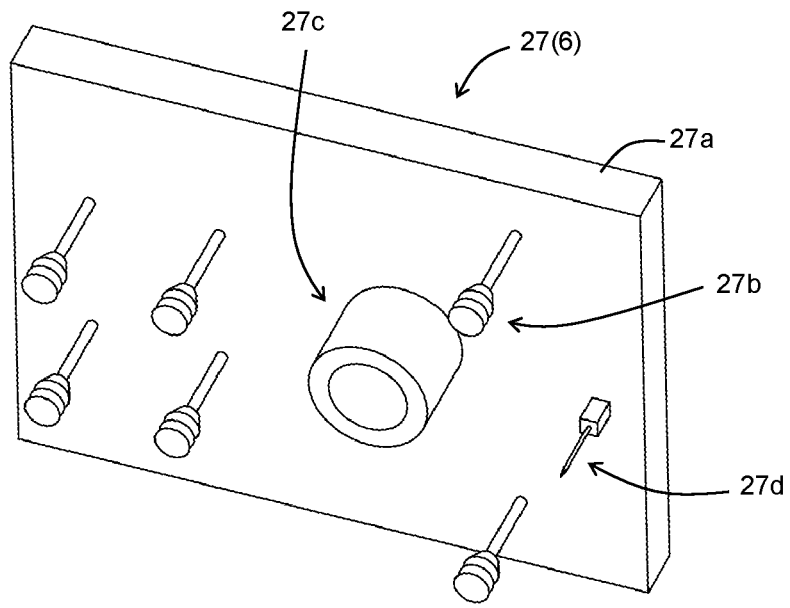
FIG. 30 is a perspective view of the head 27 of the manipulator 6.

The manipulator 6 includes the head 27 shown in FIG. 30 at its tip. As shown in FIG. 30, the head 27 includes a base 27a, a suction pad 27b, an imaging unit 27c, and a cutter 27d. Each component is held by the base 27a.

The suction pad 27b is used to suck and hold the molded main body 26a after separation. The suction pad 27b is configured such that its protrusion length from the base 27a is adjustable. The number of suction pads 27b is not particularly limited as long as the molded main body 26a can be supported, and six suction pads 27b are provided in the present embodiment. The suction pad 27b has a bellows shape similar to the suction pad 24b of the head 24, and the molded main body 26a can be reliably sucked and held by all the suction pads 24b even if there is a difference in height among regions sucked by the suction pad 27b.

The imaging unit 27c has a function of imaging the molded main body 26a and recognizing the position of an identification shape 26g (see FIG. 31B) provided on the molded main body 26a. The cutter 27d is used to cut the molded body 26 along the upper line 26cu and the lower line 26cb. The cutter 27d is configured such that its protrusion length from the base 27a is adjustable. The identification shape 26g is configured, for example, as a characteristic rugged structure provided on the molded main body 26a.

<Second Cutting Step>

The second cutting step is performed by cutting the molded body 26 along the upper line 26cu and the lower line 26cb shown in FIG. 21 to divide the molded body 26 into the molded main body 26a and the large burr 26b.

Figure 31B:
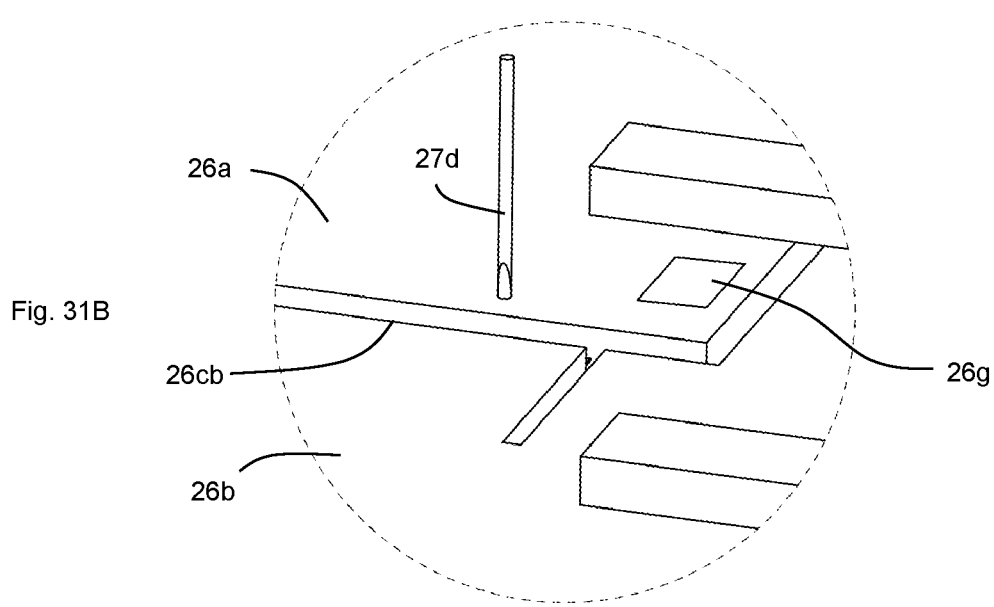
FIG. 31B is an enlarged view of a region B in FIG. 31A.

Since the molded body 26 is not accurately positioned on the holding stand 13b, the positions of the upper line 26cu and the lower line 26cb are not exactly determined. Therefore, the imaging unit 27c recognizes the position of the identification shape 26g, and the positions of the upper line 26cu and the lower line 26cb are determined based on the recognized position, so that the cutter 27d is moved, as shown in FIG. 31B, along the upper line 26cu and the lower line 26cb whose positions are determined, to perform the second cutting step. In this regard, if either the upper line 26cu or the lower line 26cb is cut in the first cutting step, the large burr 26b may easily overlap the molded main body 26a, which may make it difficult to recognize the position of the identification shape 26g. In the present embodiment, neither the upper line 26cu nor the lower line 26cb is cut in the first cutting step, and thus such a problem does not occur.

Further, after cutting one of the upper line 26cu and the lower line 26cb, the holding stand 13b may be rotated 180 degrees in the horizontal plane to cut the other of the upper line 26cu and the lower line 26cb. In this case, the amount of movement of the head 27 is reduced, and thus the operation can be performed in a small space.

<Transfer Step>

Figure 32:
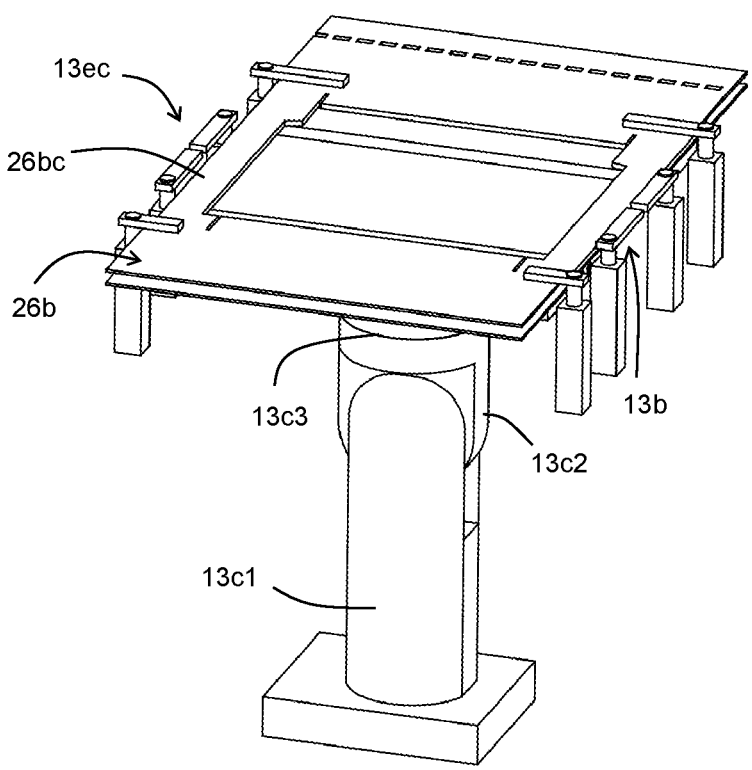
FIG. 32 is a perspective view when the molded main body 26a is removed from a state of FIG. 31A.

The transfer step is performed by sucking and holding the molded main body 26a with the suction pad 27b and transferring it to the conveyor 28. Since the molded main body 26a cannot be transferred when the central holding mechanism 13ec is in the pressing state, the central holding mechanism 13ec is brought into the preparation state or the standby state in advance, as shown in FIG. 32, to perform the transfer step. After the molded main body 26a is transferred, the central holding mechanism 13ec is brought into the pressing state to press the central burr 26bc with the pressing portion 13e3. The central holding mechanism 13ec presses the molded main body 26a with the pressing portion 13e3 before the transfer step and presses the central burr 26bc with the pressing portion 13e3 after the transfer step. The molded main body 26a and the central burr 26bc have different thicknesses. In order to properly press such two types of members having different thicknesses, a lower limit switch of a clamp cylinder included in the central holding mechanism 13ec is not operated.

2-7. Burr Processing Step

In the burr processing step, the large burr 26b left on the holding stand 13b in the separation step is processed. The burr processing step includes a folding step, a discharging step, an elevation step, and a feeding step.

<Folding Step>

In the folding step, the large burr 26b placed on the holding stand 13b is folded so that the large burr 26b can be easily handled. The folding step includes a preliminary folding step, a returning step, and a main folding step. At the start of the folding step, the large burr 26b is placed across the base stand 13b1, the pair of connecting members 13b2, and the pair of arms 13b3.

In the preliminary folding step, while the holding mechanism 13e (not shown in FIG. 33A to FIG. 35) is holding the large burr 26b, the connecting member 13b2 and the arm 13b3 are respectively rotated to bring the holding stand 13b into the folded state. Consequently, the large burr 26b is folded to form a crease 26h on the large burr 26b, as shown in FIG. 33B. As shown in FIG. 34A, the angle α between the holding surface 13f1 of the base stand 13b1 and the holding surface 13f3 of the arm 13b3 in the folded state is, for example, 3 to 45 degrees, and is preferably 8 to 20 degrees. This angle α is specifically, for example, 3, 4, 5, 6, 7, 8, 9, 10, 11, 12, 13, 15, 20, 25, 30, 35, 40, 45 degrees, and may be within a range between any two of the values exemplified herein. The angle β between the holding surface 13f1 of the base stand 13b1 and the holding surface 13f2 of the connecting member 13b2 is preferably 70 to 110 degrees, and more preferably 80 to 100 degrees. This angle β is specifically, for example, 70, 75, 80, 85, 90, 95, 100, 105, 110 degrees, and may be within a range between any two of the values exemplified herein. In the present embodiment, the angle α is 13 degrees, and the angle β is 90 degrees.

Although it is possible to fold the large burr 26b by rotating only the arm 13b3, the angle α can be reduced more easily by rotating both the connecting member 13b2 and the arm 13b3.

In the preliminary folding step, the connecting member 13b2 and the arm 13b3 are rotated in a state where the crease 26h is not formed on the large burr 26b. If the connecting member 13b2 and the arm 13b3 are rotated in a state where the large burr 26b is not fixed to the holding stand 13b, the large burr 26b may be lifted by the arm 13b3 without being folded, and the large burr 26b may not be properly folded. In the preliminary folding step, the connecting member 13b2 and the arm 13b3 are respectively rotated while the holding mechanism 13e is holding the large burr 26b.

Although the large burr 26b may be held at least one portion of the holding mechanism 13e, it is preferable to hold the upper burr 26bu, the central burr 26bc, and the lower burr 26bb by the upper holding mechanism 13eu, the central holding mechanism 13ec, and the lower holding mechanism 13eb. In this case, the possibility that the large burr 26b is lifted by the arm 13b3 is further reduced.

In the returning step, the connecting member 13*b*2 and the arm 13*b*3 are rotated in the direction opposite to the rotation direction in the preliminary folding step to increase the angle α. Preferably, the connecting member 13*b*2 and the arm 13*b*3 are rotated in the returning step until the angle α becomes 180 degrees. This step is performed while the holding mechanism 13*e* is holding the large burr 26*b*, and the folded large burr 26*b* is unfolded as the arm 13*b*3 is rotated.

In the main folding step, the connecting member 13*b*2 and the arm 13*b*3 are respectively rotated, in a state where the holding of the large burr 26*b* by the holding mechanism 13*e* is released, to bring the holding stand 13*b* into the folded state. Since the returning step has been performed, it is easy to release the holding of the large burr 26*b* by the holding mechanism 13*e*. Further, since the large burr 26*b* is folded at the position of the crease 26*h* formed in the preliminary folding step after unfolding the large burr 26*b* in the returning step, the crease 26*h* of the large burr 26*b* becomes sharper, and it becomes difficult for the large burr 26*b* to be restored to the unfolded state. In the main folding step, it is preferable to bring the holding mechanism 13*e* into the standby state. In this case, the interference between the holding mechanism 13*e* and the large burr 26*b* can be avoided.

The angles α and β in the main folding step may be the same as the preliminary folding step or may be smaller than those in the preliminary folding step. In the main folding step, the angle α can be easily reduced because the folding is performed while the holding of the large burr 26*b* by the holding mechanism 13*e* is released.

When the large burr 26*b* is folded, the connecting member 13*b*2 and the arm 13*b*3 on a side of the upper burr 26*bu* and the connecting member 13*b*2 and the arm 13*b*3 on a side of the lower burr 26*bb* may be rotated simultaneously or in sequence. For example, the connecting member 13*b*2 and the arm 13*b*3 on the side of the upper burr 26*bu* may be rotated as shown in FIG. 34A, followed by the returning step, and then the connecting member 13*b*2 and the arm 13*b*3 on the side of the lower burr 26*bb* may be rotated as shown in FIG. 34A, followed by the returning step.

The connecting member 13*b*2 and the arm 13*b*3 on the side of the upper burr 26*bu* and the connecting member 13*b*2 and the arm 13*b*3 on the side of the lower burr 26*bb* may be rotated symmetrically or asymmetrically. For example, in the example of FIG. 34B, the arm 13*b*3 is rotated with respect to the connecting member 13*b*2 without rotating the connecting member 13*b*2 with respect to the base stand 13*b*1 on the left side, while the connecting member 13*b*2 is rotated with respect to the base stand 13*b*1 without rotating the arm 13*b*3 with respect to the connecting member 13*b*2 on the right side. In this case, the positions of the creases 26*h* formed on the large burr 26*b* are different between the left and right sides, and the distance from the crease 26*h* on the left side to the left end of the large burr 26*b* is smaller than the distance from the crease 26*h* on the right side to the right end of the large burr 26*b*. Consequently, the large burr 26*b* can be easily put together by folding the large burr 26*b* at the crease 26*h* on the left side and then folding the large burr 26*b* at the crease 26*h* on the right side.

In order to facilitate the formation of the crease 26*h* on the large burr 26*b*, the molds 71, 72 may be provided with a projection to press the resin sheets and reduce the thickness at the position where the crease 26*h* is formed.

Figure 34C:
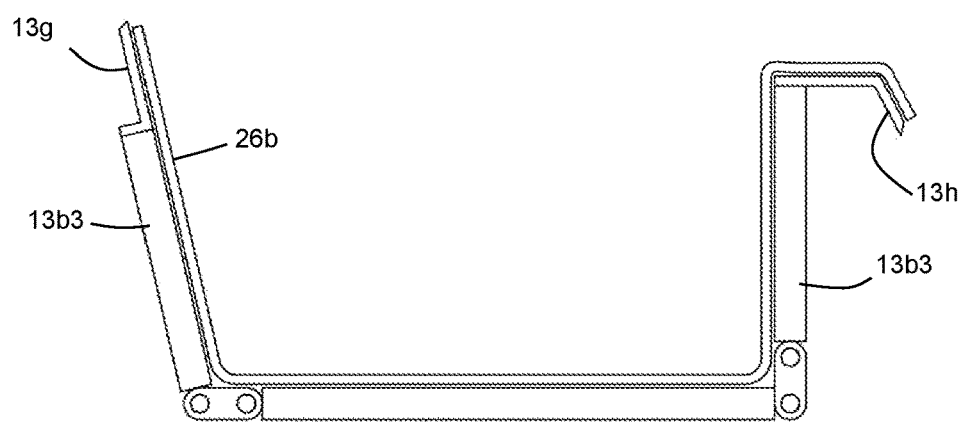
FIG. 34C is an end view when a lower burr plate 13g and an upper burr plate 13h are attached to the arms 13b3.
Figure 34D:
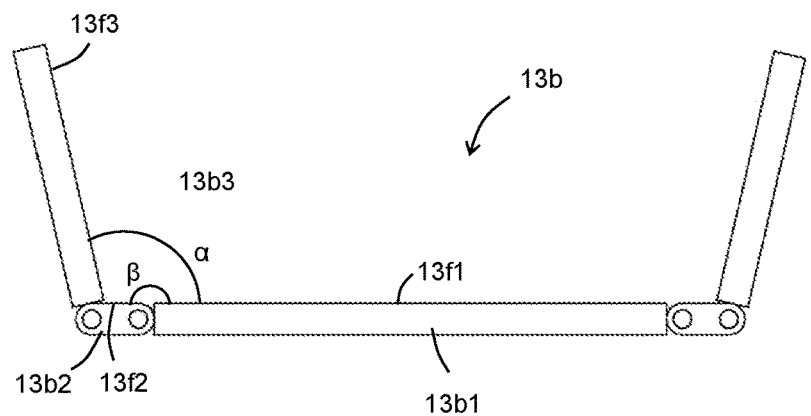
FIG. 34D is an end view when the holding stand 13b is in a burr discharging state. The holding mechanism 13e is omitted herein.

As shown in FIG. 34C, a lower burr plate 13*g* adopted for the lower burr 26*bb* may be attached to the arm 13*b*3 on the side of the lower burr 26*bb*, and an upper burr plate 13*h* adopted for the upper burr 26*bu* may be attached to the arm 13*b*3 on the side of the upper burr 26*bu*. With such a configuration, the large burr 26*b* can be stably held and folded even if the large burr 26*b* protrudes from the holding stand 13*b*.

<Discharging Step>

In the discharging step, the large burr 26*b* is discharged from the holding apparatus 13 toward the burr feeding device 17.

Figure 35:
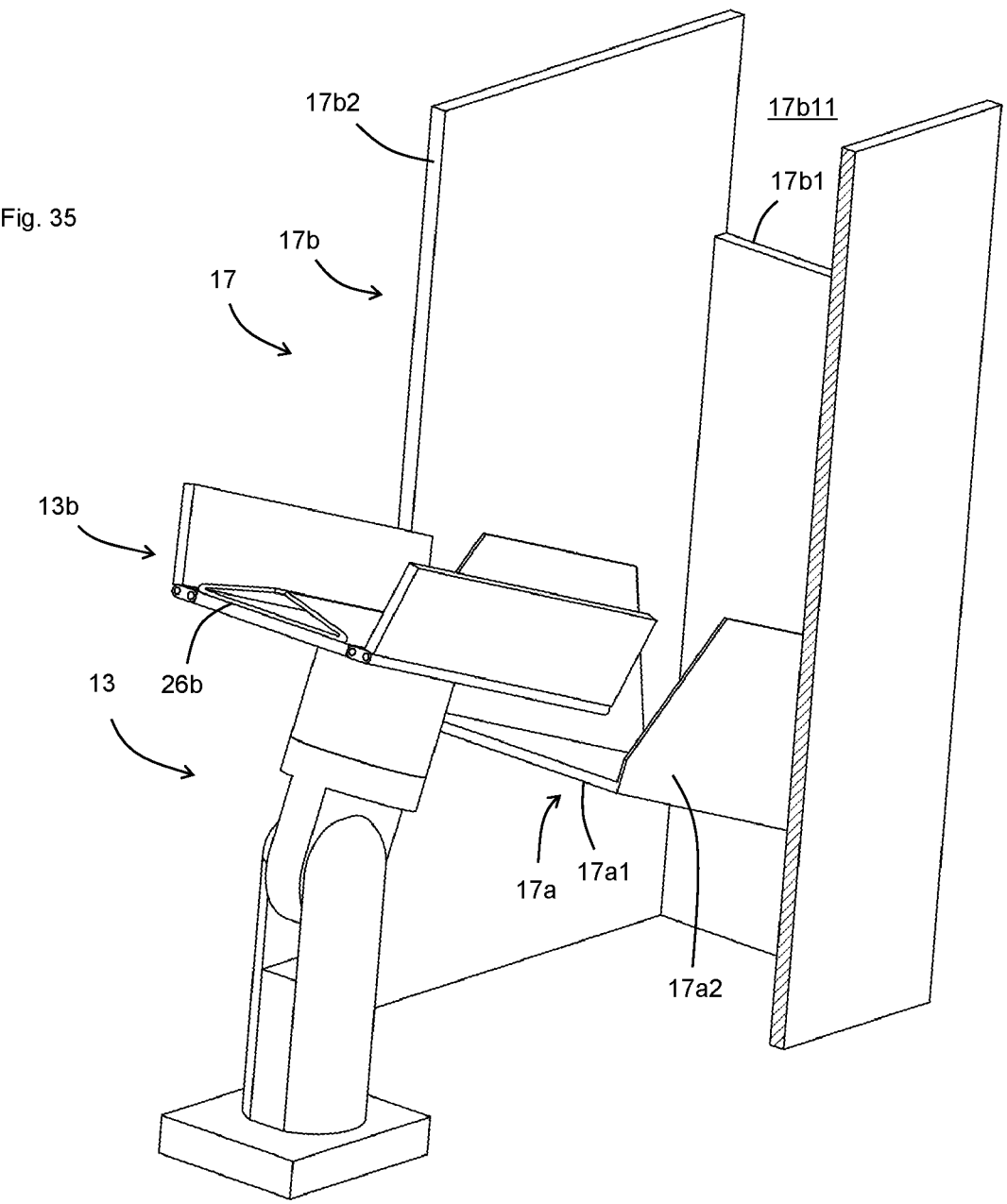
FIG. 35 is a perspective view of the holding apparatus 13 and a burr feeding device 17, for explaining a discharging step. The holding mechanism 13e is omitted herein.

As shown in FIG. 35, the burr feeding device 17 includes a burr receiving portion 17*a* for receiving the large burr 26*b* and a fence 17*b* surrounding the burr receiving portion 17*a*. The burr receiving portion 17*a* includes a bottom wall 17*a*1, a pair of side walls 17*a*2 rising from the bottom wall 17*a*1. The fence 17*b* includes a back wall 17*b*1, a pair of side walls 17*b*2 perpendicular to the back wall 17*b*1. The side wall 17*a*2 is arranged along the side wall 17*b*2. The back wall 17*b*1 is arranged on a back side of the burr receiving portion 17*a* when viewed from the holding stand 13*b*. The back wall 17*b*1 prevents the large burr 26*b* on the burr receiving portion 17*a* from falling to the back side of the burr receiving portion 17*a*.

In the discharging step, the holding stand 13*b* is tilted to slide the large burr 26*b* placed on the holding stand 13*b* to discharge it toward the burr receiving portion 17*a*. In this way, the holding stand 13*b* is rotated by the rotation mechanism 13*c* (more specifically, by the first rotation mechanism) during the transition from the separation step to the discharging step.

When the holding stand 13*b* is in the folded state, the friction between the large burr 26*b* and the holding stand 13*b* is large, and thus the large burr 26*b* does not slide easily even when the holding stand 13*b* is tilted. For this reason, it is preferable to rotate, prior to the discharging step, at least one of the connecting member 13*b*2 and the arm 13*b*3, so that the angles α, β become larger to bring the holding stand 13*b* into the burr discharging state shown in FIG. 34D and FIG. 35. Consequently, the large burr 26*b* can be slid easily from the holding stand 13*b*. In this regard, the angle α is 103 degrees and the angle β is 180 degrees in the burr discharging state of the present embodiment.

If a recess is provided on the holding stand 13*b* as a clearance when the molded body 26 is cut with the cutter 27*d*, the large burr 26*b* may be caught in the recess. In the present embodiment, such a recess is not provided on the holding stand 13*b*, and thus the large burr 26*b* will not be caught.

Since there is a gap between the holding stand 13*b* and the burr receiving portion 17*a*, there is a possibility that the large burr 26*b* may fall from the gap when moving the large burr 26*b* to the burr receiving portion 17*a*. In order to avoid such a fall, the burr receiving portion 17*a* is inclined during discharge, as shown in FIG. 35, such that a side thereof facing the holding stand 13*b* becomes higher. In such a case, since the large burr 26*b* that has been moved onto the burr receiving portion 17*a* can be quickly slid to a back side of the burr receiving portion 17*a*, the large burr 26*b* can be prevented from falling from a front side of the burr receiving portion 17*a*. Further, since the back wall 17*b*1 is provided on the back side of the burr receiving portion 17*a*, the large burr 26*b* can be also prevented from falling from the back side of the burr receiving portion 17*a*. A sensor provided on the holding stand 13*b* or the burr receiving portion 17*a* can detect whether the large burr 26*b* is moved onto the burr receiving portion 17*a*.

<Elevation Step>

As shown in FIG. 36, the back wall 17b1 is provided with a feeding port 17b11 to the pulverizer 18 at a position higher than the burr receiving portion 17a in the discharging step. In the elevation step, the burr receiving portion 17a is elevated toward the feeding port 17b11. The burr receiving portion 17a is elevated in a substantially vertical direction by a lifter. When the feeding port for the pulverizer 18 is provided at a higher position, a large space is required to convey the burr to the feeding port by a conveyor. In the present embodiment, the burr receiving portion 17a is elevated in the substantially vertical direction, so that the large burr 26b can be fed into the pulverizer 18 in a small space.

This elevation step can be performed while the burr receiving portion 17a is tilted. However, the large burr 26b constantly rubs against the back wall 17b1 in such a case, which causes wear of the back wall 17b1. In order to prevent such wear, it is preferable to perform the elevation step while the burr receiving portion 17a is horizontal, as shown in FIG. 36.

Further, the large burr 26b can be cooled during this elevation step. Consequently, the temperature of the large burr 26b fed into the pulverizer 18 is lowered, and the deterioration of the pulverizer 18 is suppressed. The cooling can be done by blowing air on the large burr 26b. The burr feeding device 17 may have a mesh structure to improve air permeability, in a portion where the large burr 26b is not easily caught.

Further, the time until the large burr 26b is fed into the pulverizer 18 after the separation step can be increased by performing this elevation step slowly. This makes it possible to stop the burr feeding device 17 before the large burr 26b is fed into the pulverizer 18 when it is detected in an inspection step included in the main-body processing step described below that the molded main body 26a does not include the skin material 4 or that the cutter 27d is broken. From this perspective, it is preferable to take a longer time for the elevation step than the inspection step. Further, since it is necessary to return the burr receiving portion 17a to a lower position before the large burr 26b generated in the next cycle is discharged toward the burr receiving portion 17a, the time required for the elevation step is preferably 0.9 cycle time or less, more preferably 0.8 cycle time or less.

<Feeding Step>

In the feeding step, the burr receiving portion 17a is elevated to the feeding port 17b11, and then the burr receiving portion 17a is tilted to feed the large burr 26b into the pulverizer 18 through the feeding port 17b11. The large burr 26b is pulverized in the pulverizer 18 to generate the recycled raw material.

2-8. Main-Body Processing Step

Figure 37A:
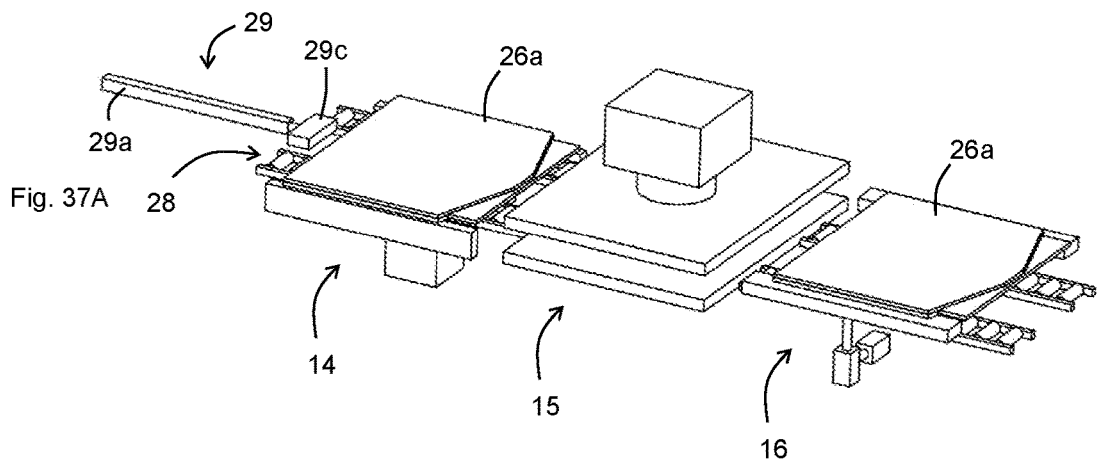
FIG. 37A is a perspective view when an inspection apparatus 14, a pressing apparatus 15, and a stacking apparatus 16 are arranged along a conveyor 28.
Figure 37B:
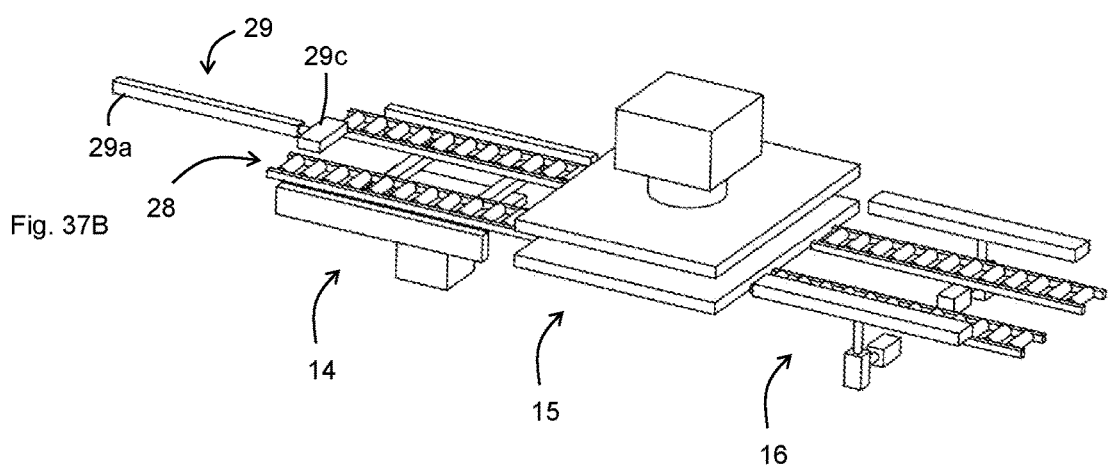
FIG. 37B shows a state where the molded main body 26a is removed from FIG. 37A.
Figure 37C:
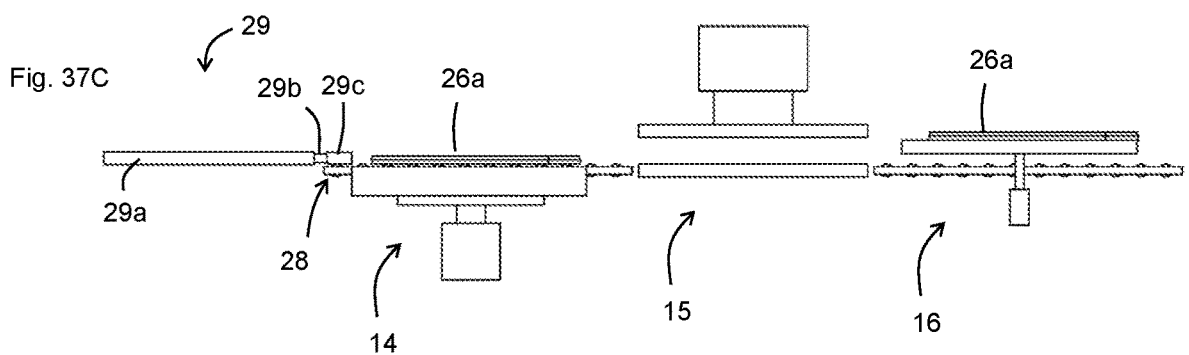
FIG. 37C is an elevation view of FIG. 37A.

In the main-body processing step, the inspection step, a pressing step, a stacking step, and a post-processing step are performed for the molded main body 26a. As shown in FIG. 37A to FIG. 37C, the inspection step, and the pressing step, and the stacking step are performed by the inspection apparatus 14, the pressing apparatus 15, and the stacking apparatus 16, respectively. The molded main body 26a is conveyed by the conveyor 28 and a feeding apparatus 29. In FIG. 37A and FIG. 37C, the molded main body 26a is placed on the conveyor 28 above the inspection apparatus 14 while the molded main body 26a produced in the previous cycle is placed on the stacking apparatus 16.

The conveyor 28 is, for example, a roller conveyor. The feeding apparatus 29 includes a base 29a, a rod 29b, and a tip portion 29c. The rod 29b is configured such that its protrusion length from the base 29a is adjustable. The tip portion 29c is fixed to a tip of the rod 29b. The molded main body 26a can be moved by extending the rod 29b while the molded main body 26a is placed on the conveyor 28, to push a side surface of the molded main body 26a with the tip portion 29c. In this regard, the conveyor 28 itself may be driven to move the molded main body 26a, instead of using the feeding apparatus 29. Further, the conveyor 28 does not pass through the pressing apparatus 15, and the molded main body 26a is slid and moved on a lower wall 15a shown in FIG. 39A and FIG. 39B in the pressing apparatus 15.

<Inspection Step>

In the inspection step, the inspection apparatus 14 is used to inspect the molded main body 26a conveyed onto the conveyor 28. Weight inspection and misalignment inspection of the skin material are performed in this step.

Figure 38A:
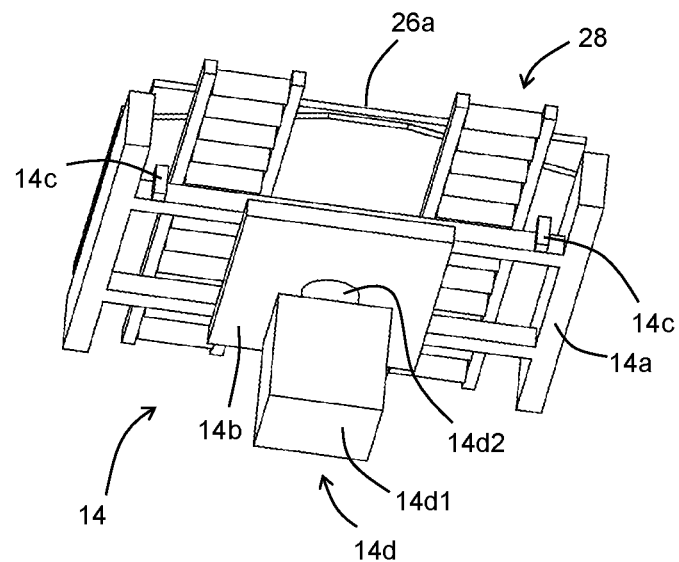
FIG. 38A is a perspective view of the inspection apparatus 14 and the conveyor 28 as viewed from a back side.
Figure 38B:
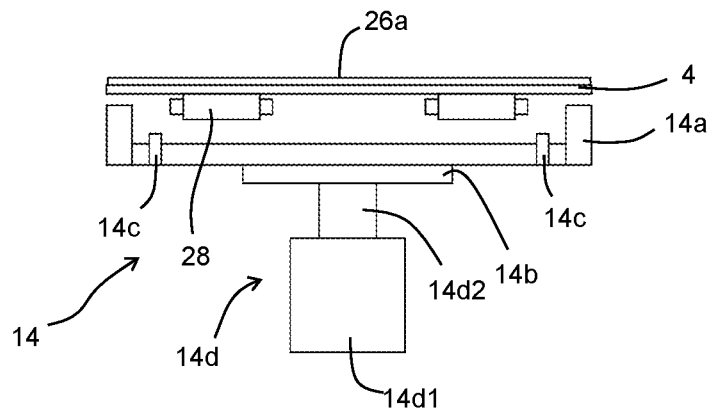
FIG. 38B is a right side view of FIG. 38A.

As shown in FIG. 38A to FIG. 38B, the inspection apparatus 14 includes a weighing table 14a, a weighing device 14b, a sensor 14c, and a lifting device 14d. The lifting device 14d includes a base 14d1 and a rod 14d2. The rod 14d2 is configured such that its protrusion length from the base 14d1 is adjustable. The weighing device 14b is fixed to the rod 14d2. The weighing table 14a is fixed to the weighing device 14b. The weighing device 14b can measure the weight of an object placed on the weighing table 14a. The sensor 14c is fixed to the weighing table 14a. The sensor 14c is configured to measure the reflectance in vicinity of an upper right and an upper left of the molded main body 26a.

When the inspection apparatus 14 is in a standby state, an upper surface of the weighing table 14a is lower than an upper surface of the conveyor 28 (the surface where the molded main body 26a is in contact with the conveyor 28), as shown in FIG. 38B. The weighing device 14b in this state cannot measure the weight of the molded main body 26a.

Figure 38C:
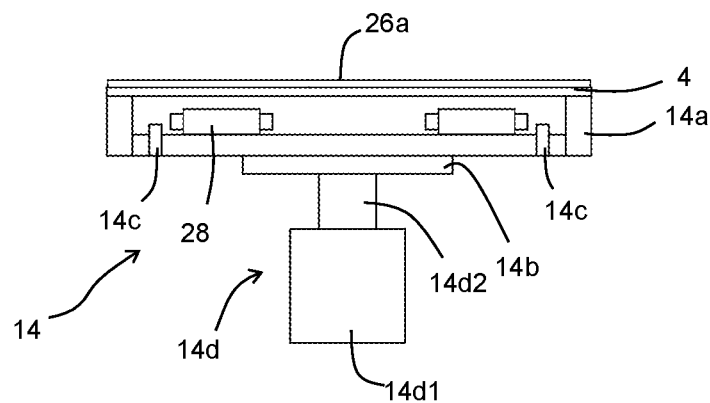
FIG. 38C is a right side view when a weighing table 14a is elevated from a state of FIG. 38B.

The inspection apparatus 14 is configured to raise, when performing the inspection, the weighing table 14a to support the molded main body 26a on the upper surface of the weighing table 14a, as shown in FIG. 38C. The weighing device 14b in this state can measure the weight of the molded main body 26a.

Further, the molded main body 26a is placed such that the skin material 4 is on its lower side, so that the sensor 14c can detect whether the skin material 4 is present near the upper right and the upper left of the molded main body 26a by measuring the reflectance. When the absence of the skin material 4 is detected in only in one of the upper right and the upper left, the molded main body 26a is considered defective and is removed from the conveyor 28. On the other hand, when the skin material 4 is not present in either the upper right or the upper left, the skin material 4 may have fallen and adhered to the large burr 26b. Since the quality of the recycled raw material will be degraded if the skin material 4 is fed into the pulverizer 18, the burr feeding device 17 is stopped until it is confirmed that the skin material 4 is not attached to the large burr 26b.

In the inspection step, it may be inspected whether the cutter 27d is broken. This inspection can be performed by checking whether the length of the cutter 27d is larger than or equal to a reference value. If the length of the cutter 27d is less the reference value, the cutter 27d may be broken or worn and shortened. In such a case, the burr feeding device 17 can be stopped to prevent a broken part of the cutter 27d from being fed into the pulverizer 18.

Figure 39A:
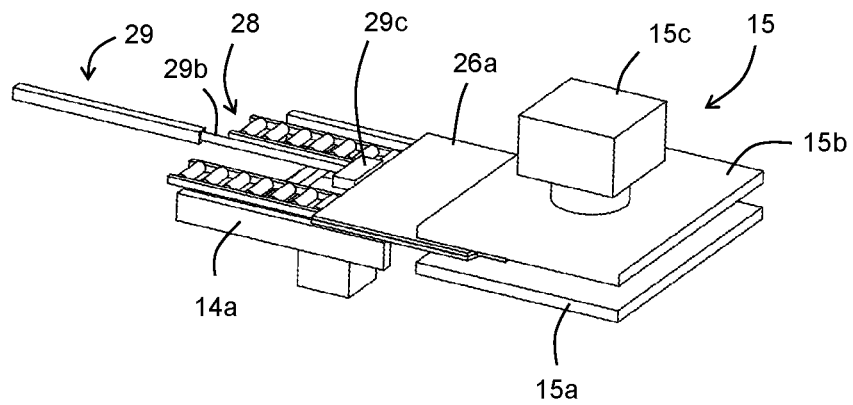
FIG. 39A is a perspective view in a state where the molded main body 26a is being conveyed toward the pressing apparatus 15 by a feeding apparatus 29.

After the inspection step, the weighing table 14a is lowered to place the molded main body 26a on the conveyor 28, and the side surface of the molded main body 26a is pressed by the tip portion 29c, as shown in FIG. 39A, to move the molded main body 26a toward the pressing apparatus 15.

<Pressing Step>

Figure 39B:
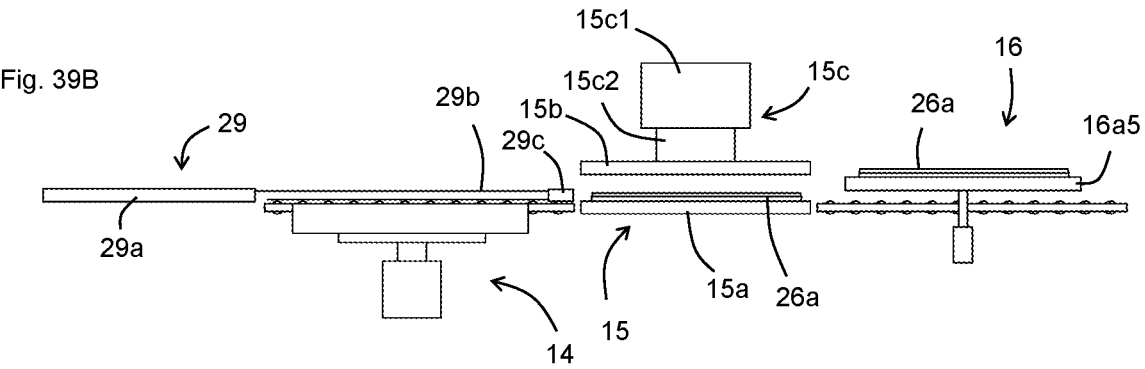
FIG. 39B is an elevation view in a state where the molded main body 26a is arranged in the pressing apparatus 15.

In the pressing step, the pressing apparatus 15 is used to press the molded main body 26a to improve the flatness of the molded main body 26a. As shown in FIG. 39A and FIG. 39B, the pressing apparatus 15 includes the lower wall 15a, an upper wall 15b, and a pressure device 15c. The pressure device 15c includes a base 15c1 and a rod 15c2. The rod 15c2 is configured such that its protrusion length from the base 15c1 is adjustable. The pressing step can be performed by extending the rod 15c2 and pressing the upper wall 15b against the molded main body 26a in a state where the molded main body 26a is arranged between the lower wall 15a and the upper wall 15b.

The upper wall 15b is raised after the pressing step, and then the side surface of the molded main body 26a is pressed by the tip portion 29c to move the molded main body 26a toward the stacking apparatus 16.

<Stacking Step>

Figure 40A:
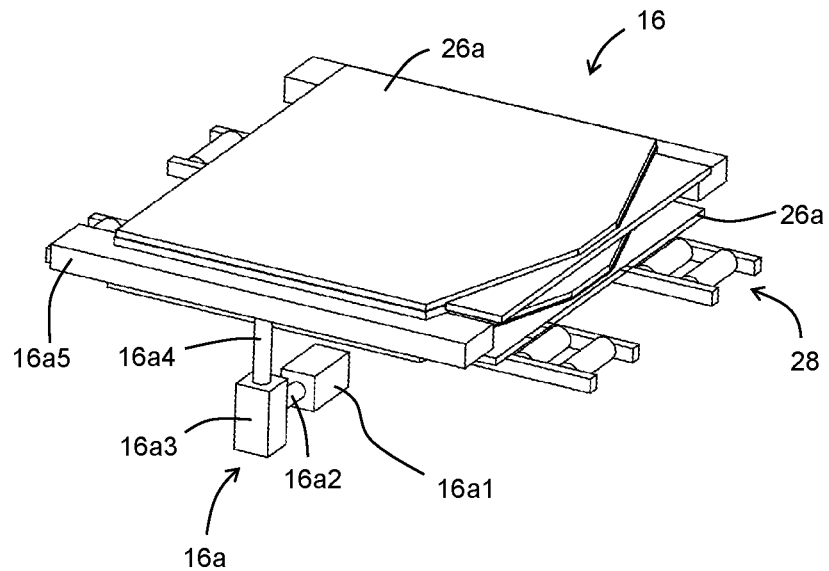
FIG. 40A is a perspective view when the molded main body 26a is arranged in the stacking apparatus 16.
Figure 40B:
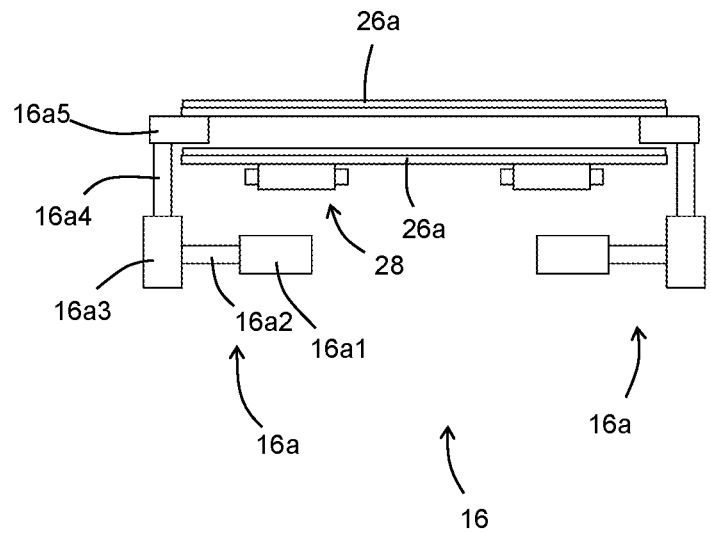
FIG. 40B is a right side view of FIG. 40A.

In the stacking step, the stacking apparatus 16 is used to stack a plurality of molded main bodies 26a. As shown in FIG. 40A and FIG. 40B, the stacking apparatus 16 includes a pair of cylinder units 16a. Each of the cylinder units 16a includes a first base 16a1, a first rod 16a2, a second base 16a3, a second rod 16a4, and a stack guide 16a5. The first base 16a1 is fixed to a member (not shown). The first rod 16a2 extends in a width direction of the conveyor 28 and is configured such that its protrusion length from the first base 16a1 is adjustable. The second base 16a3 is fixed to the first rod 16a2. The second rod 16a4 extends in a height direction and is configured such that its protrusion length from the second base 16a3 is adjustable. The stack guide 16a5 is fixed to the second rod 16a4. With such a configuration, the stack guide 16a5 can be moved in the vertical direction and in the width direction of the conveyor 28.

In the state of FIG. 39B, the stack guide 16a5 is in a raised position, and the molded main body 26a produced in the previous cycle is placed on the stack guide 16a5. In this state, there is a gap equal to or larger than the thickness of the molded main body 26a between a lower surface of the stack guide 16a5 and the conveyor 28. The molded main body 26a after the pressing step is pushed by the tip portion 29c and is accommodated in the gap between the lower surface of the stack guide 16a5 and the conveyor 28, as shown in FIG. 40A and FIG. 40B. Two molded main bodies 26a in FIG. 40A and FIG. 40B are separated by the stack guide 16a5 and are not stacked at this point.

Figure 41A:
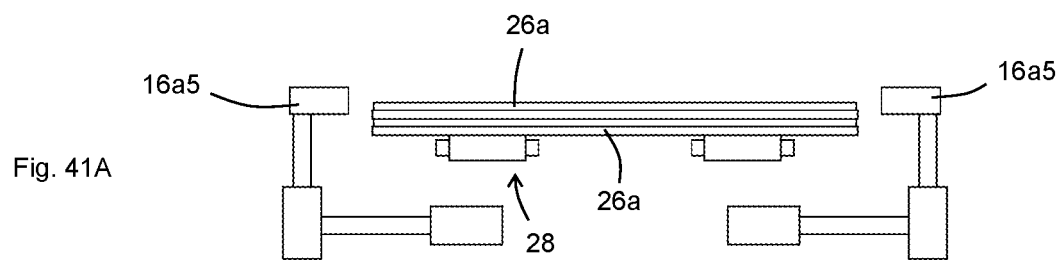
FIG. 41A to FIG. 41C are right side views showing the operation of stacking the molded main bodies 26a by the stacking apparatus 16.

FIG. 41A shows a state where the width between a pair of stack guides 16a5 is widened from the state shown in FIG. 40A and FIG. 40B to more than the width of the molded main body 26a. In this state, the molded main body 26a that had been placed on the stack guide 16a5 has fallen and is stacked on the molded main body 26a on a lower side.

Figure 41B:
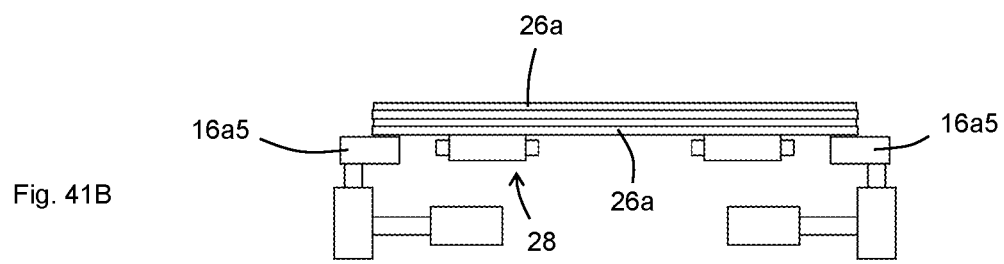
Figure 41C:
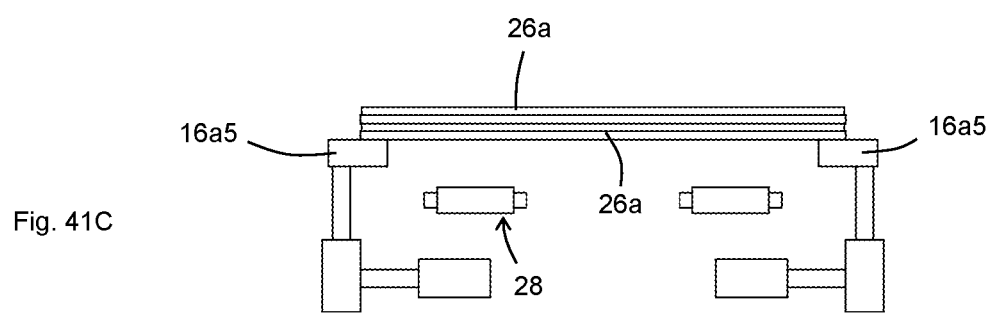

FIG. 41B shows a state where the pair of stack guides 16a5 are lowered from the state of FIG. 41A and the distance therebetween is narrowed. When the stack guides 16a5 are raised from this state, the two molded main bodies 26a are lifted by the stack guides 16a5. A gap larger than the thickness of the molded main body 26a is provided between the lower surface of the stack guide 16a5 and the conveyor 28, and the molded main body 26a produced in the next cycle is accommodated in this gap.

A plurality of molded main bodies 26a can be stacked on the stack guide 16a5 by repeating the step described above.

<Post-Processing Step>

In the post-processing step, the molded main bodies 26a on the stack guide 16a5 are taken out one by one. The small burr 26e is removed, and fine burrs remaining on the parting line PL are removed to obtain the resin panel 1. This step can be performed by the operator 21.

REFERENCE SIGNS LIST

1: resin panel, 2: resin molded body, 3: core material, 3a: base body, 3a1: recessed portion, 3b: base body, 3b1: recessed portion, 3c: reinforcing member, 3c1: upper wall, 3c11: projection, 3c2: lower wall, 3c21: projection, 3c3: pillar portion, 4: skin material, 5: first manipulator, 5a: conveying table, 6: second manipulator, 6a: mounting table, 7: member supply line, 8: positioning table, 8a: positioning table, 8b: locking portion, 8b1: first locking portion, 8b2: second locking portion, 8c: rotation mechanism, 8c1: base, 8c2: first rotation member, 8c3: second rotation member, 8c4: first rotation axis, 8c5: second rotation axis, 8d: pedestal, 9: insertion apparatus, 9a: base, 9b: suction pad, 9c: female holding portion, 9c1: female projection, 9c11: shaft, 9c12: bulging portion, 9c13: concave portion, 9c2: tubular portion, 9c3: base, 10: molding machine, 12: clamping device, 13: holding apparatus, 13a: conveying line, 13b: holding stand, 13b1: base stand, 13b2: connecting member, 13b3: arm, 13b4: rotation shaft, 13b5: rotation shaft, 13c: rotation mechanism, 13c1: base, 13c2: first rotation member, 13c3: second rotation member, 13c4: first rotation axis, 13c5: second rotation axis, 13d: conveying table, 13e: holding mechanism, 13e1: base, 13e2: rod, 13e3: pressing portion, 13eb: lower holding mechanism, 13ec: central holding mechanism, 13eu: upper holding mechanism, 13f: holding surface, 13f1: holding surface, 13f2: holding surface, 13f3: holding surface, 13g: lower burr plate, 13h: upper burr plate, 14: inspection apparatus, 14a: weighing table, 14b: weighing device, 14c: sensor, 14d: lifting device, 14d1: base, 14d2: rod, 15: pressing apparatus, 15a: lower wall, 15b: upper wall, 15c: pressure device, 15c1: base, 15c2: rod, 16: stacking apparatus, 16a: cylinder unit, 16a1: first base, 16a2: first rod, 16a3: second base, 16a4: second rod, 16a5: stack guide, 17: burr feeding device, 17a: burr receiving portion, 17a1: bottom wall, 17a2: side wall, 17b: fence, 17b1: back wall, 17b11: feeding port, 17b2: side wall, 18: pulverizer, 20: manufacturing system, 21: operator, 22: core-material conveying table, 23: skin-material conveying table, 24: head, 24a: base, 24a1: member mounting surface, 24b: suction pad, 24b1: suction surface, 24c: needle gripper, 24d: male holding portion, 24d1: male projection, 24d11: shaft, 24d12: bulging portion, 24d2: tubular portion, 24d3: base, 24e: reinforcing-member positioning mechanism, 24e1: first base, 24e2: first rod, 24e3: second base, 24e4: second rod, 25: sensor, 26: molded body, 26a: molded main body, 26b: large burr, 26bb: lower burr, 26bc: central burr, 26bu: upper burr, 26c: cutting line, 26cb: lower line, 26c1: left line, 26cr: right line, 26cu: upper line, 26d: molded product, 26e: small burr, 26f: parting line, 26fb: lower line, 26fl: left line, 26fr: right line, 26fu: upper line, 26g: identification shape, 26h: crease, 27: head, 27a: base, 27b: suction pad, 27c: imaging unit, 27d: cutter, 28: conveyor, 29: feeding apparatus, 29a: base, 29b: rod, 29c: tip portion, 30: heater, 61: raw resin, 61a: molten resin, 62: hopper, 63: extruder, 63a:

cylinder, 64: sheet forming device, 67: accumulator, 67*a*: cylinder, 67*b*: piston, 68: T-die, 71: first mold, 71*b*: inner surface, 71*d*: pinch-off portion, 71*e*: male projection, 71*f*: main body portion, 71*l*: projection, 71*ll*: left line projection, 71*lr*: right line projection, 71*g*: movable portion, 71*g*1: projection, 72: second mold, 72*b*: inner surface, 72*d*: pinch-off portion, 73*a*: first resin sheet, 73*b*: second resin sheet, 75: connecting pipe, 77: connecting pipe, 78: lower burr clamping device, PL: parting line

The invention claimed is:

1. A method for manufacturing a structure, comprising a tilting step, wherein, in the tilting step, at least one target member is positioned by tilting a positioning table and sliding the target member placed on the positioning table to bring the target member into contact with a locking portion, and the target member is configured by engaging a pair of base bodies with an elongated reinforcing member.

2. The method of claim 1, wherein the positioning table is configured to be rotatable about a first rotation axis and a second rotation axis, the first rotation axis and the second rotation axis are orthogonal to each other, the locking portion comprises a first locking portion and a second locking portion, the tilting step comprises
a first-rotation-axis rotating step and
a second-rotation-axis rotating step,
in the first-rotation-axis rotating step, the target member is slid and brought into contact with the first locking portion by rotating the positioning table about the first rotation axis, and
in the second-rotation-axis rotating step, the target member is slid and brought into contact with the second locking portion by rotating the positioning table about the second rotation axis.

3. The method of claim 1, further comprising;
a base-body position correction step after the tilting step, wherein, in the base-body position correction step, misalignment between the pair of base bodies along a longitudinal direction of the elongated reinforcing member is corrected.

4. The method of claim 1, further comprising;
a reinforcing-member position correction step after the tilting step, wherein, in the reinforcing-member position correction step, misalignment of the elongated reinforcing member with respect to the pair of base bodies is corrected.

5. The method of claim 1 further comprising
a taking-out step before the tilting step, wherein the at least one target member comprises a plurality of target members, and in the taking-out step, the target member at a top of a target member stack is taken out and moved onto the positioning table, the target member stack being configured by stacking the plurality of target members.

6. The method of claim 5 further comprising
a heating step before the tilting step, wherein, in the heating step, the target member is heated, and the heating step is performed by heating the target members included in the target member stack.

7. The method of claim 1 further comprising
a holding step after the tilting step, wherein, in the holding step, the target member in a positioned state is held and moved by a manipulator.

8. The method of claim 1 further comprising
a heating step before the tilting step, wherein, in the heating step, the target member is heated.

\* \* \* \* \*